US006940851B2

(12) United States Patent
Oki et al.

(10) Patent No.: US 6,940,851 B2
(45) Date of Patent: Sep. 6, 2005

(54) SCHEDULING THE DISPATCH OF CELLS IN NON-EMPTY VIRTUAL OUTPUT QUEUES OF MULTISTAGE SWITCHES USING A PIPELINED ARBITRATION SCHEME

(75) Inventors: Eiji Oki, Kodaira (JP); Hung-Hsiang Jonathan Chao, Holmdel, NJ (US); Roberto Rojas-Cessa, Brooklyn, NY (US)

(73) Assignee: Polytechnic University, Brooklyn, NY (US)

( * ) Notice: Subject to any disclaimer, the term of this patent is extended or adjusted under 35 U.S.C. 154(b) by 929 days.

(21) Appl. No.: 09/911,044

(22) Filed: Jul. 23, 2001

(65) Prior Publication Data

US 2002/0110135 A1 Aug. 15, 2002

Related U.S. Application Data

(63) Continuation-in-part of application No. 09/873,110, filed on Jun. 1, 2001, and a continuation-in-part of application No. 09/872,892, filed on Jun. 1, 2001, and a continuation-in-part of application No. 09/851,461, filed on May 8, 2001.
(60) Provisional application No. 60/253,335, filed on Nov. 27, 2000, and provisional application No. 60/252,006, filed on Nov. 20, 2000.

(51) Int. Cl.[7] .......................... H04L 12/50; H04Q 11/00
(52) U.S. Cl. ...................... 370/388; 370/351; 370/231; 370/360; 370/361; 379/271; 379/272
(58) Field of Search ................................ 370/217, 218, 370/229, 231, 232, 235, 239, 351, 352, 360, 388, 353, 400, 412, 413, 395.52; 379/271, 272

(56) References Cited

U.S. PATENT DOCUMENTS 5,495,476 A * 2/1996 Kumar ....................... 370/388

6,157,643 A * 12/2000 Ma ............................. 370/389
6,810,031 B1 * 10/2004 Hegde et al. ................ 370/351

OTHER PUBLICATIONS

N. W. McKeown, "Scheduling Algorithms for Input–Queued Cell Switches," PhD Thesis, University of California at Berkeley, (1995).

C. Y. Lee and A. Y. Oruç, "A Fast Parallel Algorithm for Routing Unicast Assignments in Benes Networks," *IEEE Trans. on Parallel and Distributed Sys.*, vol. 6, No. 3, pp. 329–334 (Mar. 1995).

T. T. Lee and S–Y Liew, "Parallel Routing Algorithms in Benes–Clos Networks," *Proc. IEEE INFOCOM '96*, pp. 279–286 (1996).

N. McKeown, M. Izzard, A. Mekkittikul, W. Ellersick and M. Horowitz, "Tiny–Tera: A Packet Switch Core," *IEEE Micro.*, pp. 26–33 (Jan.–Feb. 1997).

T. Chaney, J. A. Fingerhut, M. Flucke, J. S. Turner, "Design of a Gigabit ATM Switch," *Proc. IEEE INFOCOM '97*, pp. 2–11 (Apr. 1997).

(Continued)

*Primary Examiner*—Wellington Chin
*Assistant Examiner*—Raj Jain
(74) *Attorney, Agent, or Firm*—Straub & Pokotylo; John C. Pokotylo

(57) ABSTRACT

A pipeline-based matching scheduling approach for input-buffered switches relaxes the timing constraint for arbitration with matching schemes, such as CRRD and CMSD. In the new approach, arbitration may operate in a pipelined manner. Each sub-scheduler is allowed to take more than one time slot for its matching. Every time slot, one of them provides a matching result(s). The sub-scheduler can use a matching scheme such as CRRD and CMSD.

26 Claims, 45 Drawing Sheets

OTHER PUBLICATIONS

F. M. Chiussi, J. G. Kneuer, and V. P. Kumar, "Low–Cost Scalable Switching Solutions for Broadband Networking: The ATLANTA Architecture and Chipset," *IEEE Commun. Mag.*, pp. 44–53 (Dec. 1997).

J. Turner and N. Yamanaka, "Architectural Choices in Large Scale ATM Switches," *IEICE Trans. Commun.*, vol. E81–B, No. 2, pp. 120–137 (Feb. 1998).

H. J. Chao and J–S Park, "Centralized Contention Resolution Schemes for a Large–Capacity Optical ATM Switch," *Proc. IEEE ATM Workshop '97*, pp. 11–16 (Fairfax, VA, May 1998).

G. Nong, J. K. Muppala and M. Hamdi, "Analysis of Nonblocking ATM Switches with Multiple Input Queues," *IEEE/ACM Transactions on Networking*, vol. 7, No. 1, pp. 60–74 (Feb. 1999).

N. McKeown, "The iSLIP Scheduling Algorithm for Input–Queued Switches," *IEEE/ACM Transactions on Networking*, vol. 7, No. 2, pp. 188–201 (Apr. 1999).

A. Smiljanić, R. Fan and G. Ramamurthy, "RRGS–Round–Robin Greedy Scheduling for Electronic/Optical Terabit Switches," *Global Telecommunications Conference–Globecom '99*, pp. 1244–1250 (May 1999).

N. McKeown, A. Mekkittikul, V. Anantharam, and J. Walrand, "Achieving 100% Throughput in an Input–Queued Switch," *IEEE Trans. on Communications*, vol. 47, No. 8, pp. 1260–1267 (Aug. 1999).

E. Oki, N. Yamanaka, Y. Ohtomo, K. Okazaki and R. Kawano, "A 10–Gb/s (1.25 Gb/s×8) 4×2 0.25–$\mu$m CMOS/SIMOX ATM Switch Based on Scalable Distributed Arbitration," *IEEE J. of Solid–State Circuits*, vol. 34, No. 12, pp. 1921–1934 (Dec. 1999).

N. Yamanaka, E. Oki, S. Yasukawa, R. Kawano and K. Okazaki, "OPTIMA: Scalable, Multi–Stage, 640–Gbit/s ATM Switching System Based on Advanced Electronic and Optical WDM Technologies," *IEICE Trans. Commun.*, vol. E83–B, No. 7, pp. 1488–1496 (Jul. 2000).

J. Chao, "Saturn: A Terabit Packet Switch Using Dual Round–Robin," *IEEE Communications Magazine*, pp. 78–84 (Dec. 2000).

G. Nong and M. Hamdi, "On the Provision of Quality–of–Service Guarantees for Input Queued Switches;" *IEEE Commun. Mag.*, pp. 62–69 (Dec. 2000).

E. Oki, Z. Jing, R. Rojas–Cessa, J. Chao, "Concurrent Round–Robin Dispatching Scheme in a Clos–Network Switch," *IEEE ICC 2001*, pp. 106–112 (Jun. 2001).

E. Oki, R. Rojas–Cessa and H. J. Chao, "PCRRD: A Pipeline–Based Concurrent Round–Robin Dispatching Scheme for Clos–Network Switches," pp. 1–18.

A. Smiljanić, "Flexible Bandwidth Allocation in Terabit Packet Switches," pp. 233–239.

* cited by examiner

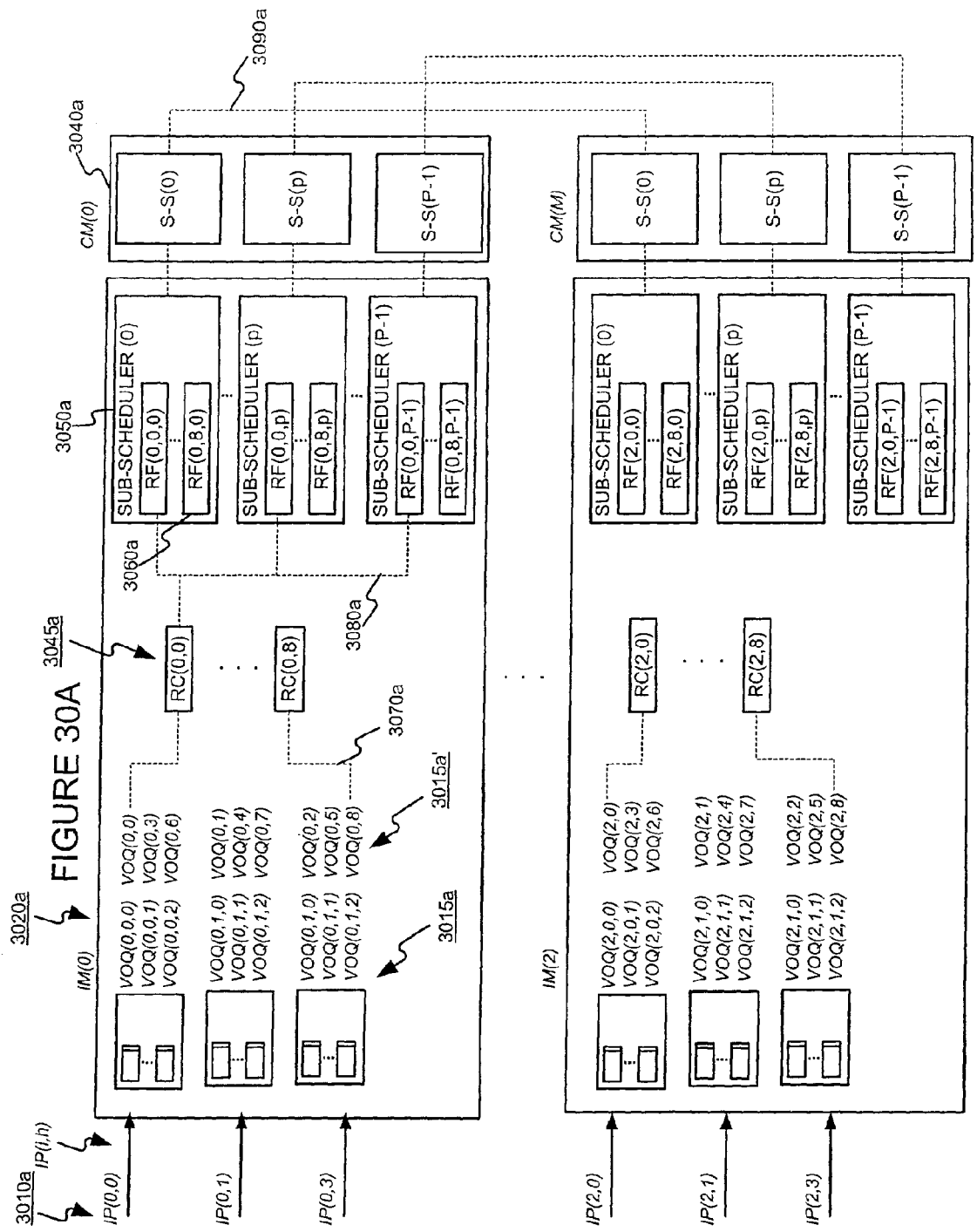

SCHEDULING THE DISPATCH OF CELLS IN NON-EMPTY VIRTUAL OUTPUT QUEUES OF MULTISTAGE SWITCHES USING A PIPELINED ARBITRATION SCHEME

§0. PRIORITY CLAIMS AND RELATED APPLICATIONS

Benefit is claimed, under 35 U.S.C. §119 (e)(1), to the filing date of: provisional patent application Ser. No. 60/252,006, entitled "CRRD: A CONCURRENT ROUND-ROBIN DISPATCHING SCHEME FOR CLOS-NETWORK SWITCHES", filed on Nov. 20, 2000 and listing Jonathan Chao and Eiji Oki as the inventors; and provisional patent application Ser. No. 60/253,335, entitled "A SCALABLE ROUND-ROBIN BASED DISPATCHING SCHEME FOR LARGE-SCALE CLOS-NETWORK SWITCHES", filed on Nov. 27, 2000 and listing Jonathan Chao and Eiji Oki as inventors, for any inventions disclosed in the manner provided by 35 U.S.C. §112, ¶ 1. These provisional applications are expressly incorporated herein by reference.

This application is a continuation-in-part of: (i) U.S. patent application Ser. No. 09/851,461, entitled "SCHEDULING THE DISPATCH OF CELLS IN MULTISTAGE SWITCHES", listing H. Jonathan Chao and Eiji Oki as inventors, and filed on May 8, 2001; (ii) U.S. patent application Ser. No. 09/872,892, entitled "SCHEDULING THE DISPATCH OF CELLS IN MULTISTAGE SWITCHES USING A HIERARCHICAL ARBITRATION SCHEME FOR MATCHING NON-EMPTY VIRTUAL OUTPUT QUEUES OF A MODULE WITH OUTGOING LINKS OF THE MODULE", listing H. Jonathan Chao and Eiji Oki as inventors, and filed on Jun. 1, 2001; and (iii) U.S. patent application Ser. No. 09/873,110, entitled "PIPELINED MAXIMAL-SIZED MATCHING CELL DISPATCH SCHEDULING", listing Eiji Oki, Roberto Rojas-Cessa, and H. Jonathan Chao as inventors, and filed on Jun. 1, 2001. These applications are incorporated herein by reference.

§1. BACKGROUND

§1.1 Field of the Invention

The present invention concerns the communication of data over networks, such as the Internet for example. More specifically, the present invention concerns scheduling the servicing (e.g., dispatching) of cells or packets buffered at input ports of a switch.

§1.2 Related Art

Switches and routers are used in networks, such as the Internet for example, to forward data towards its destination. The need for large-scale switches and routers is introduced in §1.2.1 below. Then, two types of switches, as well as disadvantages and challenges in each of these two types of switches, are introduced in §1.2.2 below.

§1.2.1 The Need for Large-scale (e.g., Terabit) Routers and Switches

Many expect that Internet traffic will continue to grow explosively. Given this assumption, high-speed switches and routers (e.g., those having a throughput over one Terabit per second) will become necessary. Most high-speed packet switches adopt a fixed-size cell in the switch fabric. If variable length packets are to be supported in the network, such packets may be segmented and/or padded into fixed-sized cells upon arrival, switched through the fabric of the switch, and reassembled into packets before departure. There are two main types of high-speed switches, each introduced in §1.2.2 below.

§1.2.2 Types of Switches (Single Stage Versus Multistage) and Their Characteristics There are two main types of high-speed switches—namely single stage and multi-stage. Single stage switches and perceived limits of single stage switches are introduced in §§1.2.2.1 and 1.2.2.2, respectively, below. Similarly, multi-stage switches and perceived limits of multi-stage switches are introduced in §§1.2.2.3 and 1.2.2.4, respectively, below.

§1.2.2.1 Single Stage Switch Architectures

A so-called "crossbar" switch is a classic example of a single stage switch. In a crossbar switch, identical switching elements are arranged on a matrix plane. The article, N. McKeown, M. Izzard, A. Mekkiltikul, W. Ellerisick and M. Horowitz, "Tiny-Tera: A Packet Switch Core," IEEE Micro., pp. 26–33, (January–February 1997) (incorporated herein by reference and hereafter referred to as "the Tiny-Tera article") proposes a 320 gigabit per second crossbar switch fabric that uses a centralized scheduler referred to as "iSLIP". The article H. J. Chao and J-S Park, "Centralized Contention Resolution Schemes for a Large-Capacity Optical ATM Switch," Proc. IEEE ATM Workshop '97 (Fairfax, Va., May 1998) (incorporated herein by reference and hereafter referred to as "the Chao article") introduced a centralized contention resolution scheme for a large capacity crossbar optical switch. The article E. Oki, N. Yamanaka, Y. Ohtomo, K. Okazaki and R. Kawano, "A 10-Gb/s (1.25 Gb/s×8) 4×2 0.25 $\mu$m CMOS/SIMOX ATM Switch Based on Scalable Distributed Arbitration," IEEE J. of Solid-State Circuits, Vol. 34, No. 12, pp. 1921–1934 (December 1999) (incorporated herein by reference and hereafter referred to as "the Oki article") describes a high-speed switch chip having a throughput of 40 Gb/s, for a high-speed crosspoint-buffered crossbar switching system.

§1.2.2.2 Limits of Single Stage Switch Architectures

The switching techniques used in single stage switches, such as those described in the articles referenced in §1.2.2.1, are effective up to a certain switch size. Unfortunately, however, with such techniques, the complexity of the switching elements is proportional to the square of the number of switch ports. As a practical matter, this limits the feasibility of using such techniques in a large scale (e.g., Terabit per second and above) switch.

§1.2.2.3 Multi-stage Switch Architectures

In view of the limits of single stage switches, multiple-stage switch architectures have been introduced. For example, the so called "Clos-network" switch has three stages and is very attractive because of its scalability. See the article, C. Clos, "A Study of Non-Blocking Switching Networks," Bell Sys. Tech. Jour., pp. 406–424 (March 1953) (incorporated herein by reference and hereafter referred to as "the Clos article"). More specifically, the three stages include (i) input modules, (ii) a central switching fabric (incorporated in central modules), and (iii) output modules.

Clos-network switches have been categorized into two types—those with buffers to store cells in the second-stage (central) modules and those with no buffers in the second-stage (central) modules. For example, the article, T. Chaney, J. A. Fingerhut, M. Flucke, J. S. Turner, "Design of a Gigabit ATM Switch," Proc. IEEE INFOCOM '97, pp. 2–11 (April 1997) (incorporated herein by reference and hereafter referred to as "the Chaney article") discusses a gigabit ATM switch using buffers in the second-stage modules. In the switch architecture discussed in the Chaney article (hereafter referred to as "the Chaney switch"), every incoming cell is randomly distributed from the first-stage to the second-stage module to balance the traffic load in the second-stage. This is commonly referred to as "random dispatching". The buffers in the second-stage modules are used to resolve contention among cells from different first-stage modules. See the article J. Turner and N. Yamanaka, "Architectural Choices in Large Scale ATM Switches," *IEICE Trans. Commun.*, Vol. E81-B, No. 2, pp. 120–137 (February 1998) (incorporated herein by reference and hereafter referred to as "the Turner article").

An example of a switch architecture with no buffers in the second-stage modules is provided in the article F. M. Chiussi, J. G. Kneuer, and V. P. Kumar, "Low-Cost Scalable Switching Solutions for Broadband Networking: The ATLANTA Architecture and Chipset," *IEEE Commun. Mag.*, pp. 44–53 (December 1997) (incorporated herein by reference and hereafter referred to as "the Chiussi article"). Since there are no buffers in the second-stage modules to resolve potential contention, how cells are dispatched from the first-stage to the second-stage becomes important. The simple random distribution used in the Chaney switch may be used in the switch discussed in the Chiussi article (hereafter referred to as "the Chiussi switch") under certain conditions. Given the potential for contention, some buffers are provided in the first and third stages of the Chiussi switch. Although there are some studies of routing algorithms where every stage has no buffers, such algorithms require a contention resolution function for output ports, before cells even enter the multiple-stage switches. See, e.g., the articles, C. Y. Lee and A. Y. Qruc, "A Fast Parallel Algorithm for Routing Unicast Assignments in Benes Networks," *IEEE Trans. on Parallel and Distributed Sys.*, Vol. 6, No. 3, pp. 329–333 (March 1995), and T. T. Lee and S-Y Liew, "Parallel Routing Algorithms in Benes-Clos Networks," *Proc. IEEE INFOCOM '96*, pp. 279–286 (1996). (Both of these articles are incorporated herein by reference.) Such a pre-switch contention resolution function is challenging to implement in high-speed switches.

§1.2.2.4 Problems With Known Multiple-stage Switch Architectures

To provide high performance (e.g., high throughput), known multiple-stage switch architectures will typically require speed-up of the internal switching fabric (i.e., in the second-stage modules) and/or resequencing. For example, the Chaney switch provides high performance if the internal speed-up factor is set to be more than 1.25. As is known, speed-up of the switching fabric can be accomplished by increasing the number of central modules and/or increasing the internal link speed used in the central modules. Unfortunately, however, in the Chaney switch, buffers used in the second-stage modules cause cells to become out-of-sequence. Since the Chiussi switch does not use buffers in its second-stage modules, cell out-of-sequence problems are not encountered. Assuming that a random dispatching scheme is used to forward cells from the first stage to the second stage of the Chiussi switch, to minimize the chance of contention at the second stage, the internal speed-up factor has to be increased further. For example, to achieve 100% throughput using random dispatching in a large-size Chiussi switch, the speed-up is set to about 1.6 as indicated in the Chiussi article.

As should be appreciated from the foregoing, to be used in today's more demanding environments, the Chaney switch requires cell resequencing, which is challenging, and at least moderate speed-up, which increases costs. To be used in today's more demanding environments, the Chiussi switch requires even more speedup, which increases costs even more. In view of these problems with known switch architectures, a scalable switch architecture having a high throughput, avoiding out-of-sequence cells (e.g., by eliminating buffers in the second stage), and avoiding speed-up of the switch fabric is coveted.

§2. SUMMARY OF THE INVENTION

The present invention may be used to provide a scalable switch architecture that has a high throughput, avoids out-of-sequence cells, and avoids speedup of the switch fabric, while minimizing dispatch scheduling time needed and minimizing the number of crosspoints of interconnection wires used. The present invention may do so by providing a cell dispatch scheduling method for use in a multi-stage switch including a number, k×n, of output ports, a plurality of central modules, and a plurality of input modules, each including k groups of n virtual output queues and outgoing links. In one embodiment of the cell dispatch scheduling method, (i) a non-empty virtual output queue of an input module is matched with an outgoing link in the input module, wherein the outgoing link has an associated master arbitration operation for selecting one of the k groups of n virtual output queues, and (ii) the outgoing link is matched with an outgoing link of one of the central modules.

Finally, the present invention may relax the dispatch scheduling time by pipelining a number of sub-schedulers. Although each of the sub-schedulers may take more than one cell time slot to match a non-empty virtual output queue, via an outgoing link of the input module, with an outgoing link of a central module of the switch, collectively, the sub-schedulers generate a match result(s) in each cell time slot.

The present invention also provides a teaching of apparatus for effecting the various methods. The present invention also provides a teaching of various data structures that may be used for effecting the various methods.

§3. BRIEF DESCRIPTION OF THE DRAWINGS

FIGS. 9(*a*) through 9(*g*) illustrate an example of how a first phase of an exemplary dispatching method under the present invention matches non-empty virtual output queues to outgoing links in an input module.

Figure 10:
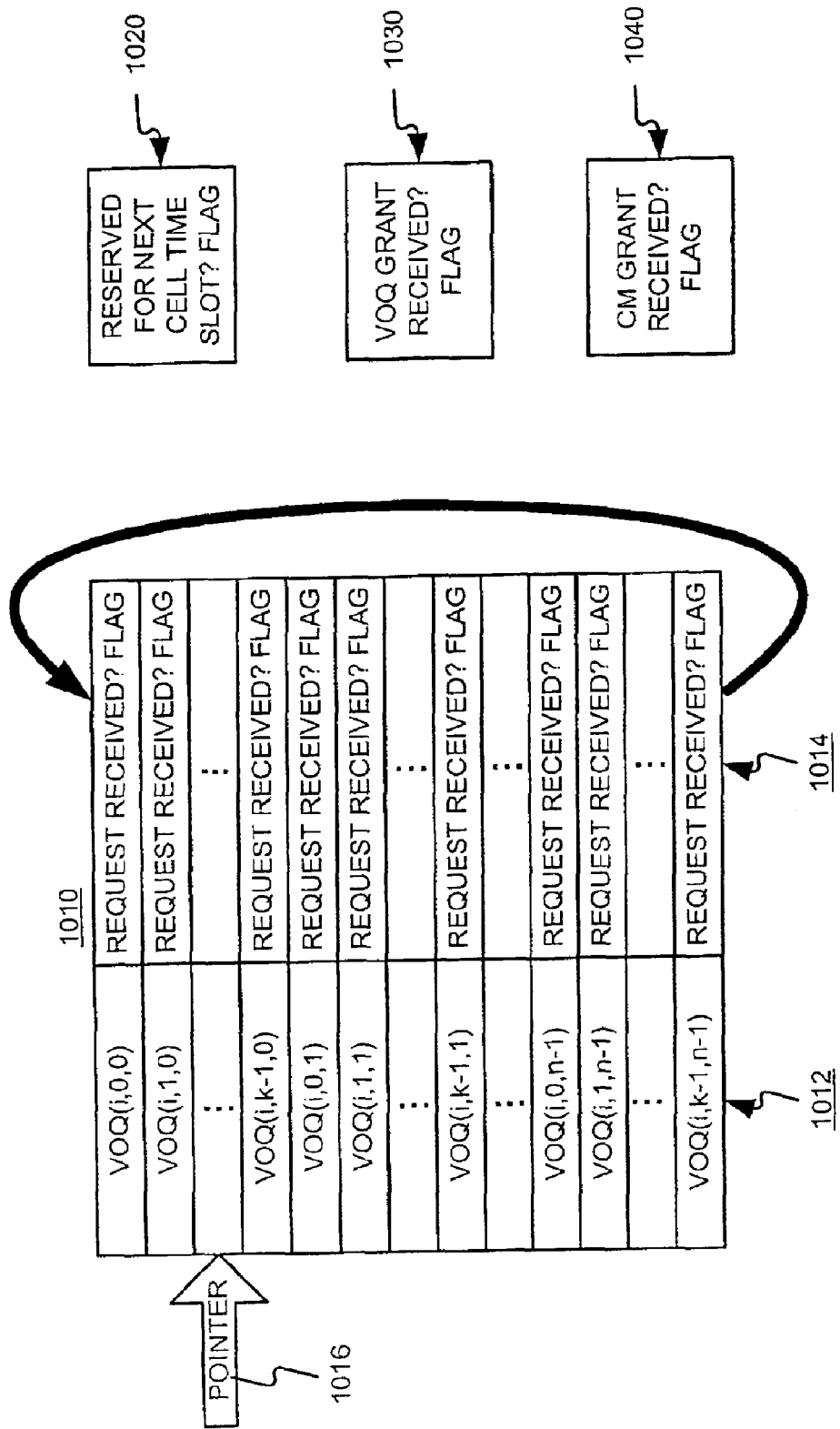

FIG. 10 illustrates exemplary data structures that may be used to store state information for use by a link arbitration operation.

Figure 11:
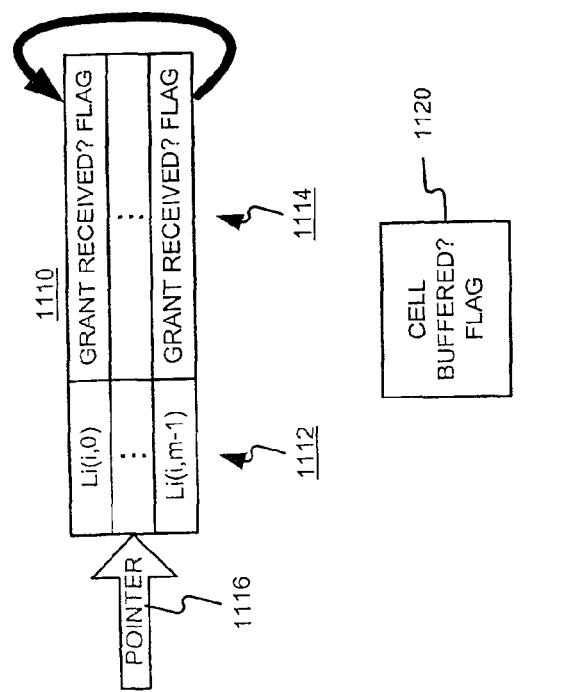
Figure 11:
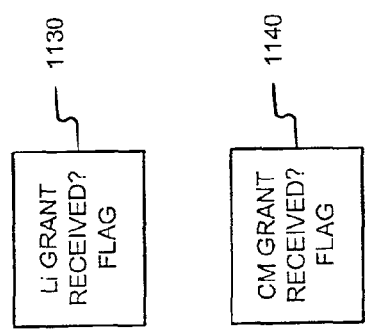

FIG. 11 illustrates exemplary data structures that may be used to store state information for use by a VOQ arbitration operation.

Figure 12:
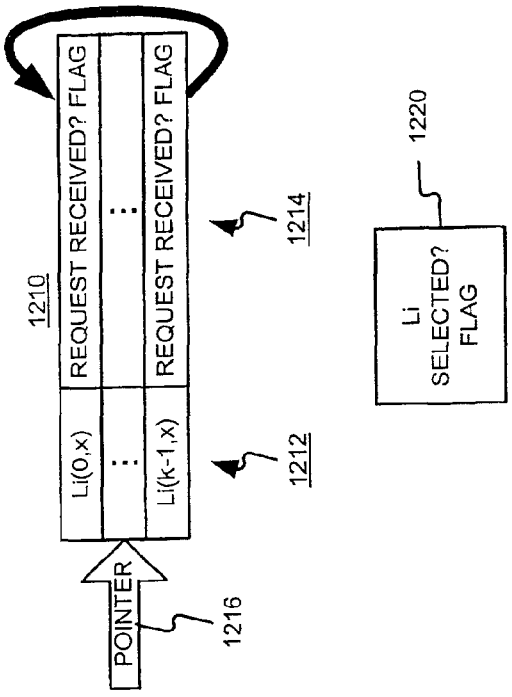

FIG. 12 illustrates exemplary data structures that may be used to store state information for use by a central module arbitration operation.

Figure 13:
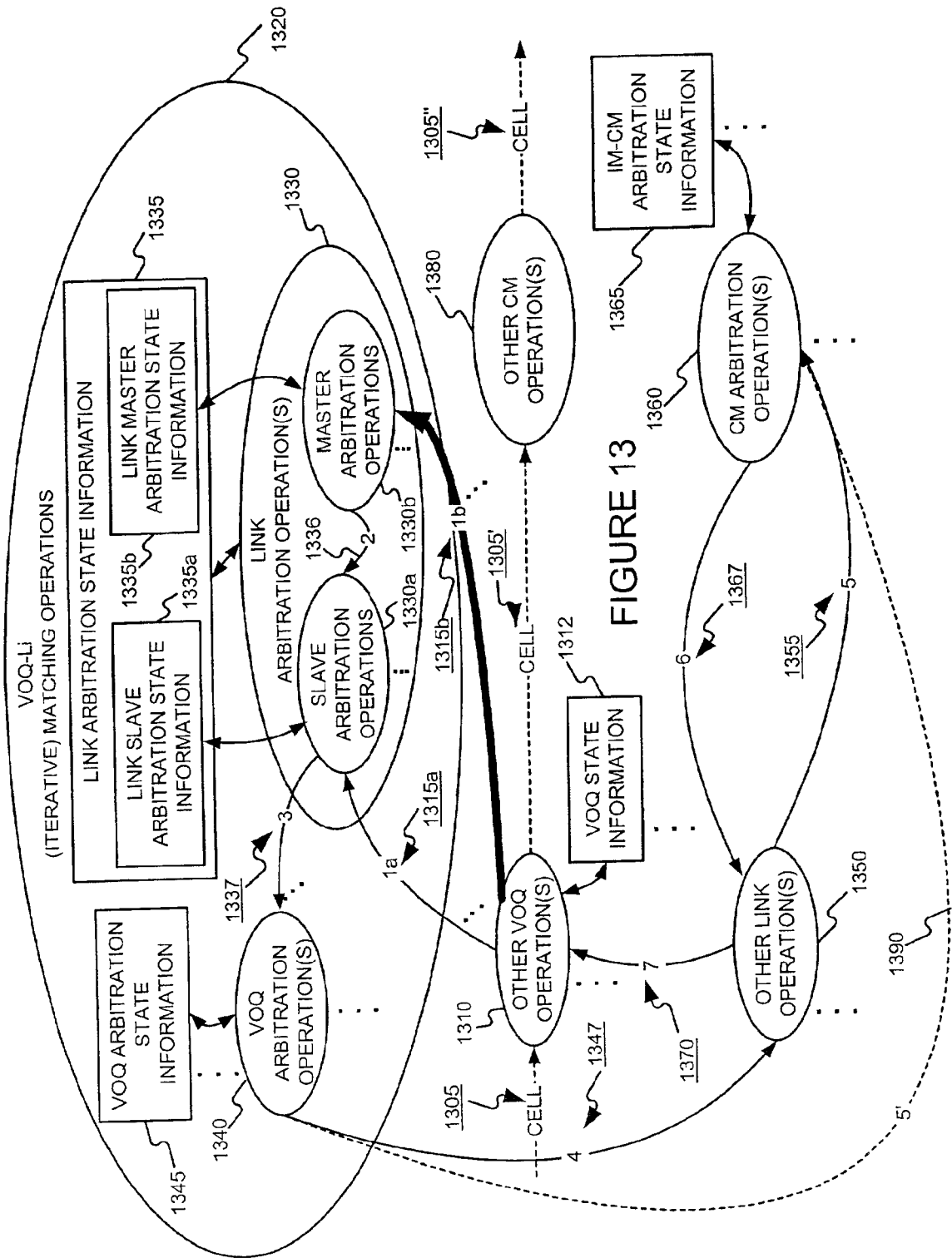

FIG. 13 is a bubble diagram of operations that may be performed by a refined embodiment of the present invention.

Figure 14:
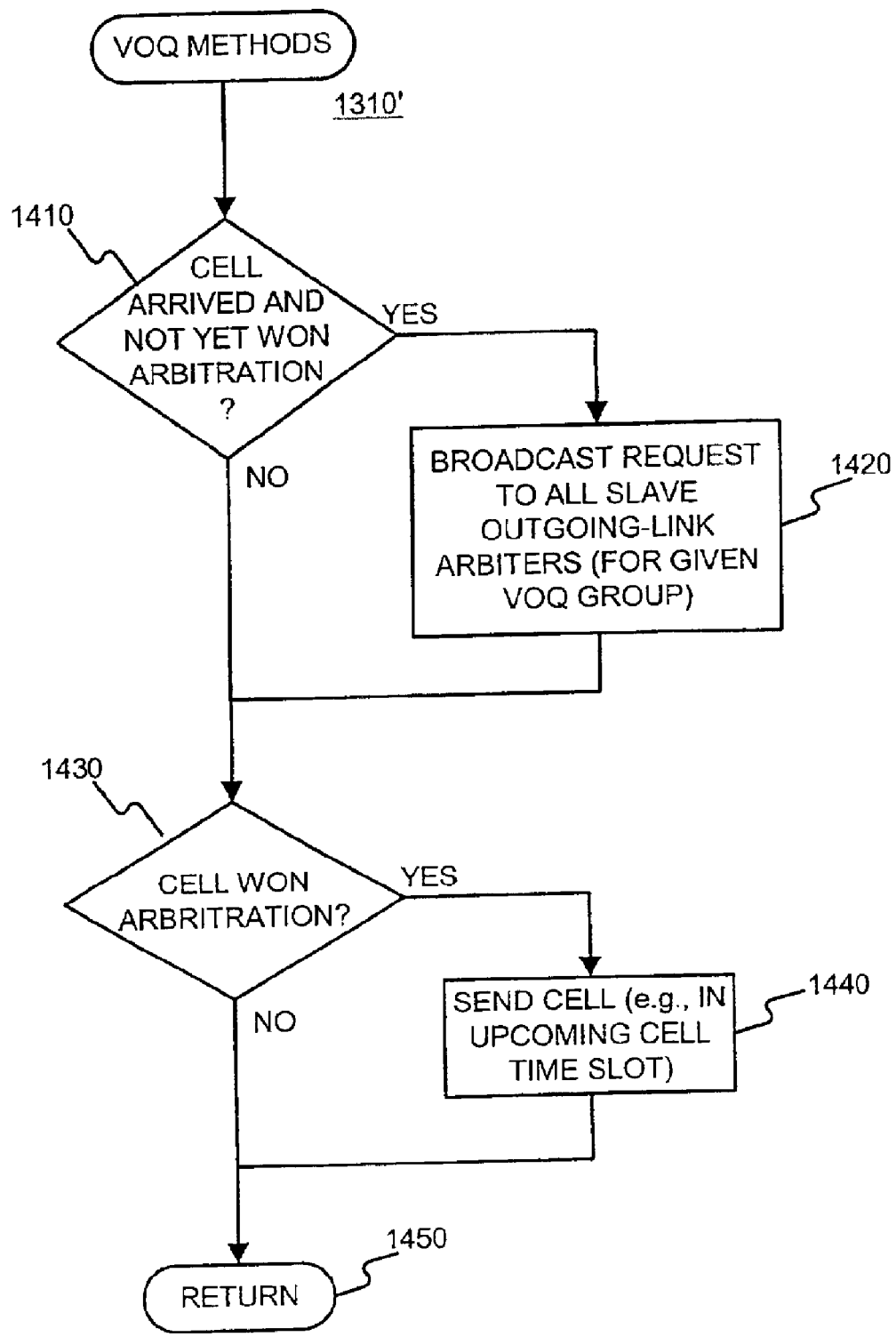

FIG. 14 is a flow diagram illustrating an exemplary virtual output queue method that may be performed under the present invention in the refined embodiment of FIG. 13.

Figure 15:
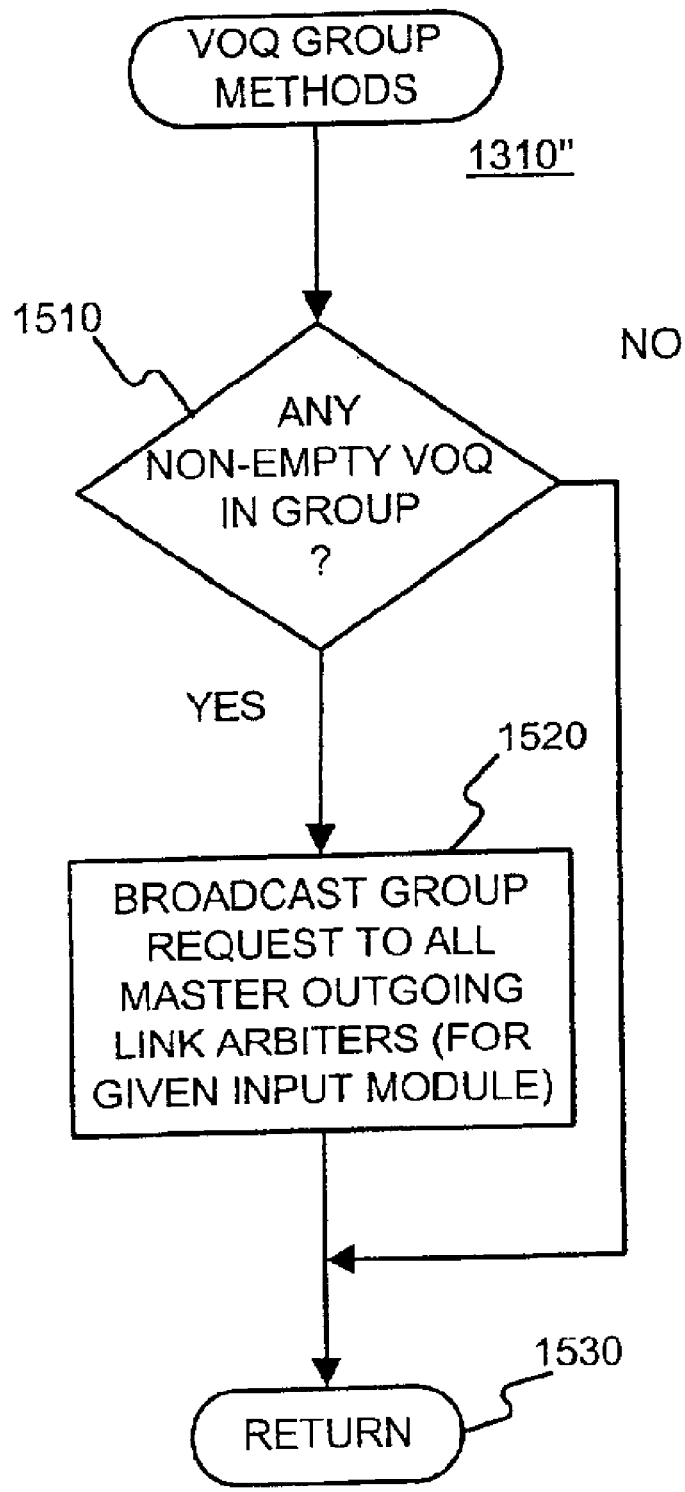

FIG. 15 is a flow diagram illustrating an exemplary VOQ group method that may be performed under the present invention in the refined embodiment of FIG. 13.

Figure 16:
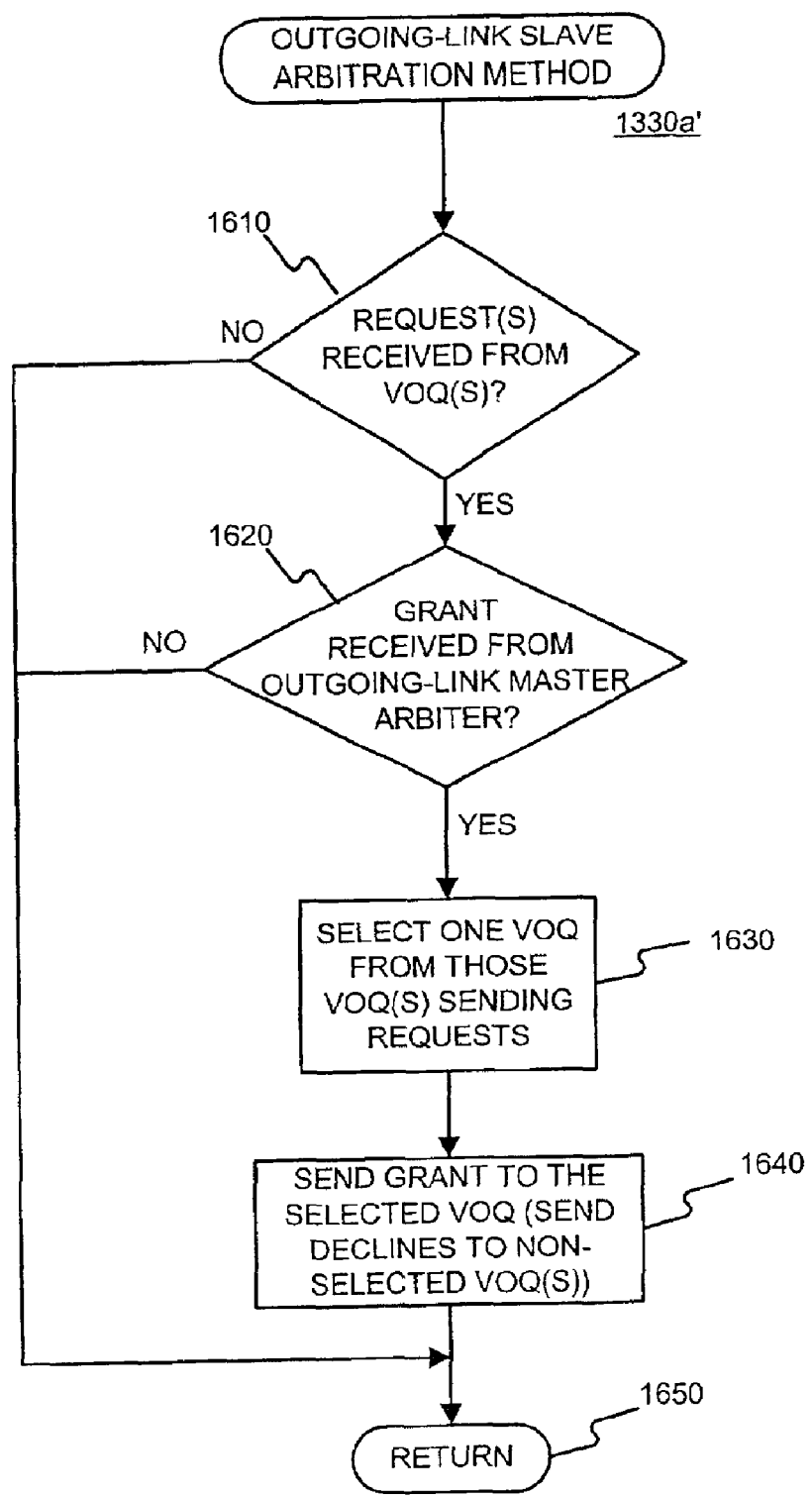

FIG. 16 is a flow diagram illustrating an exemplary outgoing link slave arbitration method that may be performed under the present invention in the refined embodiment of FIG. 13.

Figure 17:
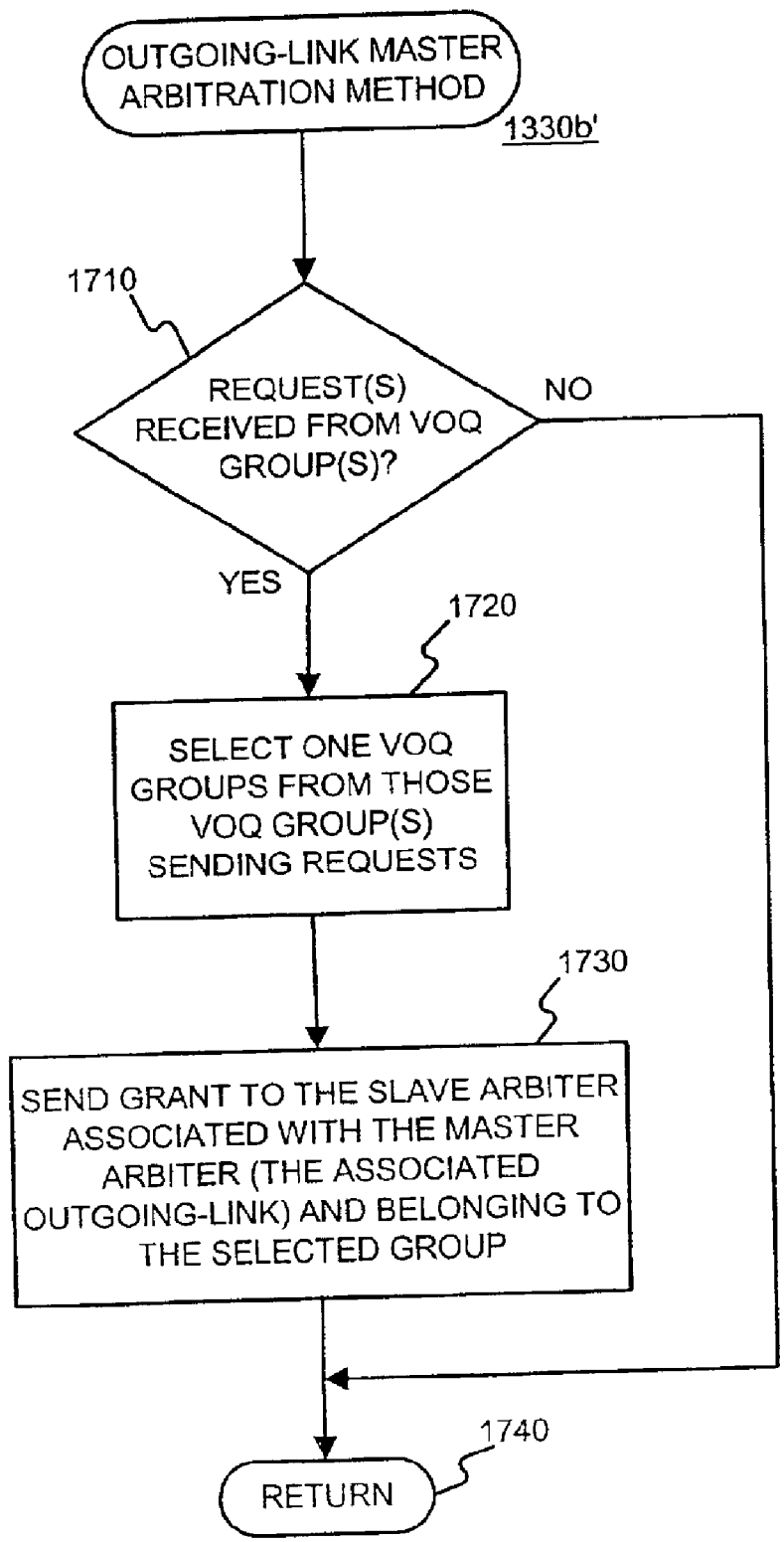

FIG. 17 is a flow diagram illustrating an exemplary outgoing link master arbitration method that may be performed under the present invention in the refined embodiment of FIG. 13.

Figure 18:
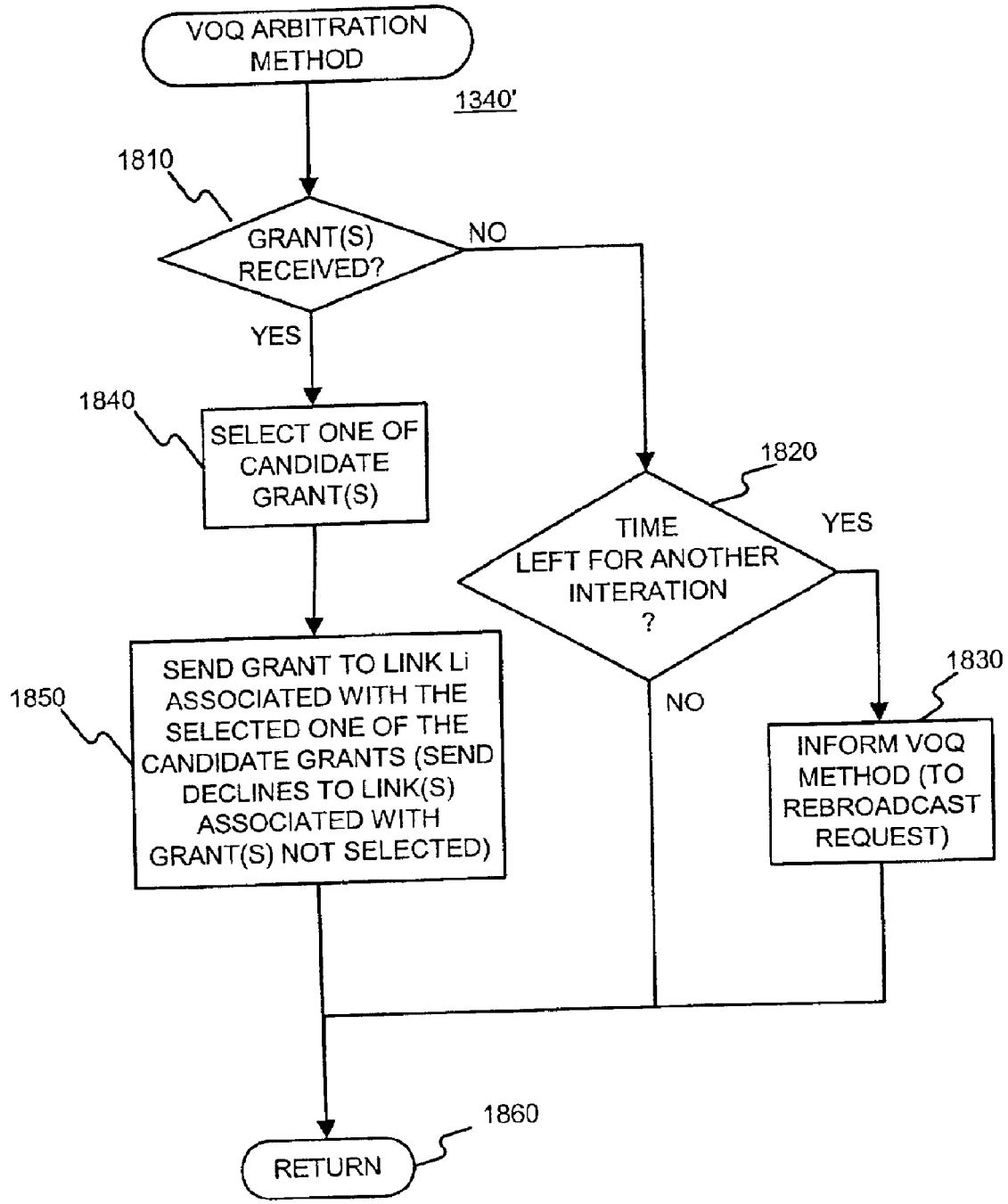

FIG. 18 is a flow diagram illustrating an exemplary virtual output queue arbitration method that may be performed under the present invention in the refined embodiment of FIG. 13.

FIGS. 19a through 19f are block diagrams which collectively show components of an exemplary apparatus, as well as inter-component signaling links, that may be used to perform operations under the present invention in the refined embodiment of FIG. 13.

FIGS. 20a through 20d illustrate an example of how a first phase of an exemplary dispatching method under the present invention matches non-empty virtual output queues to outgoing links in an input module.

Figures 21, 22:
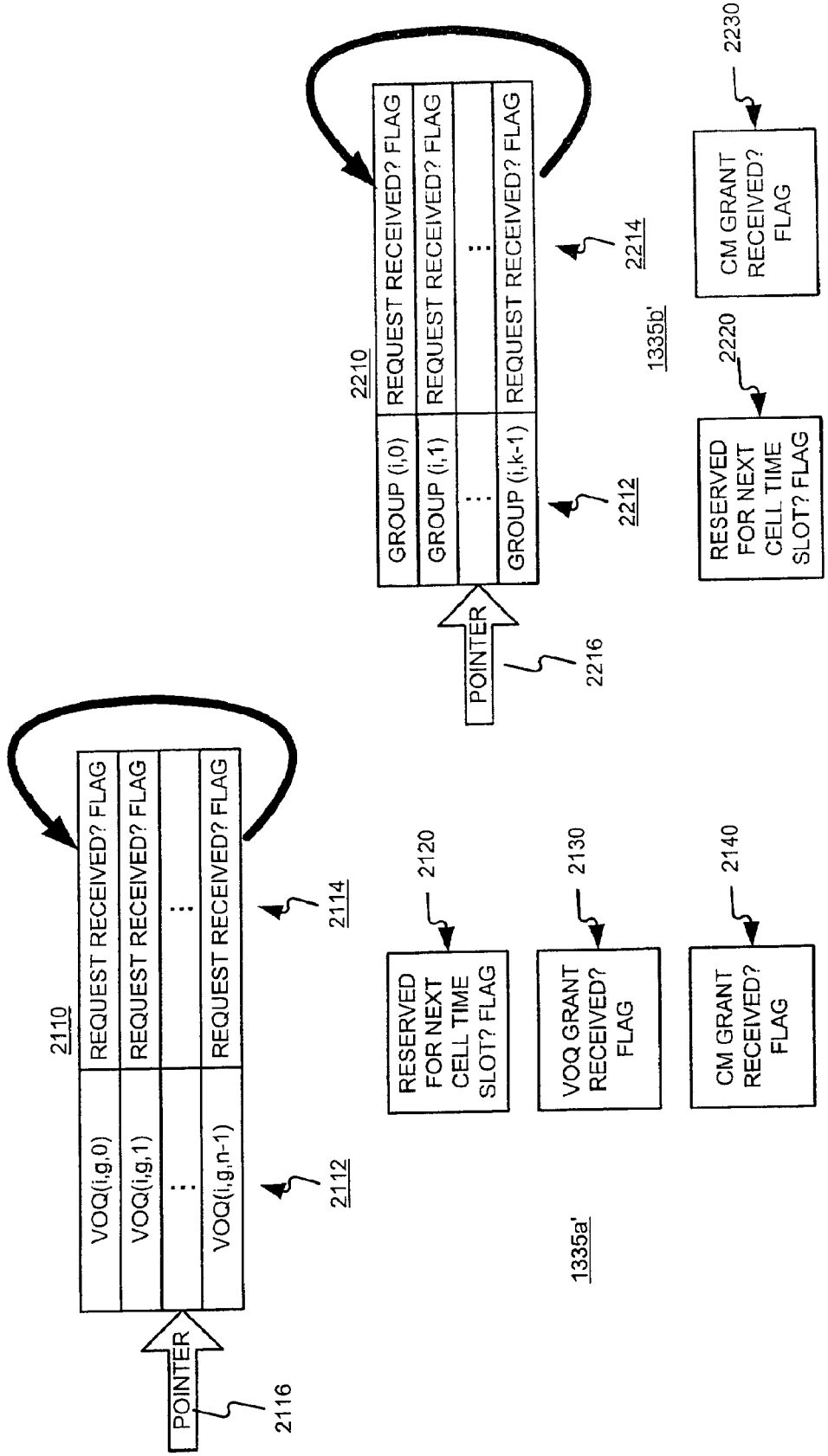

FIG. 21 illustrates exemplary data structures that may be used to store state information for use by a link arbitration operation.

FIG. 22 illustrates exemplary data structures that may be used to store state information for use by a VOQ arbitration operation.

Figure 23:
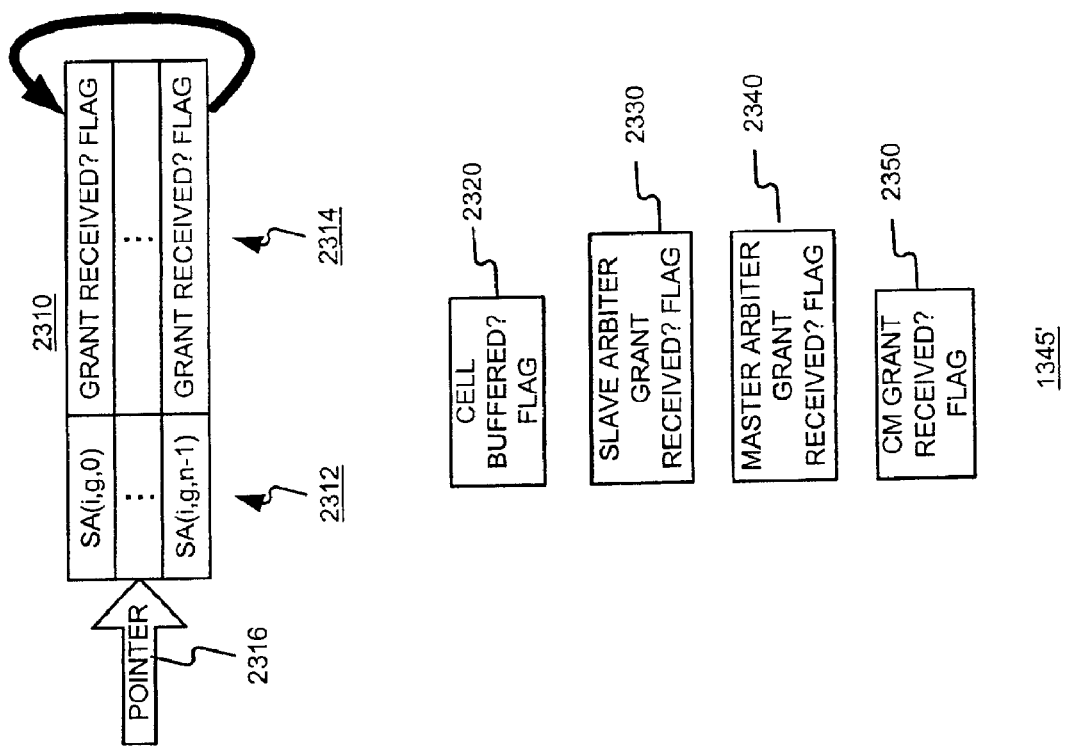

FIG. 23 illustrates exemplary data structures that may be used to store state information for use by a VOQ arbitration operation.

Figure 24:
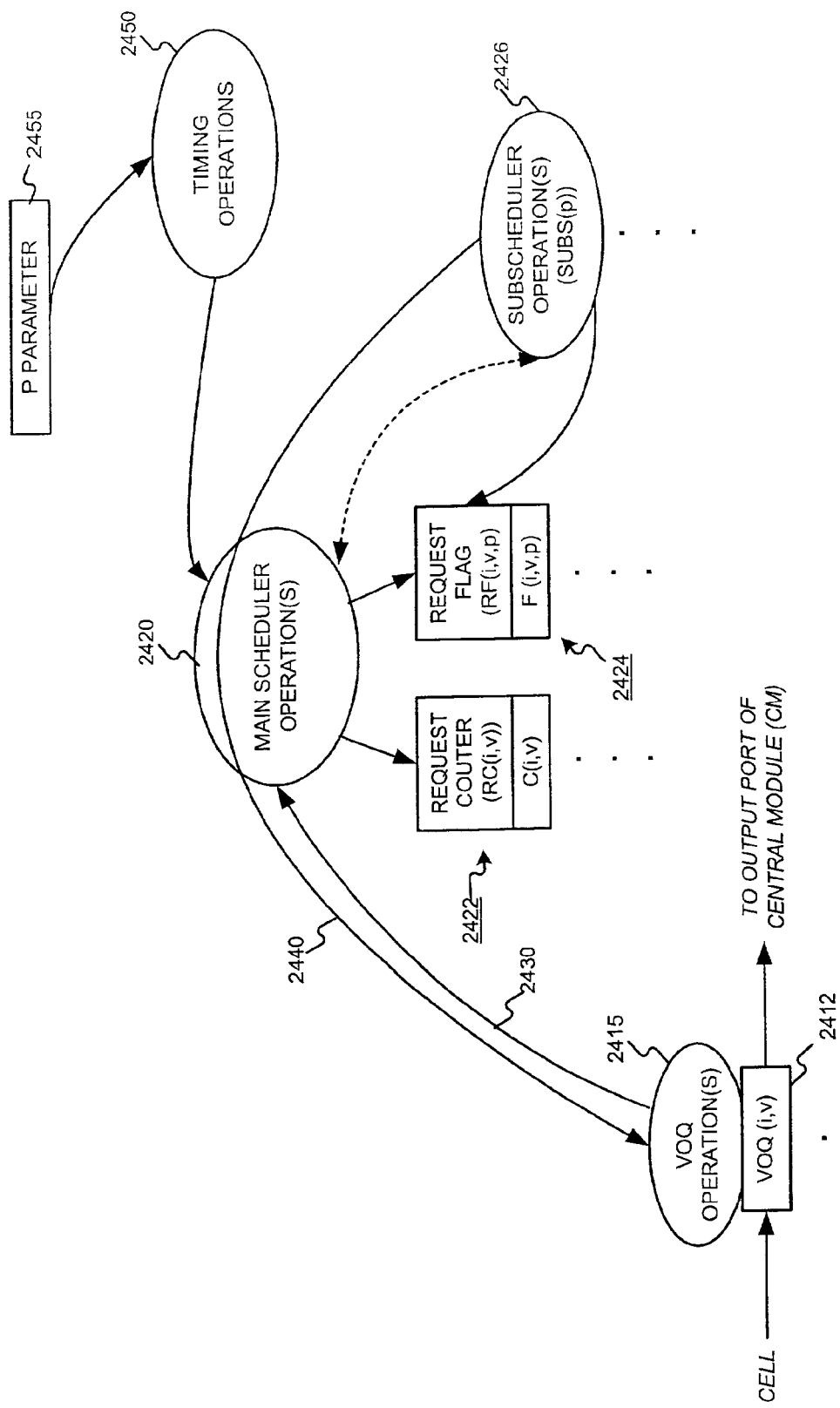

FIG. 24 is a bubble chart illustrating operations that may be performed by an improvement of the present invention.

Figure 25:
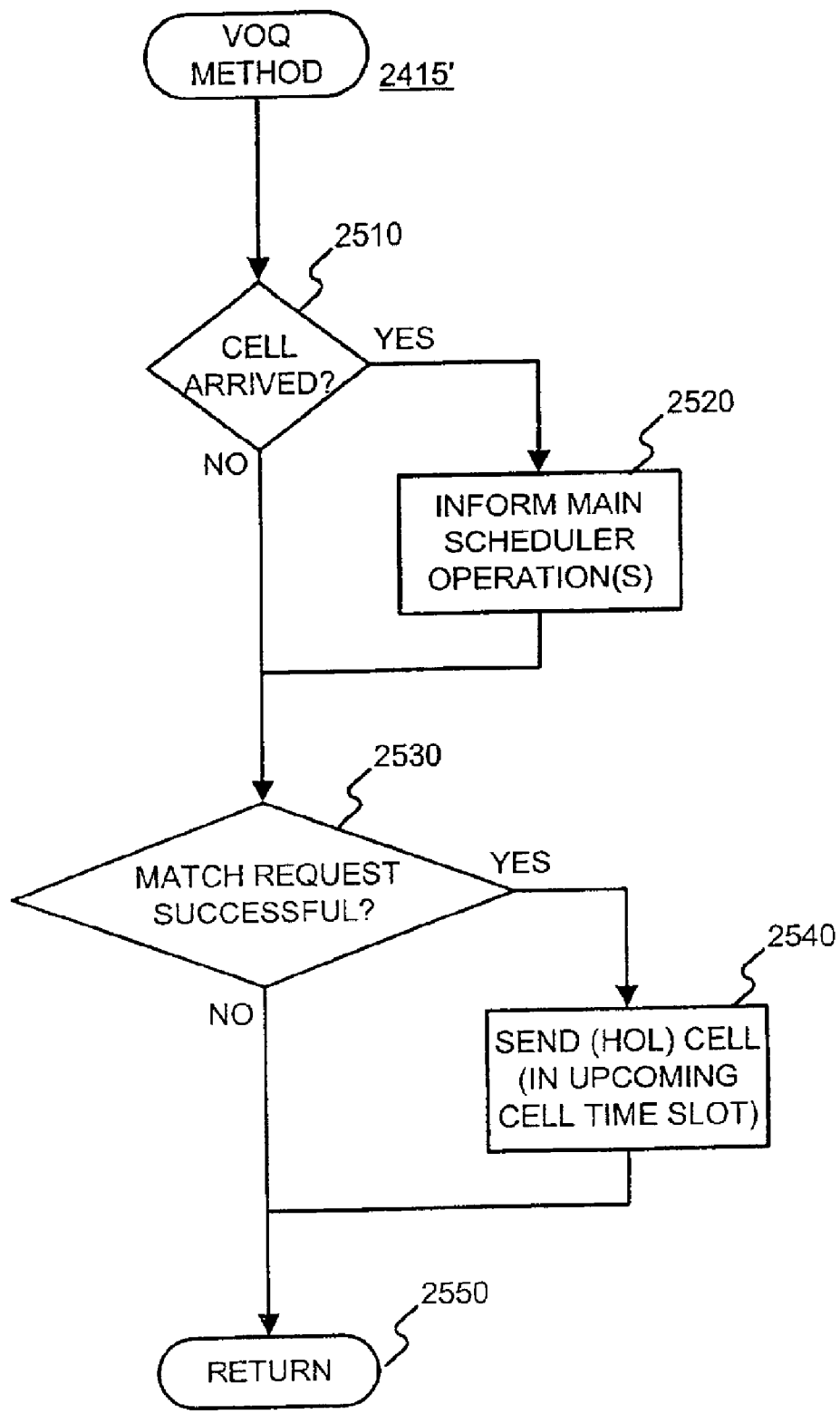

FIG. 25 is a flow diagram illustrating an exemplary virtual output queue method that may be performed under the improvement of the present invention.

Figure 26:
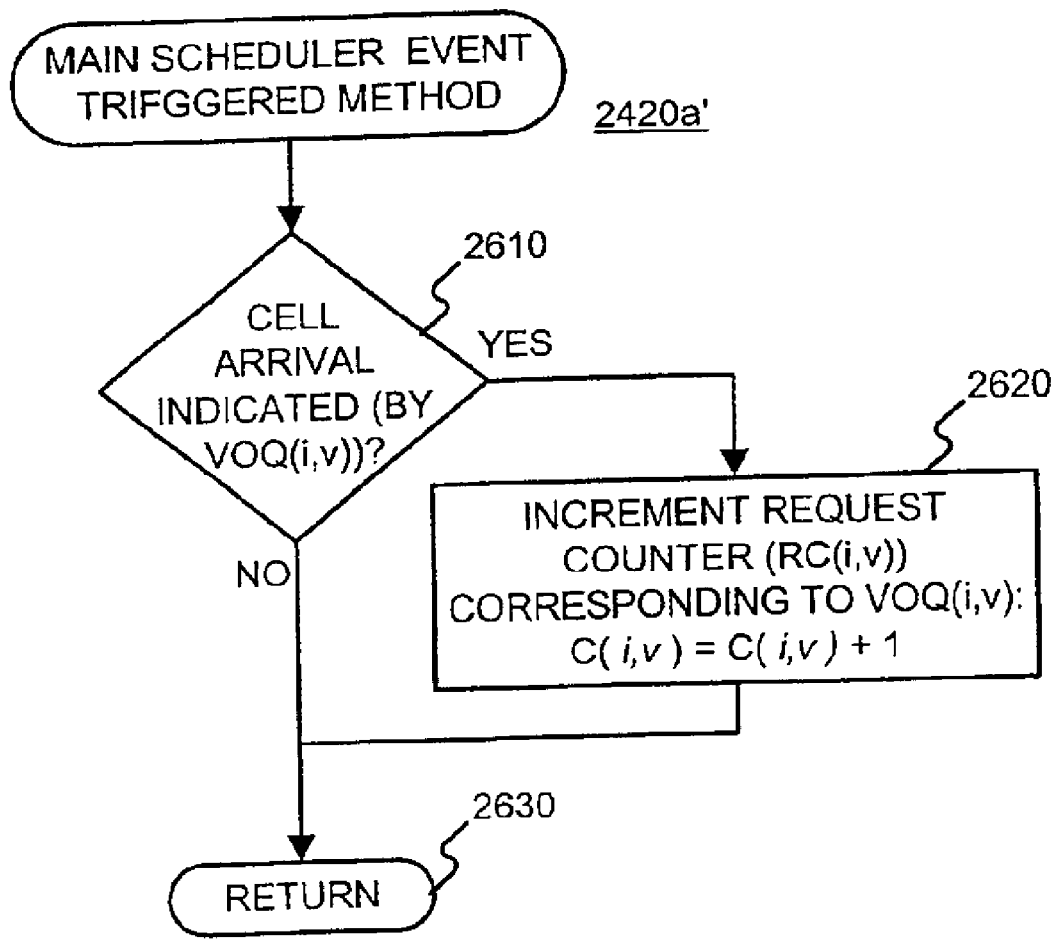
Figure 27:
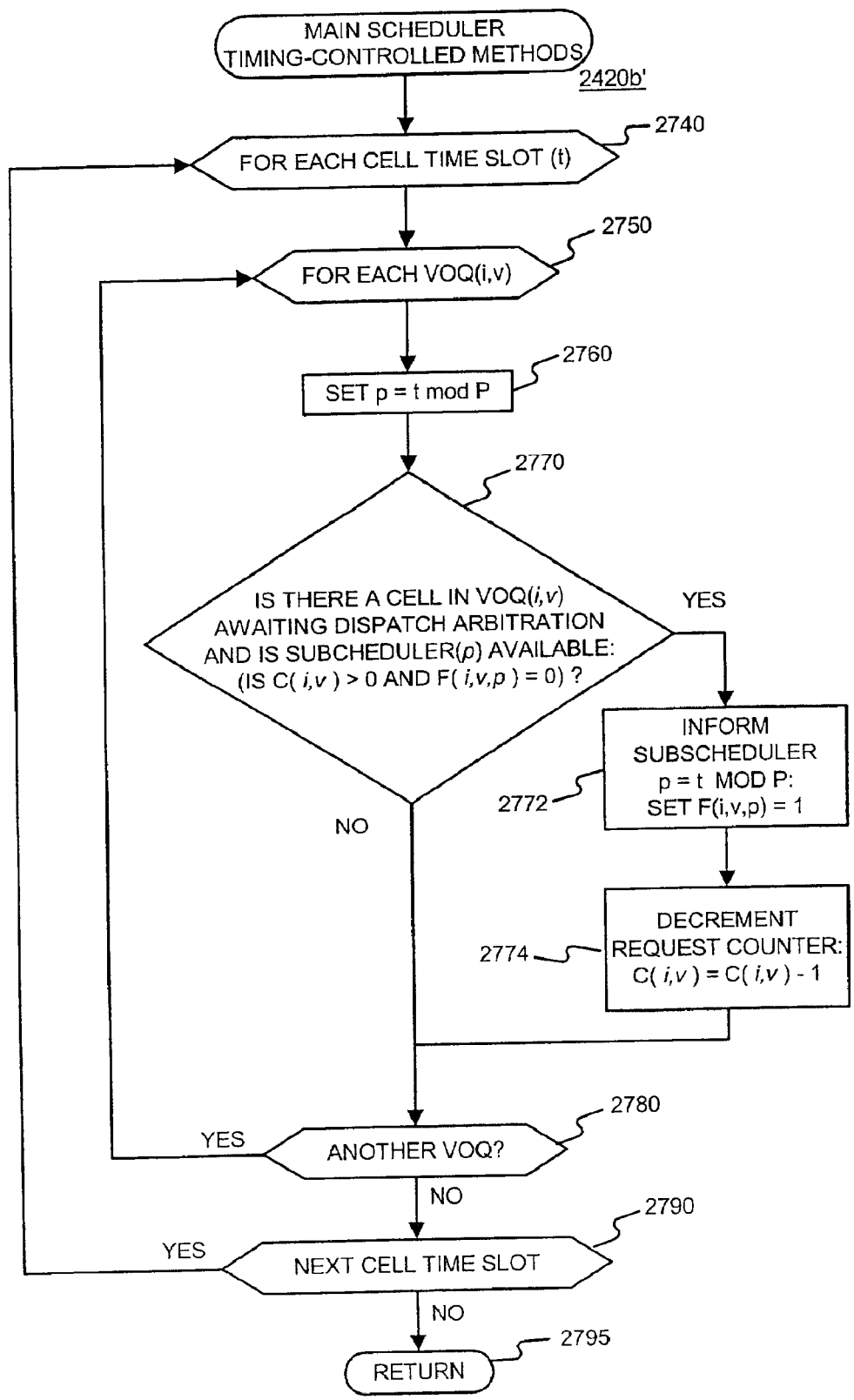

FIGS. 26 and 27 are flow diagrams illustrating exemplary main scheduler methods that may be performed under the improvement of the present invention.

Figure 28:
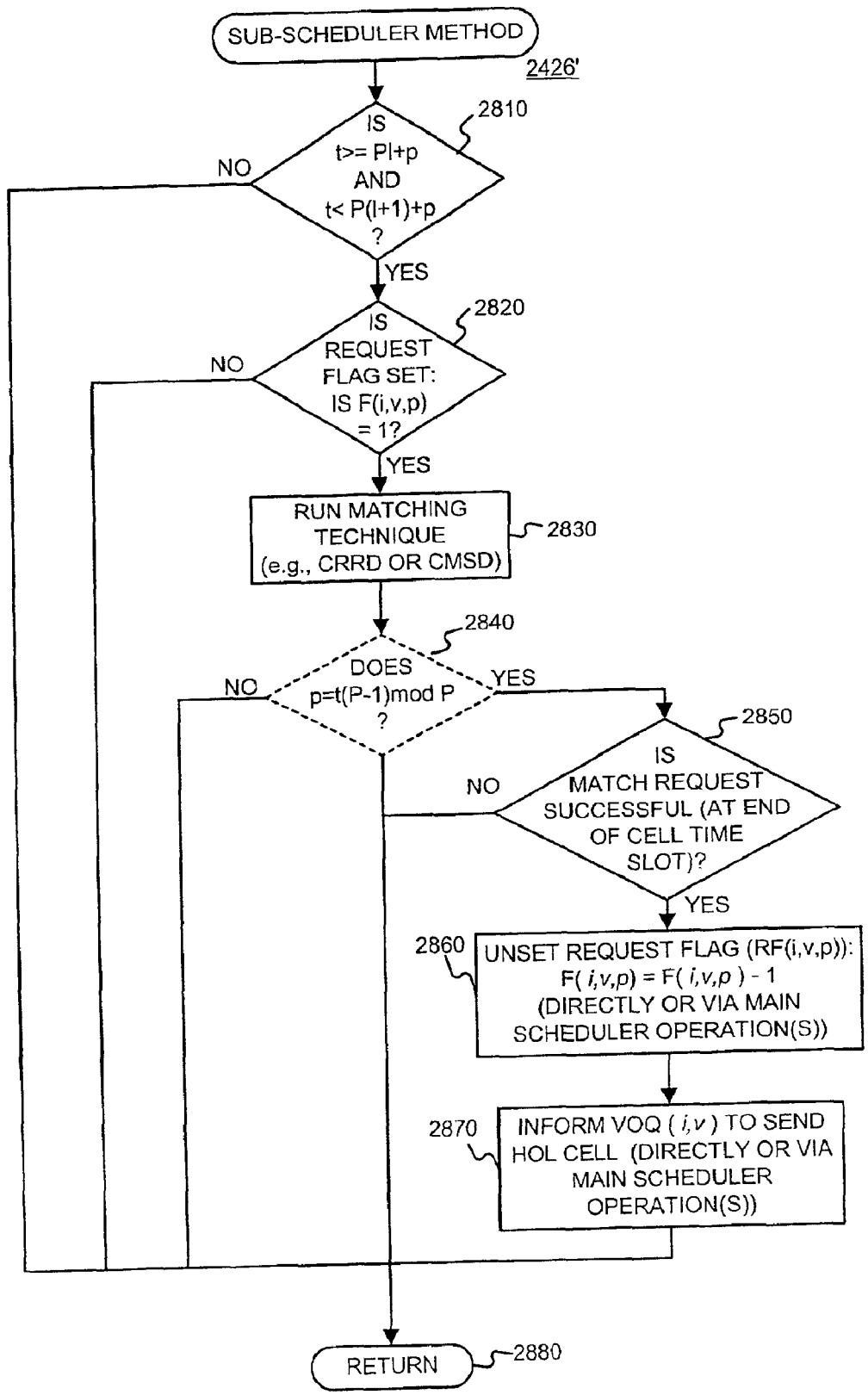

FIG. 28 is a flow diagram illustrating an exemplary matching method that may be performed under the improvement of the present invention.

Figure 29A:
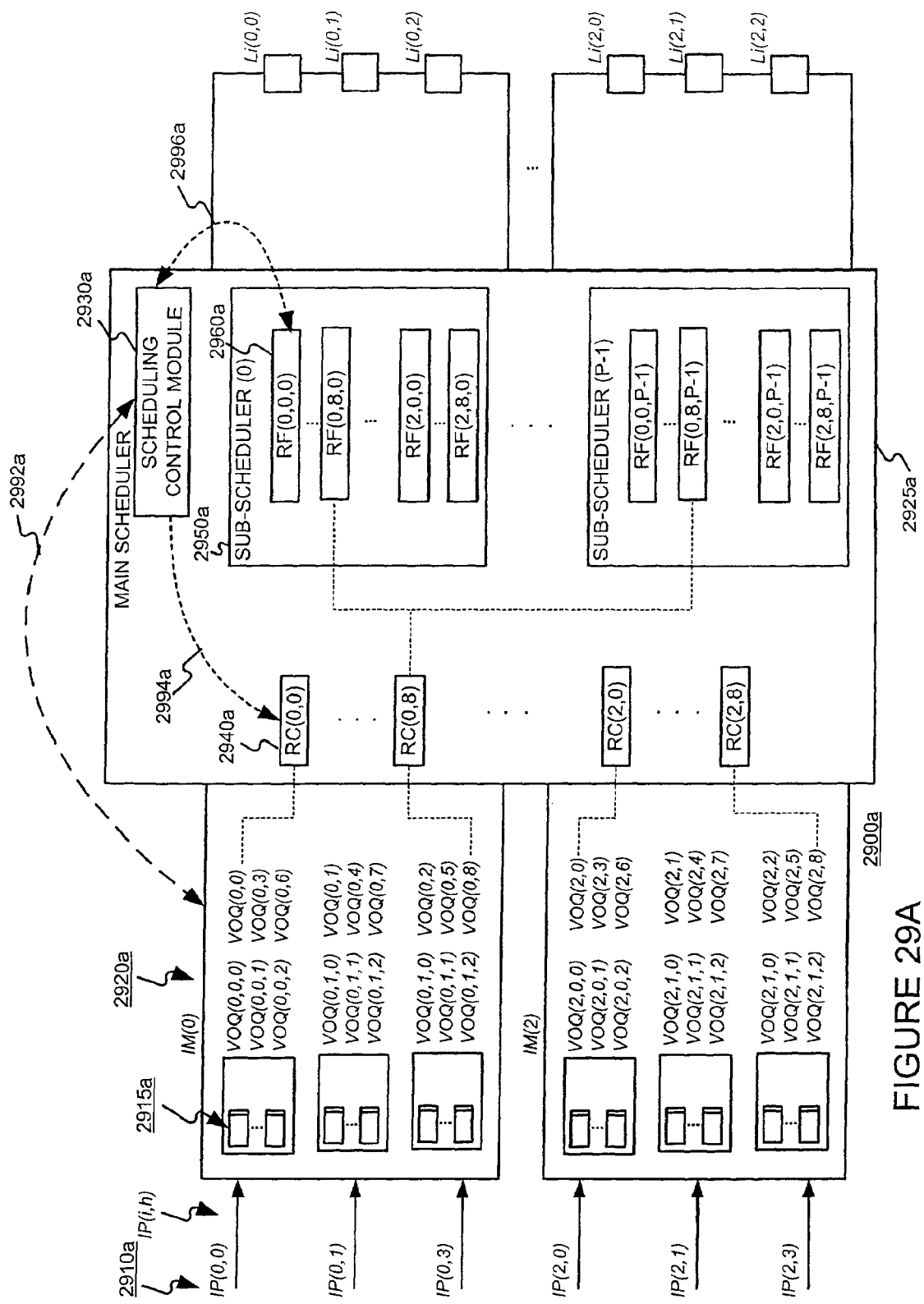
Figure 29B:
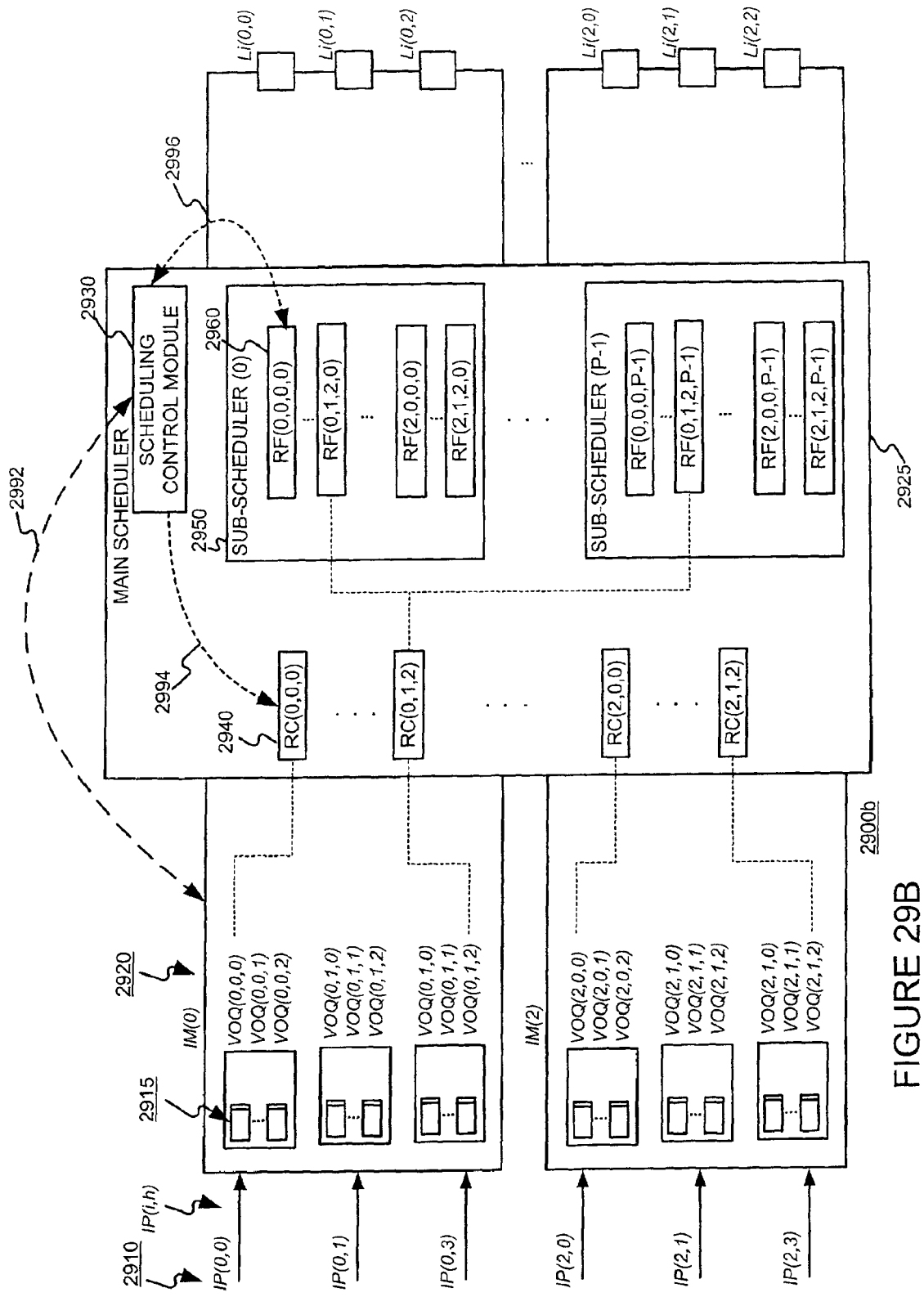

FIGS. 29A and 29B are block diagrams of exemplary apparatus that may be used to perform operations in a centralized version of the improvement of the present invention, in which the sub-schedulers implement CRRD and CMSD matching techniques, respectively.

Figure 30B:
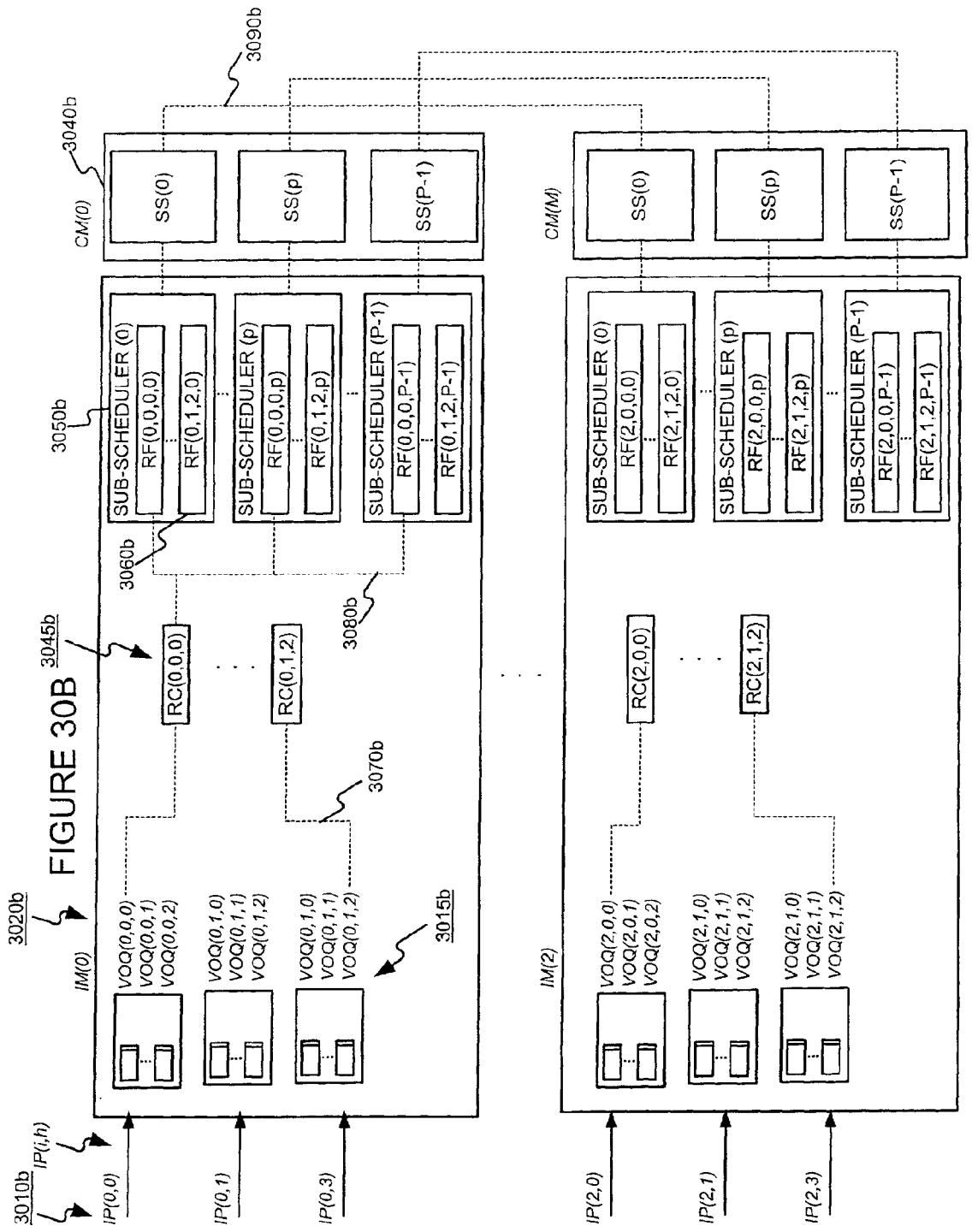

FIGS. 30A and 30B are block diagrams of exemplary apparatus that may be used to perform operations in a distributed version of the improvement of the present invention, in which the sub-schedulers implement CRRD and CMSD matching techniques, respectively.

Figure 31:
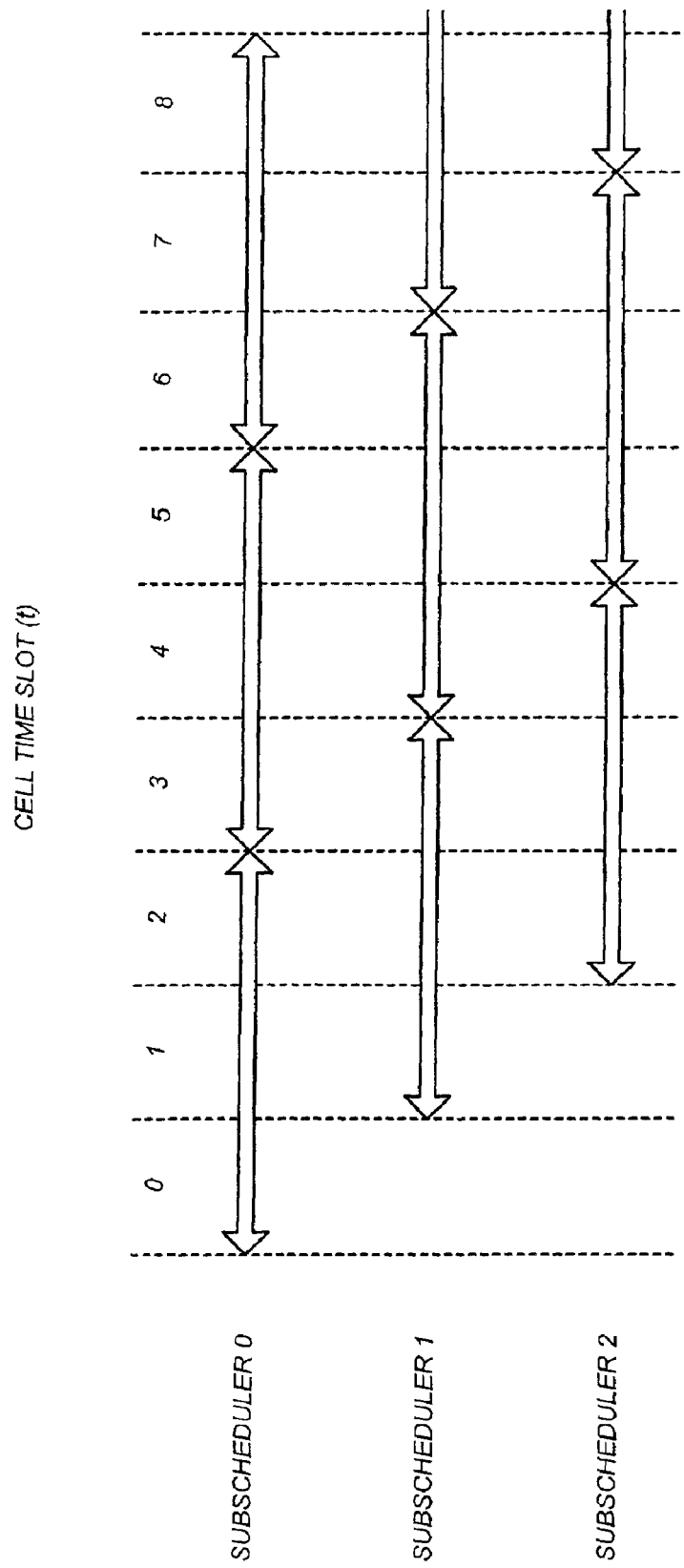

FIG. 31 is a timing diagram illustrating the operation of sub-schedulers in the exemplary embodiments of FIGS. 29 and 30.

§4. DETAILED DESCRIPTION OF THE INVENTION

The present invention involves methods, apparatus and data structures for relaxing the timing needed for scheduling the dispatching cells or packets buffered at the input port of a multi-stage switch. The following description is presented to enable one skilled in the art to make and use the invention, and is provided in the context of particular embodiments and methods. Various modifications to the disclosed embodiments and methods will be apparent to those skilled in the art, and the general principles set forth below may be applied to other embodiments, methods and applications. Thus, the present invention is not intended to be limited to the embodiments and methods shown and the inventors regard their invention as the following disclosed methods, apparatus and materials and any other patentable subject matter to the extent that they are patentable.

§4.1 Exemplary Environment

Figure 1:
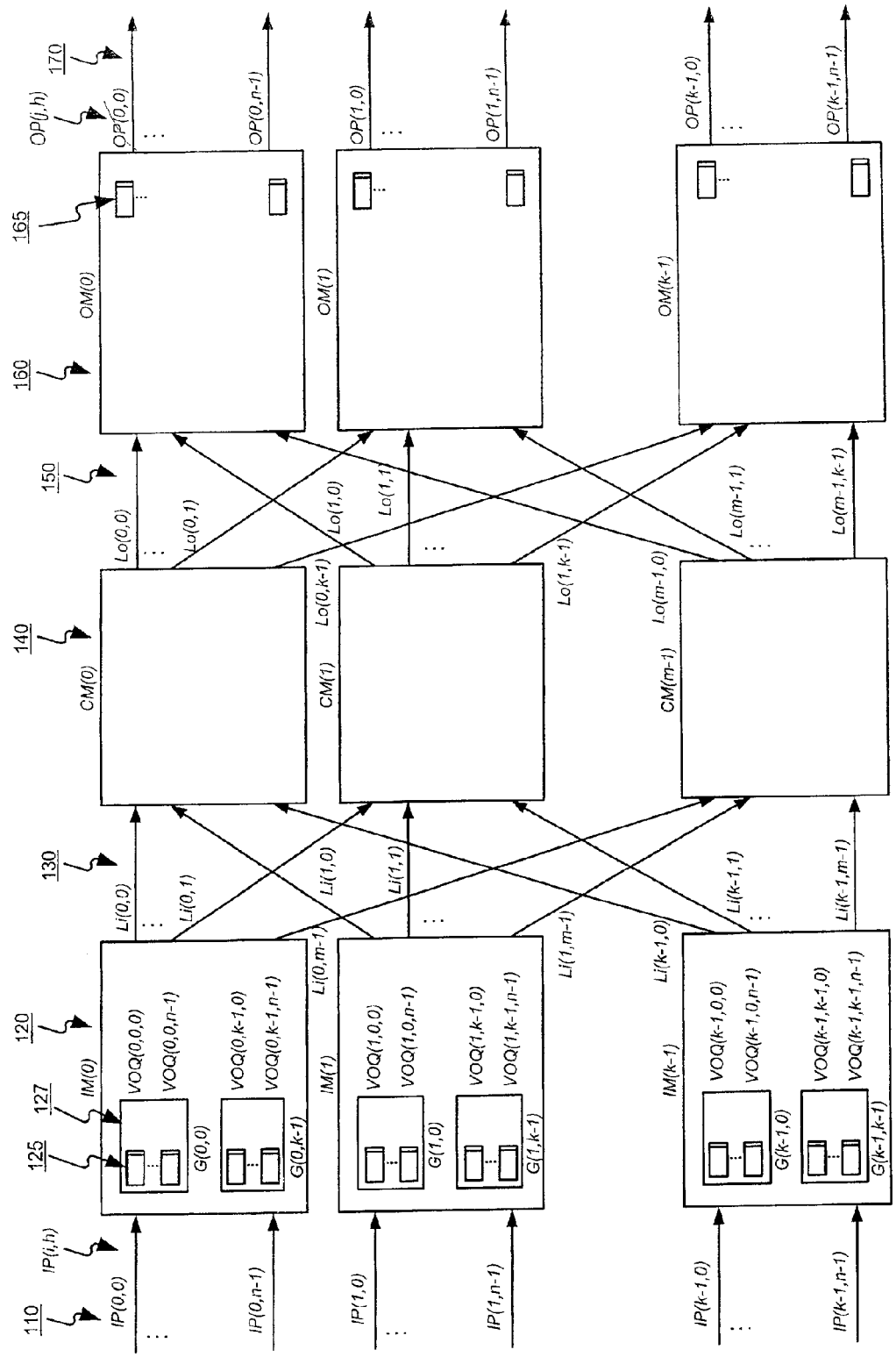
FIG. 1 is a block diagram of an exemplary multiple-stage switch in which the present invention may be implemented.

The present invention may be practiced in a multiple-stage switch, such as a Clos-network switch for example. FIG. 1 is a high-level block diagram of a Clos-network switch 100. The switch 100 basically includes input modules ("IMs") 120 at a first stage, central modules ("CMs") 140 at a second stage, and output modules ("OMs") 160 at a third stage.

As shown in FIG. 1, each input module (IM) 120 includes a number (n) of input ports ("IPs") 110. Thus, if there are a number (k) of input modules (IMs) 120, there will be a total of n*k input ports (IPs) 110. Similarly, each output module (OM) 160 includes a number (n) of output ports ("OPs") 170. Thus, if there are a number (k) of output modules (OMs) 160, there will be a total of n*k output ports (OPs) 170. Each output port (OP) 170 may include a buffer 165 receiving, at most, m cells in one cell time slot. The buffer size should be large enough to avoid cell loss. Each output port (OP) 170 forwards one cell in a first-in-first-out (FIFO) manner, to an associated output line.

A number (m) of central modules (CMs) 140 are arranged between the input modules (IMs) 120 and output modules (OMs) 160. More specifically, as shown, each input module (IM) 120 includes a number (m) of outgoing links $L_i$ 130, each connecting the input module (IM) 120 to a different one of the m central modules (CMs) 140. Similarly, each central module (CM) 140 includes a number (k) of outgoing links $L_o$ 150, each connecting the central module (CM) 140 with a different one of the k output modules (OMs) 160.

Finally, each of the input modules (IM) 120 may include a number of virtual output queues (VOQs) 125, each of the VOQs 125 being associated with an output port (OP) 170. The VOQs 125 are used to eliminate problems caused by head-of-line ("HOL") blocking. A given VOQ 125 can receive at most n cells from n input ports (IPs) 110, and can send one cell to a central module (CM) 140 in one cell time slot. As shown, in each input module (IM) 120, the VOQs are grouped into k groups (G) 127 of n VOQs.

The following terminology:

n=the number of input ports and output ports for each IM and OM, respectively;

k=the number of IMs, as well as the number of OMs;
m=the number of CMs;
IM(i)=the ith input module, where $0 \leq i \leq k-1$;
CM(r)=the rth central module, where $0 \leq r \leq m-1$;
OM(j)=the jth output module, where $0 \leq j \leq k-1$;
IP(i,h)=the hth input port at IM(i), where $0 \leq h \leq n-1$;
OP(j,h)=the $h^{th}$ output port at OM(j), where $0 \leq h \leq n-1$;
VOQ(i,j,h)=the VOQ in IM(i) that stores cells destined for OP(j,h);
VOQ(i,v)=the VOQ at IM(i) that stores cells destined for OP(j,h), where v=hk+j and $0 \leq v \leq nk-1$;
G(i,j)=VOQ group of IM(i) that includes n virtual output queues VOQ(i,j,h);
$L_i$ (i,r)=the link between IM(i) and CM(r); and
$L_o$ (r,j)=the link between CM(r) and OM(j),
may be used in the specification that follows.

The first stage of the switch 100 may include k input modules (IMs) 120, each of which has an n-by-m dimension. The second stage of the switch 100 may include m central modules (CMs) 140, each of which has a k-by-k dimension. The central modules (CMs) 140 are preferably buffer-less, thereby avoiding the cell out-of-sequence problems introduced in §1.2.2.4 above. The third stage of the switch 100 may include k output modules (OMs) 160, each of which has an m-by-n dimension.

A first embodiment of the present invention is described in §4.2 below. Then, a refined embodiment of the present invention is described in §4.3. Finally, an improvement which may use either the first embodiment, or the refined embodiment, is described in §4.4 below.

§4.2 First Embodiment

§4.2.1 Functions that May Be Performed

A first aspect of the present invention may function to provide a scalable multiple-stage switch, able to operate at high throughput, without needing to resort to speeding up the switching fabric and without needing to use buffers in the second stage. Accordingly, the present invention may avoid the cost of speed-up and the cell out-of-sequence problems that may occur when buffers are used in the second stage. The present invention may do so using a multiple phase cell dispatch scheme, each phase using a simple and fair (e.g., round robin) arbitration methods. More specifically, the present invention may function to provide a multiple phase cell dispatch scheme in which VOQs of an input module and outgoing links of the input module are matched in a first phase, and in which an outgoing link of an input module is matched with an outgoing link of a central module in a second phase. The arbiters become desynchronized under stable conditions which contributes to the switch's high throughput characteristic.

The present invention may also function to relax a dispatch scheduling time and reduce the complexity of interconnections between arbiters. The present invention may do so by arranging output link arbiters as master and slave arbiters, operated in a hierarchical manner. More specifically, the VOQs of an input module may be arranged into groups. For each outgoing link of the input module, a master arbiter may select a group of VOQs from among a number of candidate groups, and a slave arbiter may select a VOQ from among the VOQs belonging to the selected group.

Finally, the present invention may function to relax the time (e.g., from less than one cell time slot to more than one cell time slot) needed to schedule a cell dispatch. The present invention may do so by introducing more than one sub-scheduler, each of which is allowed to take more than one time slot for dispatching, although one of the sub-schedulers provides a dispatching result within each cell time slot.

§4.2.2 Exemplary Operations

Figure 2:
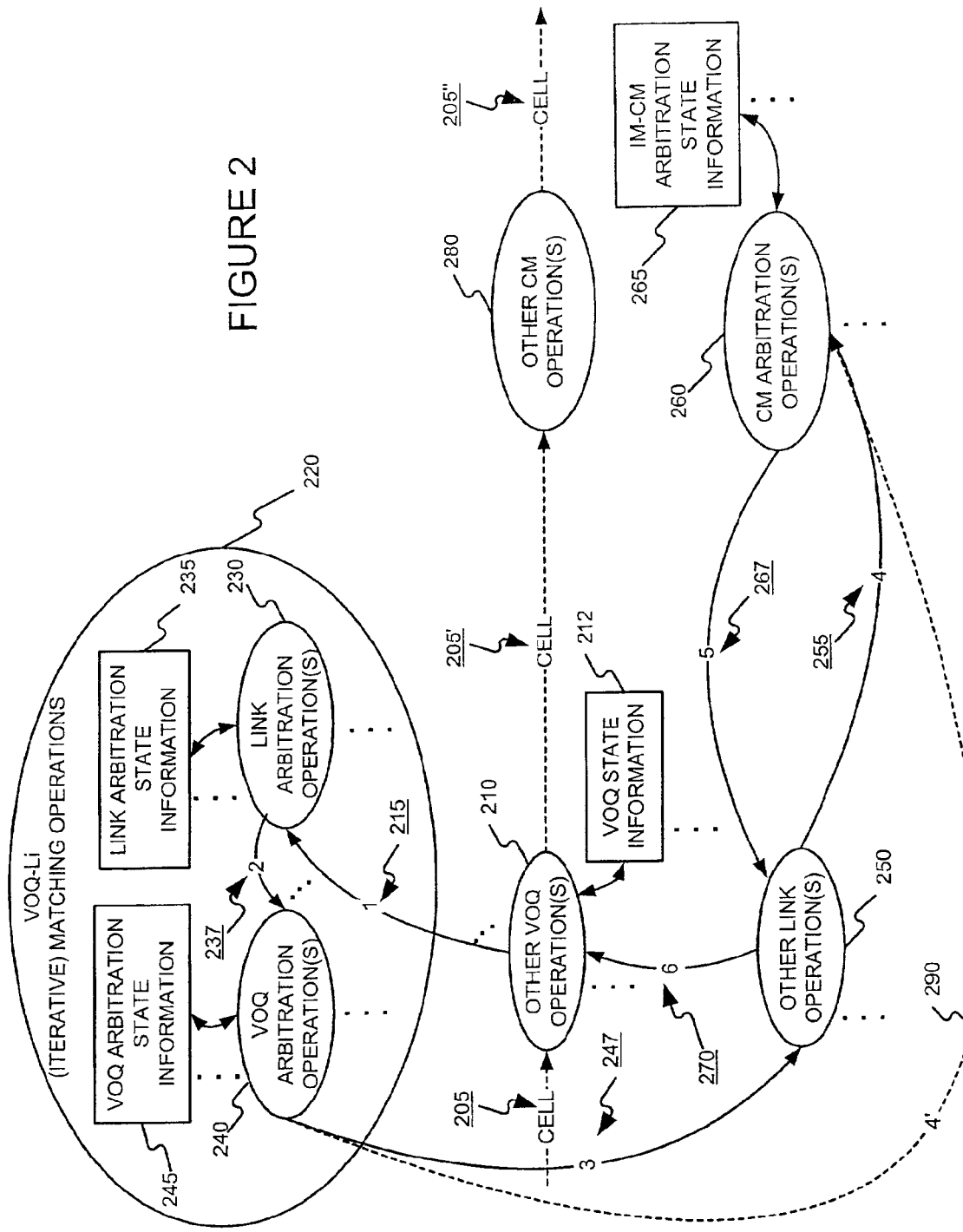
FIG. 2 is a bubble diagram of operations that may be performed by the present invention.

FIG. 2 is a bubble chart illustrating operations that may be performed in accordance with the present invention. When a cell 205 arrives at a VOQ, a VOQ (non-arbitration) operation 210 may broadcast (as indicated by ellipses) a request 215 to a plurality of link arbitration operations 230, each associated with a given outgoing link 130 of the input module (IM) 120. The request 215 is indicated as a first communication ("1").

Based on link arbitration state information (e.g. a round-robin pointer) 235, in each case, the link arbitration operations 230 will select one of the candidate VOQs that submitted a request 215. It 230 will then send a grant 237 to an arbitration operation 240 of the selected VOQ. The grant 237 is indicated as a second communication ("2"). The link arbitration operation 230 may also send declines (not shown) to non-selected VOQs, though such a communication(s) is not necessary.

Since the VOQ operation 210 broadcasts a request (e.g., to all the outgoing links of the input module), it's corresponding arbitration operation 240 may receive more than one grant (i.e., one grant each from more than one outgoing link arbitration operation 230). Accordingly, the VOQ arbitration operation 240 uses VOQ arbitration state information (e.g., a round robin pointer) 245 to select one of the outgoing links from those candidates providing a grant. The VOQ arbitration operation 240 then communicates a grant 247 to link operations 250 associated with the selected link. This grant is indicated as third communication ("3").

At this point, a cell at a VOQ may have been (i.e., if it won an arbitration) matched with an outgoing link 130 of the input module (IM) 120. These operations related to generating such a VOQ-$L_i$ match may be referred to as the first phase of the cell dispatch scheduling invention. This first phase can be summarized as two steps. In the first step, at each time slot, non-empty VOQs send (e.g., multicast, or preferably broadcast) requests to use any one of a number of outgoing links $L_i$ (of an input module (IM)) in a next cell time slot. In the second step, each outgoing link $L_i$ sends a grant to a selected VOQ. If a given VOQ receives more than one grant, it may select one of the outgoing links from which it received a grant. Accordingly, the input module (IM) selects at most m request out of n*k non-empty VOQs. If these steps can be repeated within a cell time slot, multiple iterations can be run such that non-empty VOQs failing to be matched with an available outgoing link may retry during a next iteration. If multiple iterations are run, the VOQs and/or outgoing links $L_i$ may maintain state information related to whether they are available or reserved for the next cell time slot.

Still referring to FIG. 2, a link operation 250 associated with each outgoing link 130 matched with a VOQ, may submit a request 255 to a central module (CM) arbitration operation 260. The central module (CM) is associated with the outgoing link ($L_i$). Each central module will have k arbiters, each corresponding to an output module (OM). The arbiter serving the request will correspond with the output module (OM) defined by the non-empty VOQ that is matched with the outgoing link $L_i$ that originated the request. This request 255 is indicated as a fourth communication ("4"). Alternatively, the VOQ selecting an outgoing link can originate such a request (4') as indicated by dashed line 290.

Each CM arbitration operation 260 may select one of the candidate requesting outgoing links 130 based on IM-CM arbitration state information 265. It 260 then communications a grant 267 back to the link operation 250 associated with the selected one of the candidate requesting output links 130. This grant 267 is indicated as a fifth communication ("5").

The link operation 250 may then send an indication 270 to the VOQ operation 210 that it may send (i.e., dispatch) its head-of-line ("HOL") cell. This indication 270 is indicated as a sixth communication ("6"). The various arbitration operations 230, 240, 260 may update their state information 235, 245, 265. Further, other state information 212 may be updated by its associated operation 210.

Various alternatives of when state information is updated will be apparent to those skilled in the art. For example, each of the outgoing link arbitration operation(s) 230 may employ a pointer (to VOQ identifiers), updated in a round-robin manner. The pointer may be updated (a) when a VOQ request is granted, (b) when a VOQ grant is received, or, preferably (c) when a central module grant is received. In servicing VOQs, it is possible for the arbitration operation 230 to pass over empty (i.e., non-requesting) VOQs. Therefore, when the pointer is updated, it can (a) go to a next VOQ from the VOQ pointed to at the start of the cell time slot, or (b) go to a next VOQ from the VOQ selected.

Similarly, each of the VOQ arbitration operation(s) 240 may employ a pointer (to outgoing links), updated in a round-robin manner. The pointer may be updated (a) when a grant is received from an outgoing link $L_j$, (b) when an outgoing link is selected by the VOQ arbitration operation, or (c) when a central module grant is indicated. It is possible for the arbitration operation 240 to pass over non-granting outgoing links $L_j$. Therefore, when the pointer is updated, it can (a) go to a next outgoing link $L_j$ from the outgoing link $L_j$ pointed to at the start of the cell time slot, or (b) go to a next outgoing link $L_j$ from the selected outgoing link $L_j$.

Finally, each of the CM arbitration operation(s) 260 may employ a pointer (to outgoing links $L_j$), updated in a round-robin manner. The pointer may be updated upon a grant by the CM arbitration operation 260. In servicing outgoing links, it is possible for the CM arbitration operation to 260 to pass over non-requesting outgoing links $L_j$. Therefore, when the pointer is updated, it can (a) go to a next outgoing link $L_j$ from the outgoing link $L_j$ pointed to at the start of the cell time slot, or (b) go to a next outgoing link $L_j$ from the selected outgoing link $L_j$.

Having described various operations that may be performed in accordance with the present invention, exemplary apparatus, methods and data structures for implementing such operations are now described in §4.4 below.

§4.2.3 Exemplary Methods, Data Structures, and Apparatus for Performing the Exemplary Operations Exemplary methods and data structures for implementing various operations of the present invention are described in §4.4.1. Then, exemplary apparatus for implementing various operations of the present invention are described in §4.4.2.

§4.2.3.1 Exemplary Methods and Data Structures

Figure 3:
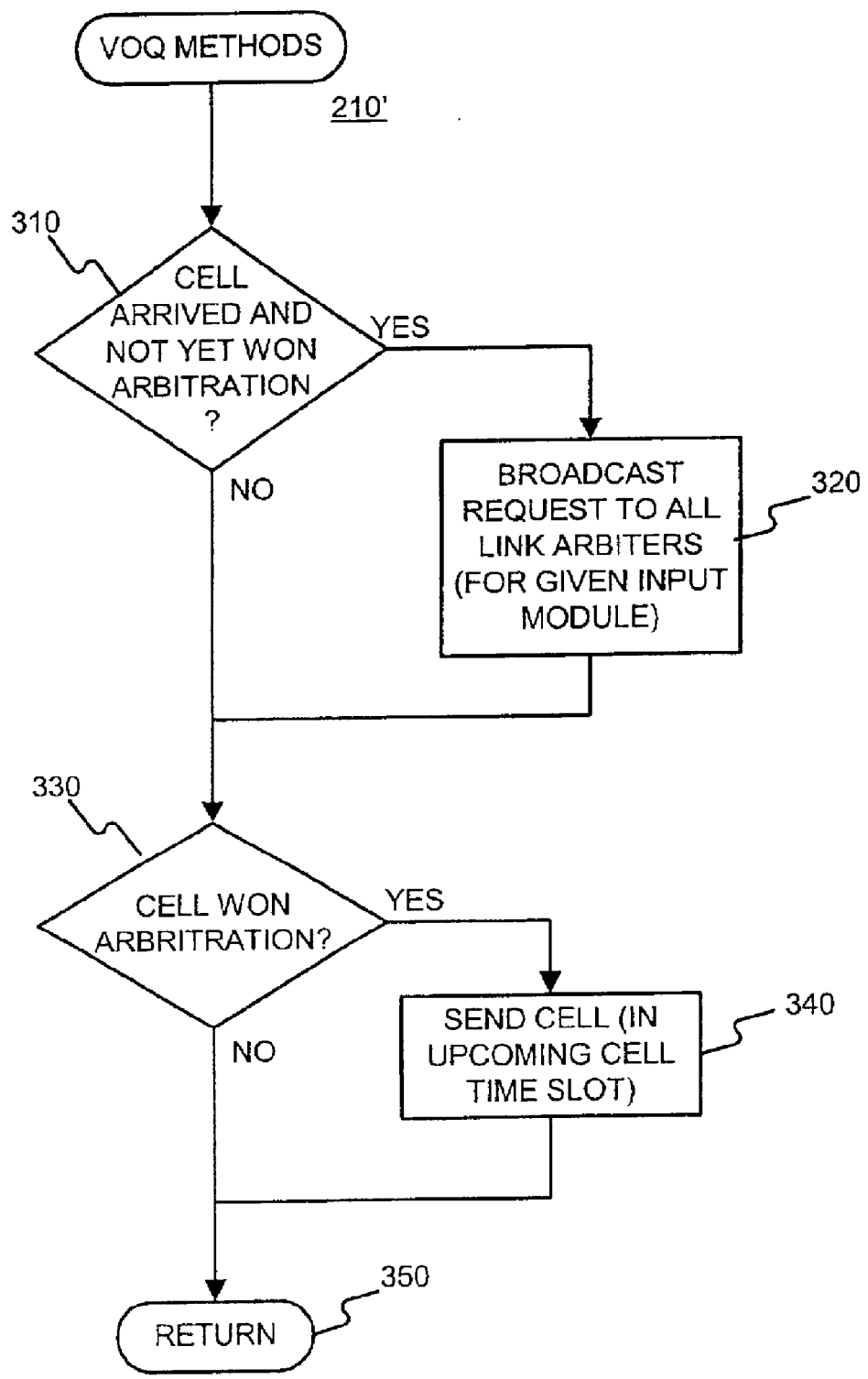
FIG. 3 is a flow diagram illustrating an exemplary virtual output queue method that may be performed under the present invention.

FIG. 3 is a high-level flow diagram of an exemplary method 210' for effecting various VOQ operations 210. Referring to conditional branch point 310 and block 320, if a cell has arrived at the VOQ but has not yet won arbitration (the VOQ is "non-empty"), a request is broadcast to all link arbiters (or link arbitration operations 230) of the input module (IM) 120 to which the VOQ belongs. (Recall, e.g., the first communication 215 of FIG. 2.)

Still referring to FIG. 3, as indicated by conditional branch point 330 and block 340, if the cell (or the VOQ in general) won arbitration (e.g., all rounds of arbitration—through to the central module 140) (Recall, e.g., the sixth communication 270 of FIG. 2.), the cell is sent (e.g., in the upcoming cell time slot). Although not shown in FIG. 3, these steps may be continuously run. State information 212 of the VOQ may be updated at this point. Alternatively, blocks 320 and 340 may be triggered upon the occurrence of the relevant events.

Figure 4:
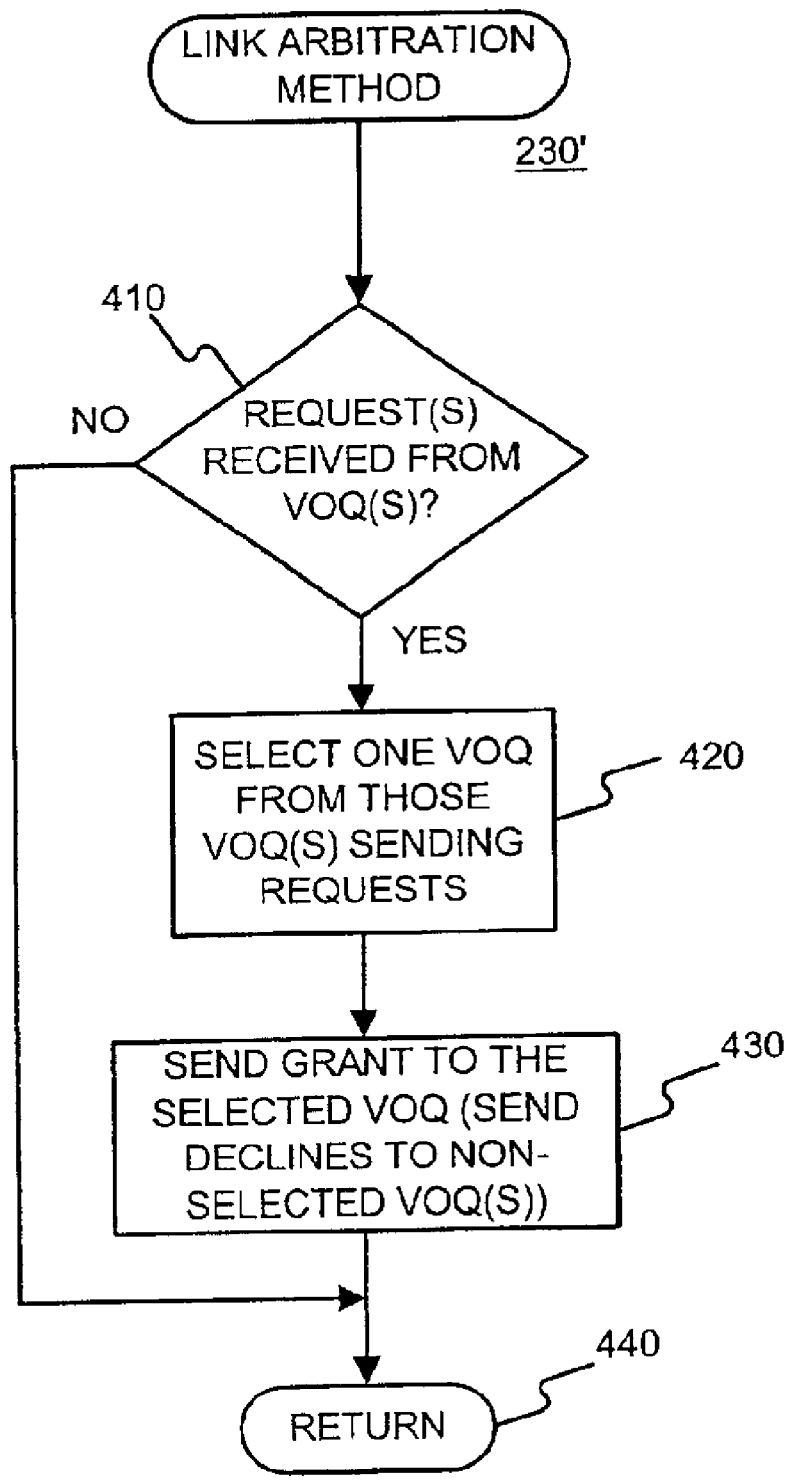
FIG. 4 is a flow diagram illustrating an exemplary link arbitration method that may be performed under the present invention.

FIG. 4 is a high-level flow diagram of an exemplary method 230' for effecting a link arbitration operation 230. Referring to conditional branch point 410, it is determined whether or not a request or requests were received from a VOQ or VOQs. If not, the method 230' is left via RETURN node 440. If, on the other hand, such a request or requests is received, the rest of the method 230' is effected. Thus, the receipt of request(s) from VOQ(s) may serve to trigger the main steps of the method 230'.

As indicated by block 420, the link arbitration method selects one VOQ from among those sending requests. (Recall, e.g., 230 and 235 of FIG. 2.) The arbitration 420 may be done based on the position of a pointer which is updated in accordance with a round-robin discipline. The pointer may move through all of the VOQs. If the pointer currently points to a VOQ that did not send a request, it may move to a next VOQ, repeatedly, until it points to a VOQ that submitted a request. Referring back to FIG. 4, the method 230' then sends a grant to the selected VOQ as indicated by block 430. (Recall, e.g., the second communication 237 of FIG. 2.) The method 230' may then be left via RETURN node 440. Note that state information (e.g., the pointer) may be updated at this point, or, alternatively, may be updated later.

FIG. 10 illustrates exemplary state information 235' that may be used by the link arbitration operation 230'. As shown, a table 1010 may include a plurality of records, each record including a VOQ identifier 1012 and a field 1014 indicating whether or not a request was received (in the current iteration) from the corresponding VOQ. A pointer 1016 may cycle through the records in a round-robin manner. The VOQ identifiers 1012 may be ordered such that a given VOQ within various groups of VOQs are serviced first, before a next VOQ within the various groups of VOQs are serviced. As will be appreciated from the examples described in §4.5 below, such an ordering of the VOQs hastens an advantageous desynchronization of pointers.

The data structure 1020 may be used to indicate whether or not the outgoing link is reserved for a next cell time slot. If so, the link arbitration method 230' can ignore requests from VOQs (and/or inform the VOQs that it is taken). The data structure 1030 may be used to indicate whether or not a VOQ, which was selected, chose the outgoing link in its own arbitration. Finally, data structure 1040 may be used to indicate whether or not a central module request was granted.

Figure 5:
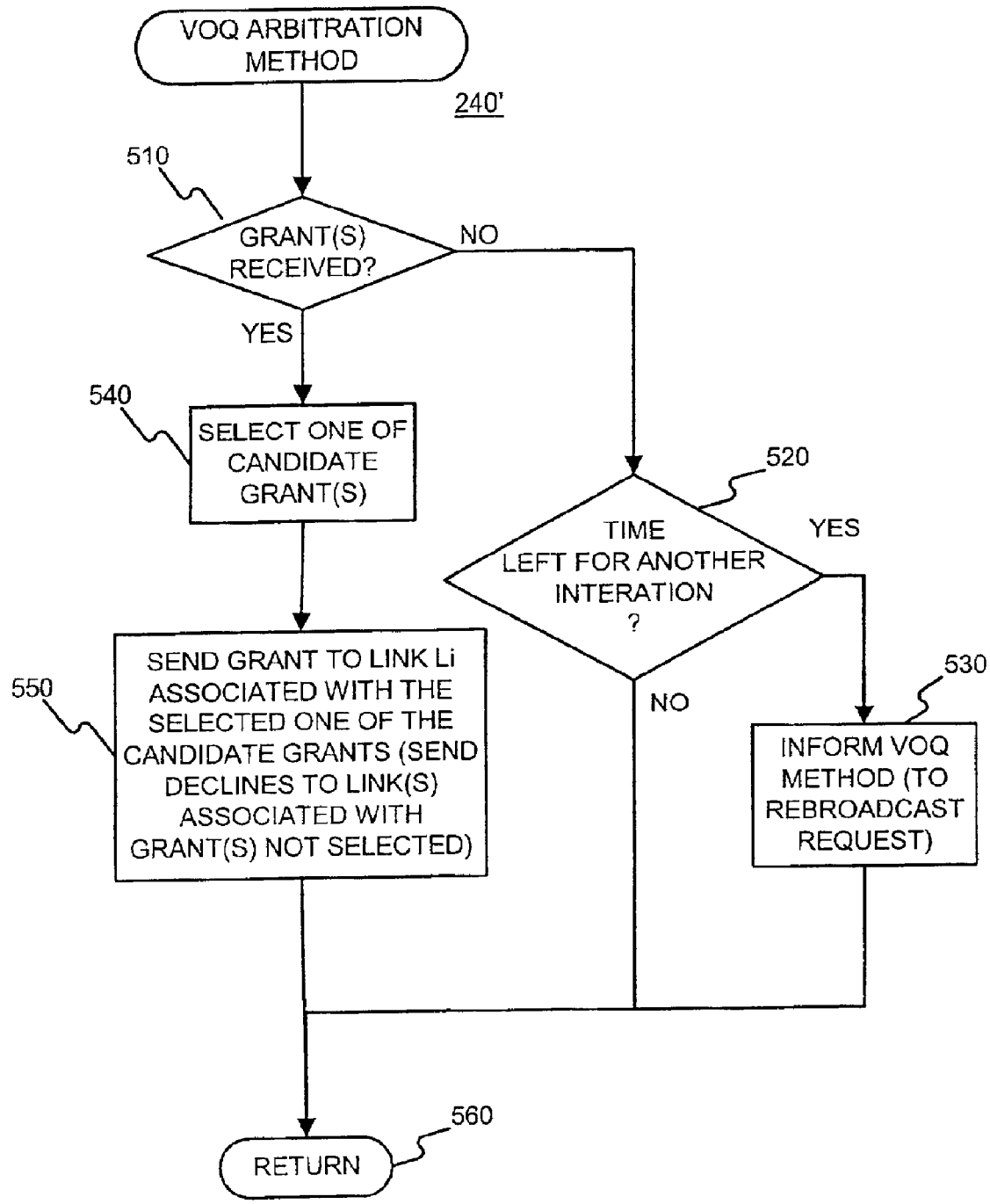
FIG. 5 is a flow diagram illustrating an exemplary virtual output queue arbitration method that may be performed under the present invention.

FIG. 5 is a high-level flow diagram of an exemplary method 240' for effecting a VOQ arbitration operation 240. Referring to conditional branch point 510, it is determined whether or not one or more grants are received from the link arbitration operations 230. (Recall, e.g., the second communication 237 of FIG. 2.) If not, depending on the cell time slot and the time needed for a dispatch determination (i.e., to match a VOQ with a CM), additional iterations (requests) may be possible. Accordingly, as indicated in conditional branch point 520 and block 530, if there is time left for another iteration, the VOQ arbitration method 240' may inform a VOQ operation 210 to rebroadcast a request.

Referring back to conditional branch point 510, if one or more grants are received, the method continues to block 540 where one of the candidate grants is selected. The selection 540 may be done based on the position of a pointer which is updated in accordance with a round-robin discipline. The pointer may move through all of the outgoing links 130. If the pointer currently points to an outgoing link 130 that did not send a grant, it may move to a next outgoing link 130, repeatedly, until it points to an outgoing link 130 that submitted a grant. Then, as shown in block 550, a grant is sent to the outgoing link operation associated with the selected one of the candidate grants. Although not shown, in an alternative method, the VOQ can submit a request, on behalf of the selected outgoing link ($L_i$), to a central module arbitration. (Recall 290 of FIG. 2.) The method 240' may then be left via RETURN node 560.

FIG. 11 illustrates exemplary state information 245' that may be used by the VOQ arbitration operation 240. As shown, table 1110 may include a plurality of records, each record including an outgoing link ($L_i$) identifier 1112 and a field 1114 indicating whether or not a grant was received (in the current iteration) from a corresponding outgoing link. A pointer 1116 may cycle through the records in a round-robin manner.

The data structure 1120 may be used to indicate whether or not a cell is buffered at the VOQ. The data structure 1130 may be used to indicate whether or not a grant(s) was received from an outgoing link(s). If not, no VOQ arbitration operation 240 is needed. Finally, the data structure 1140 may be used to indicate whether or not a central module grant was received (e.g., by a matched outgoing link ($L_i$)). Such information may be used, for example, for updating the pointer 1116.

Figure 6:
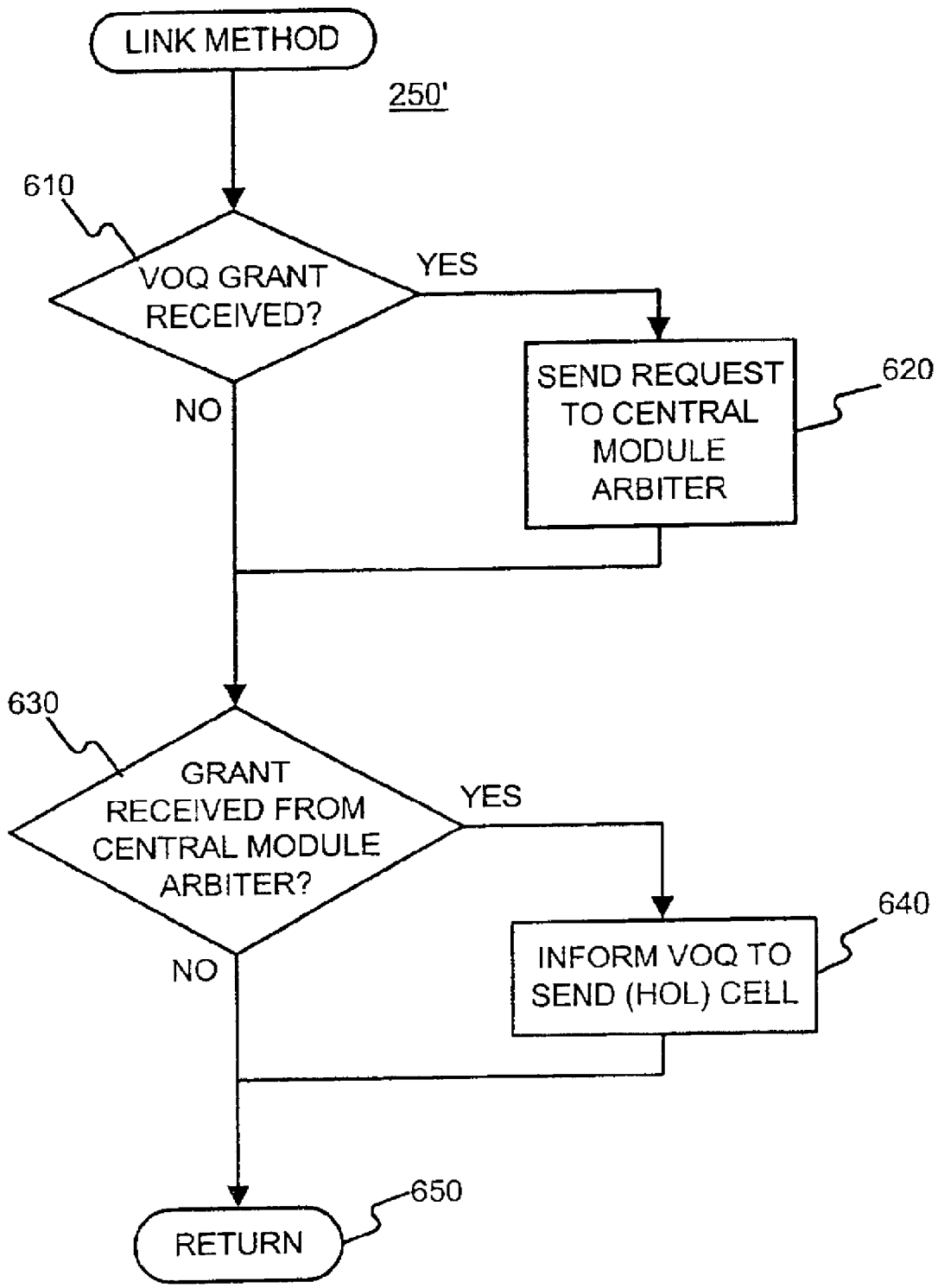
FIG. 6 is a flow diagram illustrating an exemplary outgoing link method that may be performed under the present invention.

FIG. 6 is a high-level flow diagram of an exemplary method 250' for effecting an outgoing link operation 250. Referring to conditional branch point 610, it is determined whether or not a VOQ grant is received. (Recall, e.g., the third communication 247 of FIG. 2.) If so, a request is sent to a central module arbiter, as indicated by block 620. (Recall, e.g., the fourth communication 255 of FIG. 2.) Recall that in one alterative, the VOQ may submit such a request on behalf of the outgoing link ($L_i$).

Referring to conditional branch point 630, it is determined whether or not a grant is received from the central module arbiter. (Recall, e.g., the fifth communication 267 of FIG. 2.) If so, the VOQ (e.g., VOQ operation 210) matched with the outgoing link 130 is informed (so that it can send its head-of-line (HOL) cell. (Recall, e.g., the sixth communication 270 of FIG. 2.) Although not shown in FIG. 6, these steps may be continuously run. Alternatively, blocks 620 and 640 may be triggered upon the occurrence of the relevant events.

Figure 7:
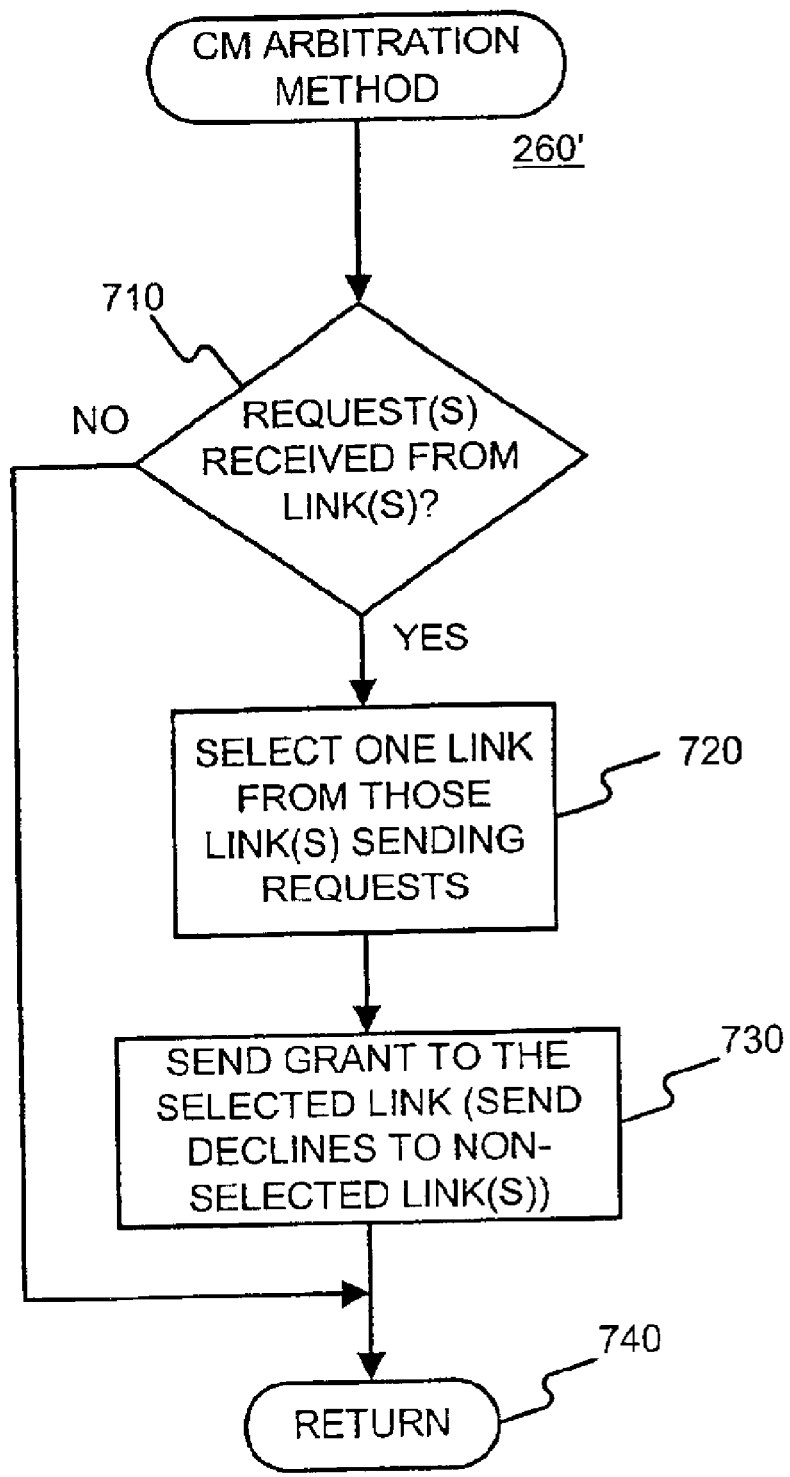
FIG. 7 is a flow diagram illustrating an exemplary central module arbitration method that may be performed under the present invention.

FIG. 7 is a high-level flow diagram of an exemplary method 260' for effecting a central module arbitration operation 260. Referring to conditional branch point 710, it is determined whether or not one or more requests were received from one or more outgoing links ($L_i$) 130. If not, the method 260' may be left via RETURN node 740. If, on the other hand, one or more requests were received from one or more outgoing links 130, the central module arbitration method 260' may select one link from among the candidate links that sent a request, as indicated by block 720. The selection 720 may be done based on the position of a pointer which is updated in accordance with a round-robin discipline. The pointer may move through all of the outgoing links 130. If the pointer currently points to an outgoing link 130 that did not send a request, it may move to a next outgoing link 130, repeatedly, until it points to an outgoing link 130 that submitted a request. Referring to block 730, the method 260' may then send a grant to the selected link. (Recall, e.g., the fifth communication 267 of FIG. 2.) The method 260' may then be left via RETURN node 740.

FIG. 12 illustrates exemplary state information 265' that may be used by the central module arbitration operation 260. As shown, table 1210 may include a plurality of records, each record including an outgoing link ($L_i$) identifier 1212 and a field indicating whether or not a request was received from the corresponding outgoing link ($L_i$). A pointer 1216 may cycle through the records in a round-robin manner. The data structure 1220 may be used to indicate whether or not an outgoing link ($L_i$) was selected in the previous or current cell time slot.

Note that if a request from a matched VOQ-outgoing link is not granted, such a request may be resent to a central-module arbiter in a next cell time slot (e.g., if pointers related to ungranted requests are not updated.)

§4.2.3.2 Exemplary Apparatus

Figure 8:
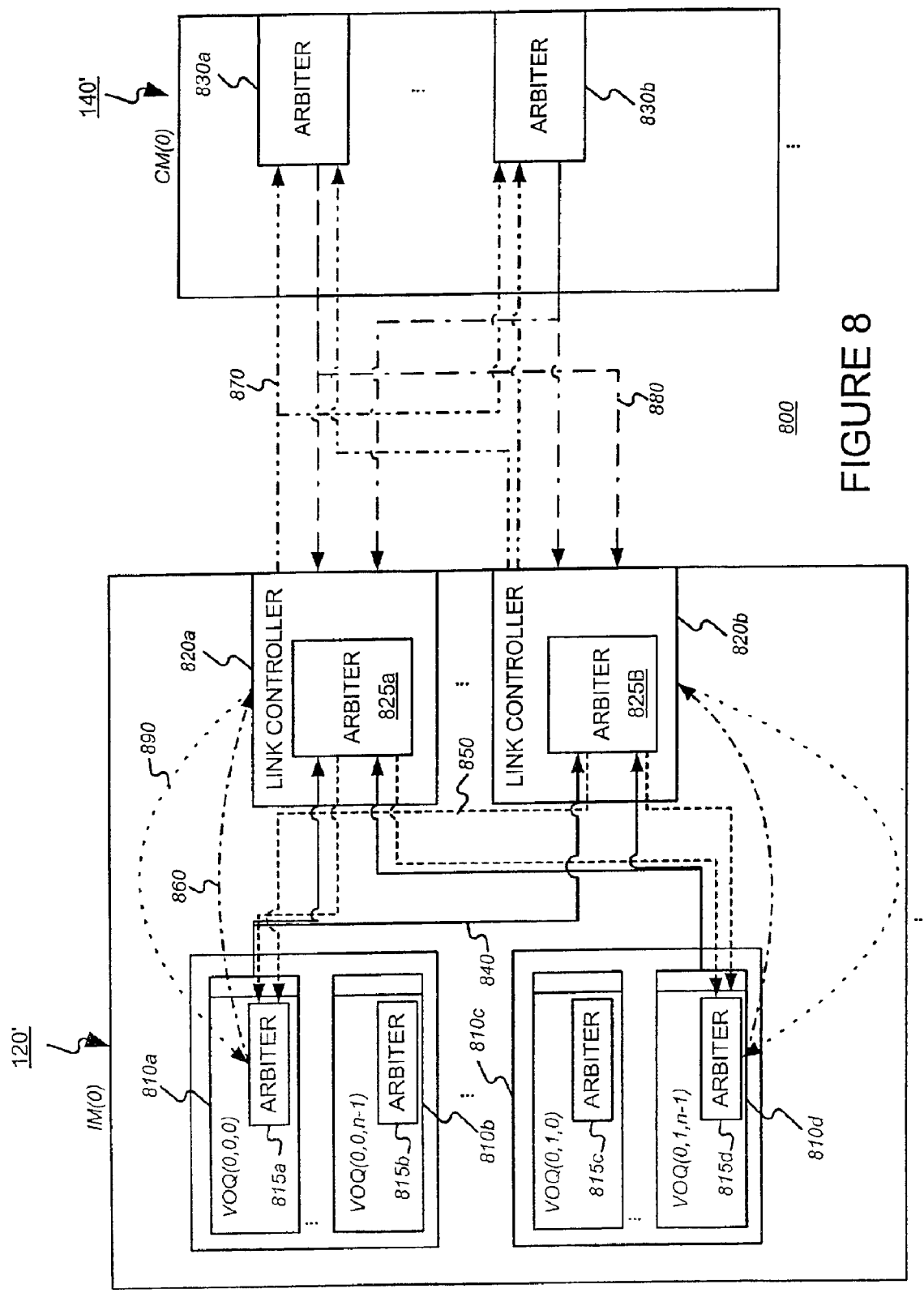
FIG. 8 is a block diagram of components of an exemplary apparatus, as well as inter-component signaling links, that may be used to perform operations under the present invention.

FIG. 8 is a high-level block diagram illustrating exemplary components and interconnections of an exemplary apparatus 800 that may be used to effect at least some of the operations of the present invention. An exemplary input module (IM) 120' may include virtual output queues (VOQs) 810, each of which includes (or more generally, is associated with a corresponding) an arbiter 815, and link controllers 820, each of which includes (or more generally, is associated with a corresponding) an arbiter 825. An exemplary central module 140' may include arbiters 830. The VOQ operations 210 may be effected on the virtual output queues 810. The VOQ arbitration operations 240 may be effected on the VOQ arbiters 815. The link operations 250 may be effected on the link controllers 820. The link arbitration operations may be effected on the link arbiters 825. Finally, the central module arbitration operations may be effected on the arbiters 830. Naturally, such operations may be physically located elsewhere.

Various signaling lines or links may be provided. To simplify the drawing, signaling lines coupled with VOQs 810b and 810c, or their associated arbiters 815b and 815c, are not shown. Signaling lines, depicted by solid lines 840, may be used to broadcast requests from a VOQ 810 to each of the link arbiters 825 in the input module (IM) 120'. (Recall, e.g., the first communication 215 of FIG. 2.) Signaling lines, depicted by short dashed lines 850, may be used by each link controller arbiter 825 to send a grant to a selected VOQ arbiter 815. (Recall, e.g., the second communication 237 of FIG. 2.) Signaling lines, depicted by dot-dash lines 860, may be used by a VOQ arbiter 815 to send a grant to a selected link controller 820. (Recall, e.g., the third communication 247 of FIG. 2.) At this point, a VOQ 810, winning arbitration, may be matched with an outgoing link.

Signaling lines, depicted by double dot-dash lines 870, may be used by the link controllers 820 to send requests to the arbiters 830 of the central modules 140'. Signaling lines, depicted by double dash-dot lines 880, may be used by the central module arbiters 830 to send a grant to a selected link controller 820. Finally, the link controllers 820 may use signaling lines 890, depicted by spaced dotted lines, to inform the appropriate VOQs 810 that they have won arbitration and can therefore send their head-of-line (HOL) cells (e.g., in the upcoming cell time slot).

The VOQs 810, their arbiters 815, the line controllers 820, their arbiters 820, and the arbiters 830 of the central modules 140' may be effected by programmable logic arrays, application specific integrated circuits, and/or microprocessors operating in accordance with stored instructions. Memory (referred to generally as a "machine readable medium") may be used to store the various state information (Recall, e.g. elements 212, 235, 245, and 265 of FIG. 2.) used by these components. Similarly, memory can be used to buffer cells at the virtual output queues 810.

§4.2.4 Examples Illustrating Operations Performed By an Exemplary Embodiment

Figure 9A:
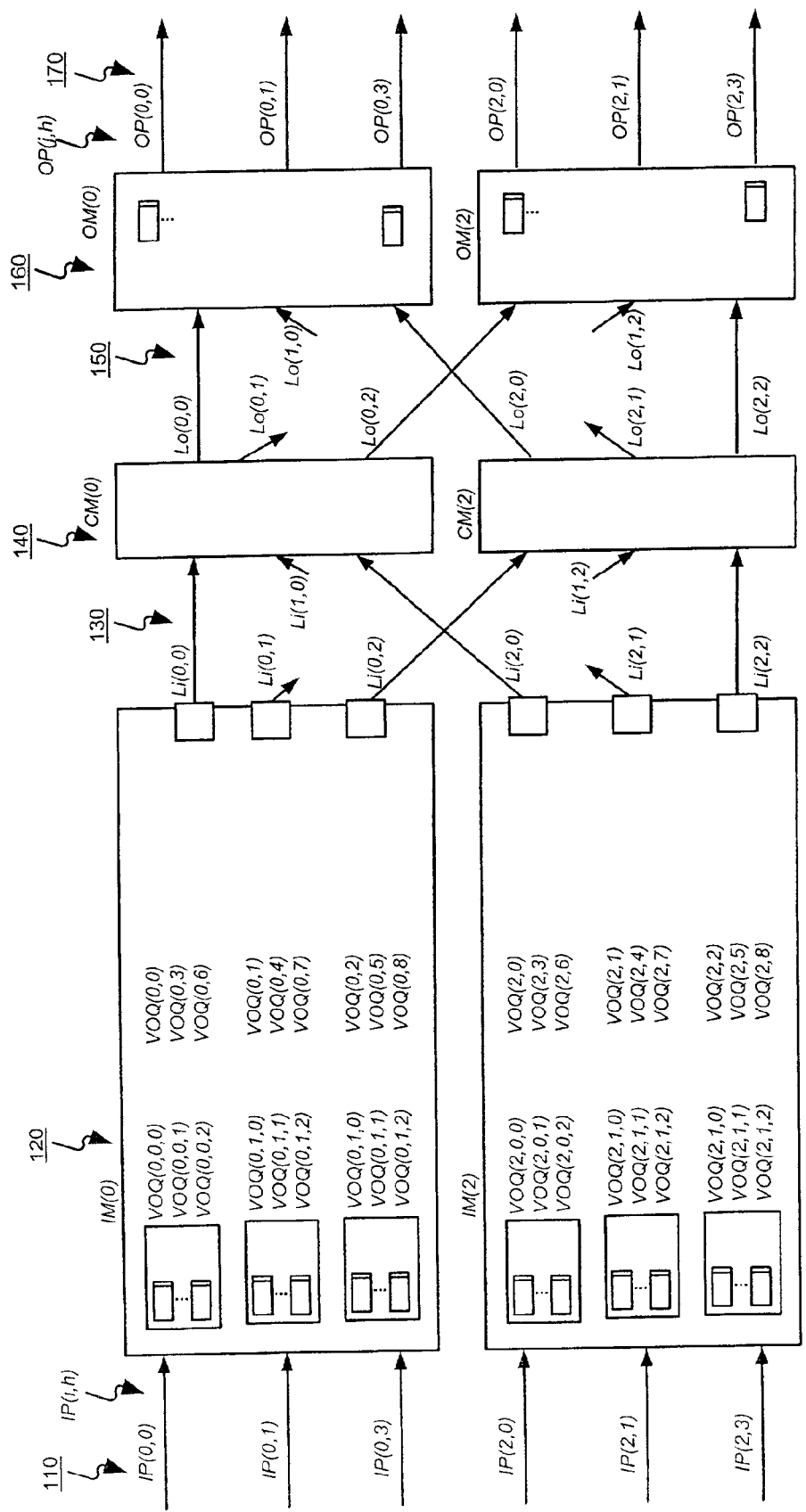

FIGS. 9(a) through 9(g) illustrate an example of operations of the first stage of an exemplary dispatching method. In this example, the invention is embodied in a Clos-network switch, such as that 100 illustrated in FIG. 1. In the exemplary switch 100', n=m=k=2. To simply the drawings, FIGS. 9(a) through 9(g) do not show the second input module (IM(1)), the second central module (CM(1)), or the second output module (OM(1)). As shown in FIG. 9(a), to simplify the explanation, as well as to obtain desynchronization more quickly, and in one embodiment of the output link arbitration method 230', the order of the VOQ(i,j,h) in IM(i) is redefined as VOQ(i,hk+j) as shown. Thus, in general, a pointer for use with the outgoing link arbitration method 230' and following a round-robin discipline, will cycle through the VOQs as follows:

VOQ (i, 0, 0);
VOQ (i, 1, 0);
. . . ;
VOQ (i, k-1, 0);
VOQ (i, 0, 1);
VOQ (i, 1, 1);
. . . ;
VOQ (i, k-1, 1);
. . . ;
VOQ (i, 0, n-1);
VOQ (i, 1, n-1);
. . . ;
VOQ (i, k-1, n-1).

In this way, the arbiter will cycle through a particular VOQ within various groups of VOQ first, and then through subsequent VOQs within each group.

Figure 9B:
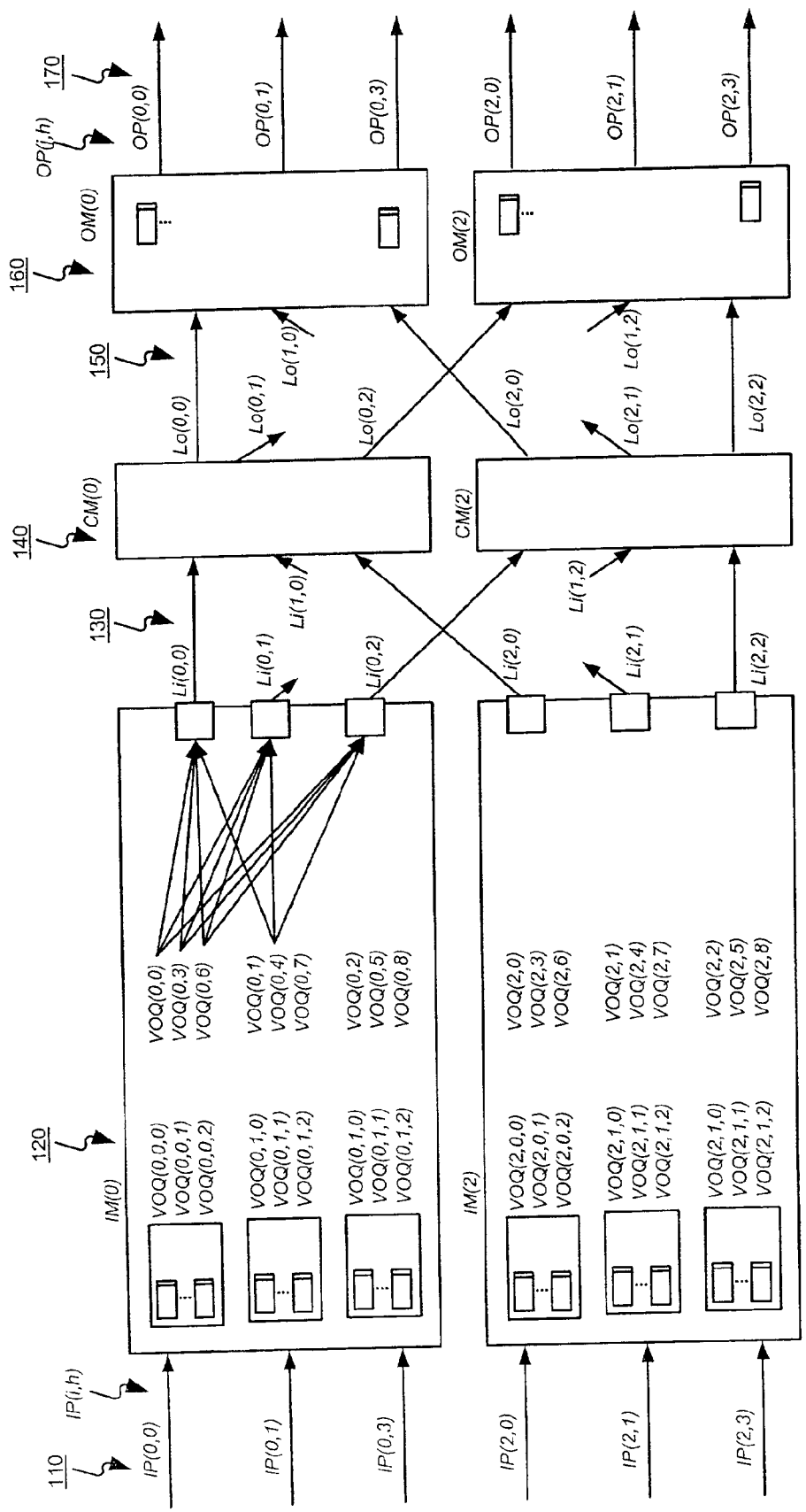

In the following example, assume that VOQ(0,0), VOQ (0,3), VOQ(0,4), and VOQ(0,6) are non-empty. As shown in FIG. 9(b), these non-empty VOQs each broadcast a request to all link arbiters in their input module (IM(0)). (Recall, e.g., the first communication 215 of FIG. 2, as well as 310 and 320 of FIG. 3.)

Figure 9C:
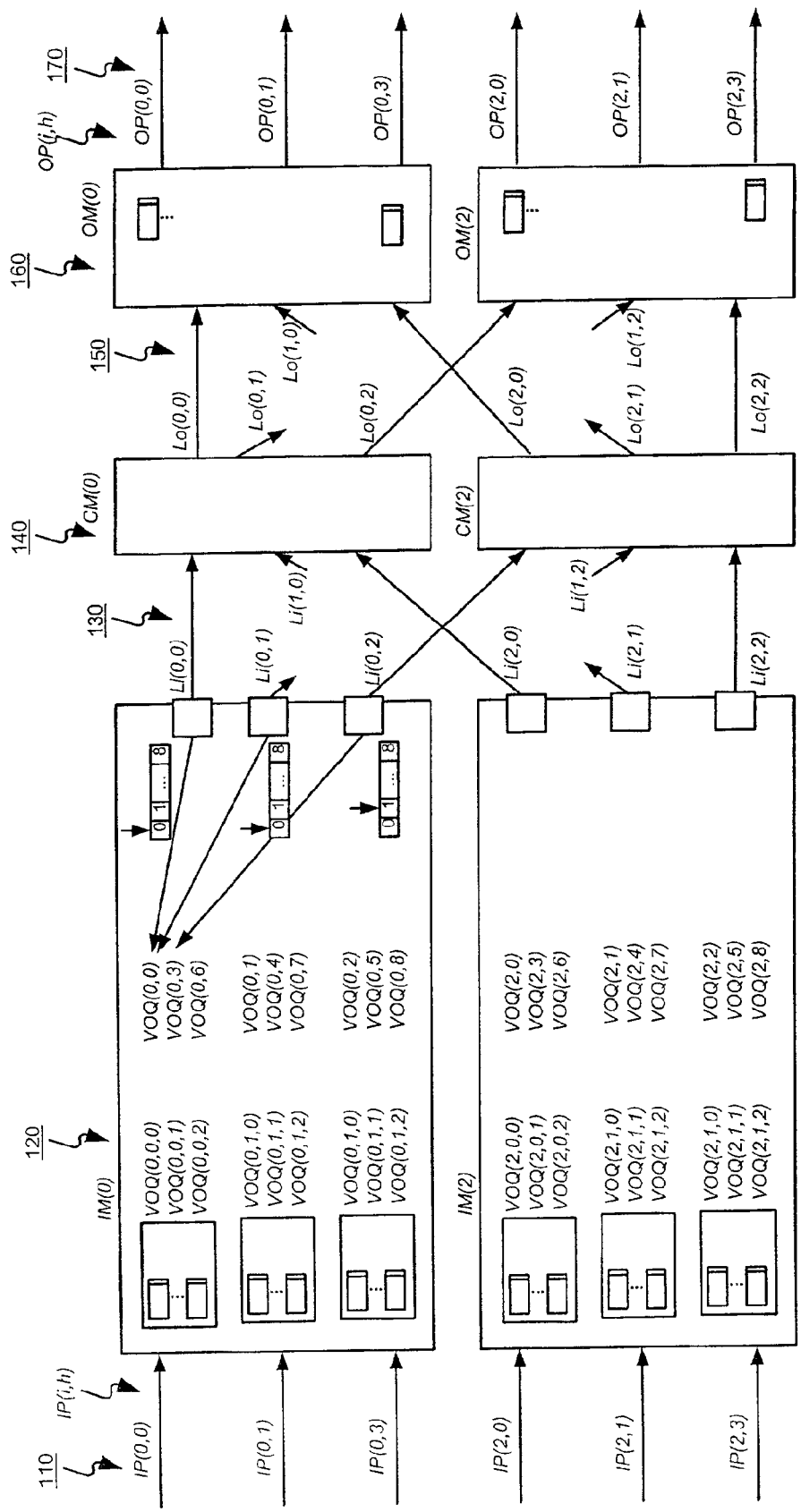

As shown in FIG. 9(c), it is assumed that arbiters associated with outgoing links $L_i(0,0)$, $L_i(0,1)$ and $L_i(0,2)$ prefer VOQ(0,0), (VOQ(0,0) and VOQ(0,1), respectively. Since VOQ(0,0) is among those VOQs to broadcast a request, the arbiters associated with outgoing links $L_i(0,0)$ and $L_i(0,1)$ each send a grant signal back to VOQ(0,0). On the other hand, since VOQ(0,1) was empty and did not broadcast a request, the arbiter associated with outgoing link $L_i(0,2)$ will try subsequent VOQs until one that sent a request (i.e., a non-empty VOQ) is encountered. In this case, the next VOQ that sent a request is VOQ(0,3). Accordingly, as shown in FIG. 9(c), the arbiter associated with outgoing link $L_i(0,2)$ sends a grant signal back to VOQ(0,3). (Recall, e.g., the second communication 237 of FIG. 2, as well as the method 230' of FIG. 4.)

Figure 9D:
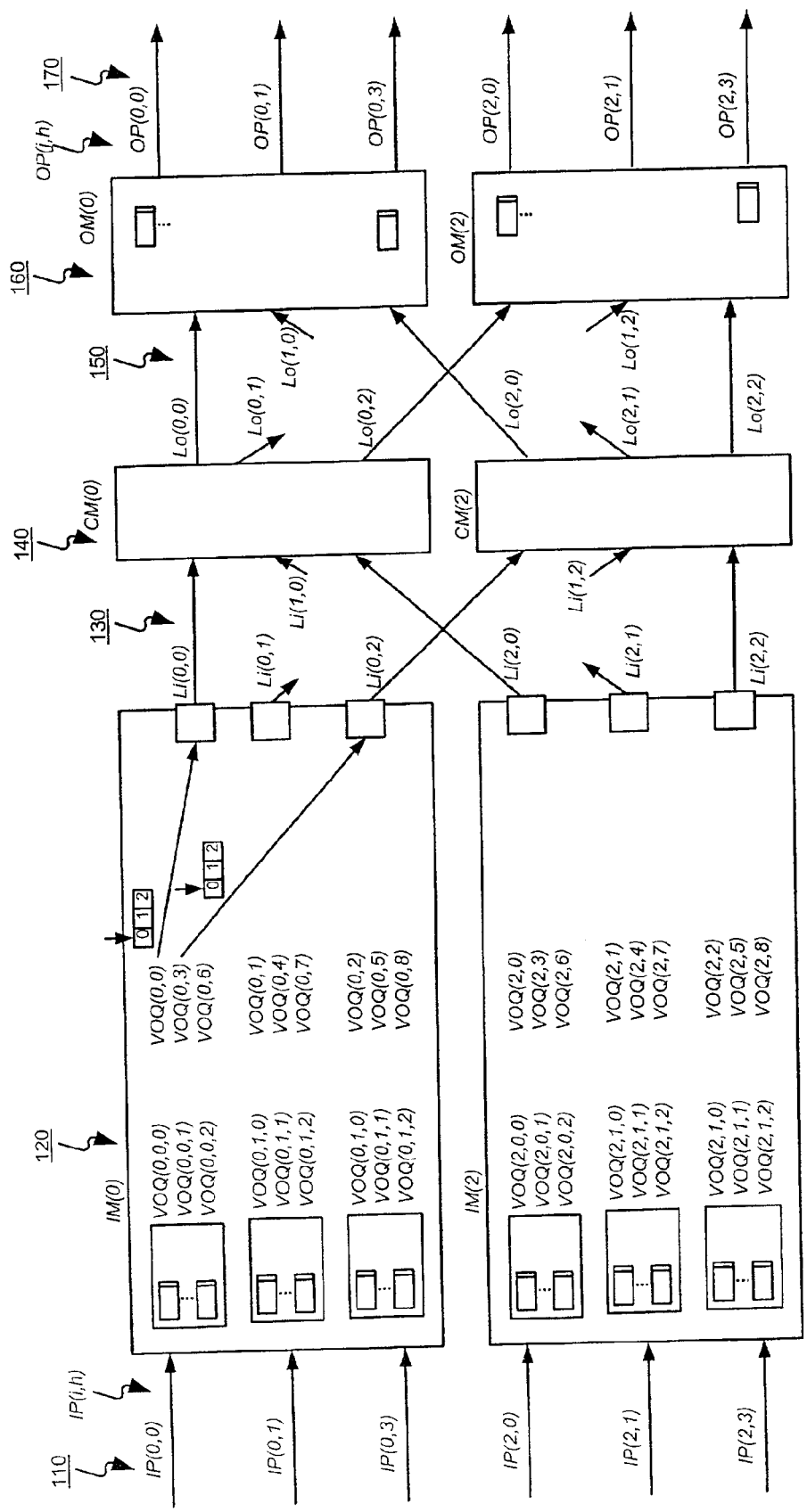

Referring to both FIGS. 9(c) and 9(d), it is assumed that arbiters associated with virtual output queues VOQ(0,0) and VOQ(0,3) both prefer outgoing link $L_i(0,0)$. Since both outgoing link $L_i(0,0)$ and $L_i(0,1)$ broadcast a grant to VOQ (0,0), the arbiter associated with VOQ(0,0) must select one. In this example, it selects outgoing link $L_i(0,0)$ and sends a grant signal back as shown in FIG. 9(d). On the other hand, since only the outgoing link $L_i(0,2)$ sent a grant to VOQ(0, 3), the arbiter associated with VOQ(0,3) will try subsequent outgoing links until one that sent a grant is encountered. In this case, the next (and indeed the only) outgoing link to send a grant is $L_i(0,2)$. Accordingly, as shown in FIG. 9(d), the arbiter associated with VOQ(0,3) sends a grant signal back to outgoing link $L_i(0,2)$. (Recall, e.g., the third communication 247 of FIG. 2, as well as 510, 540 and 550 of FIG. 5.)

Figure 9E:
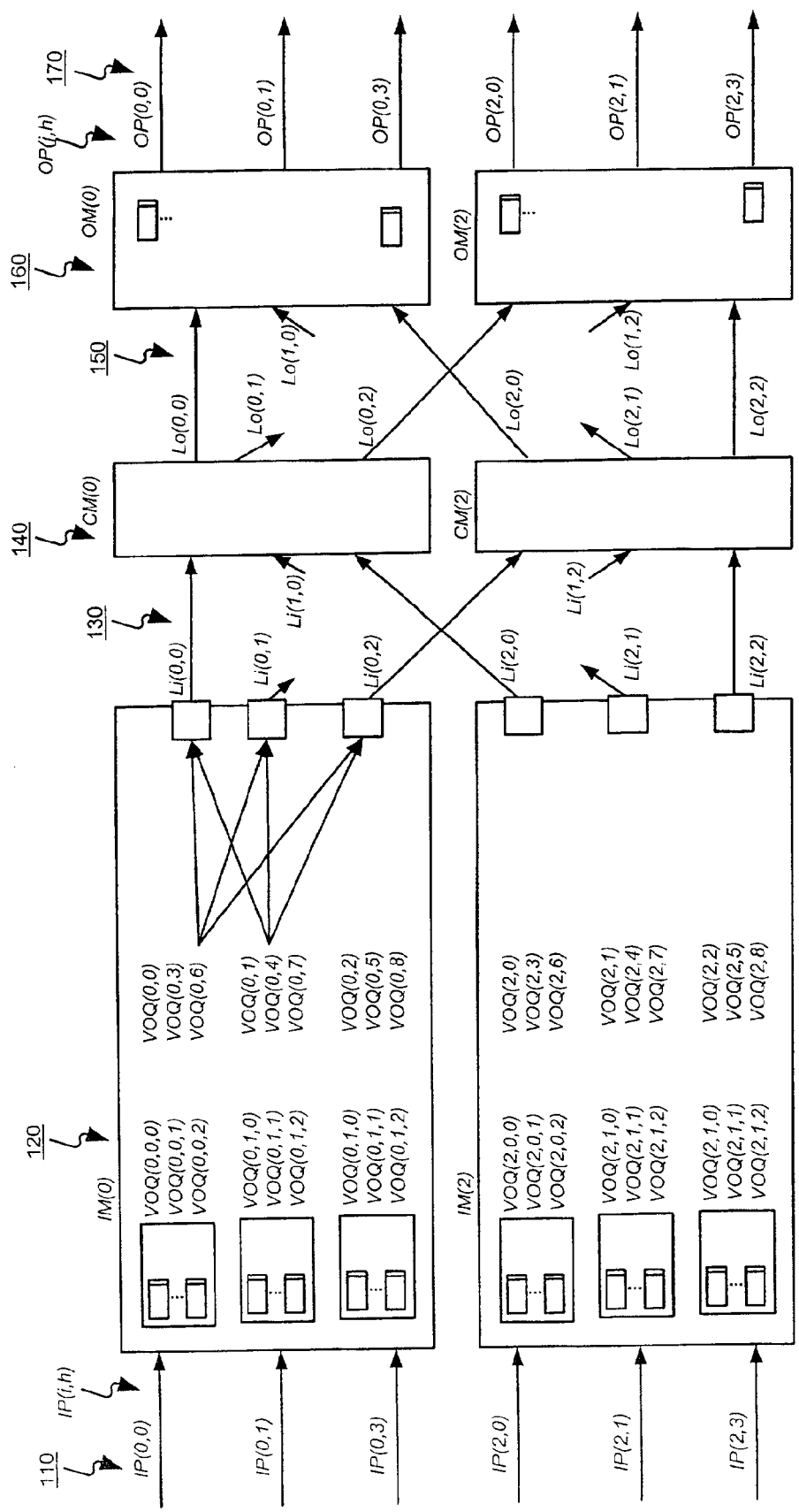
Figure 9F:
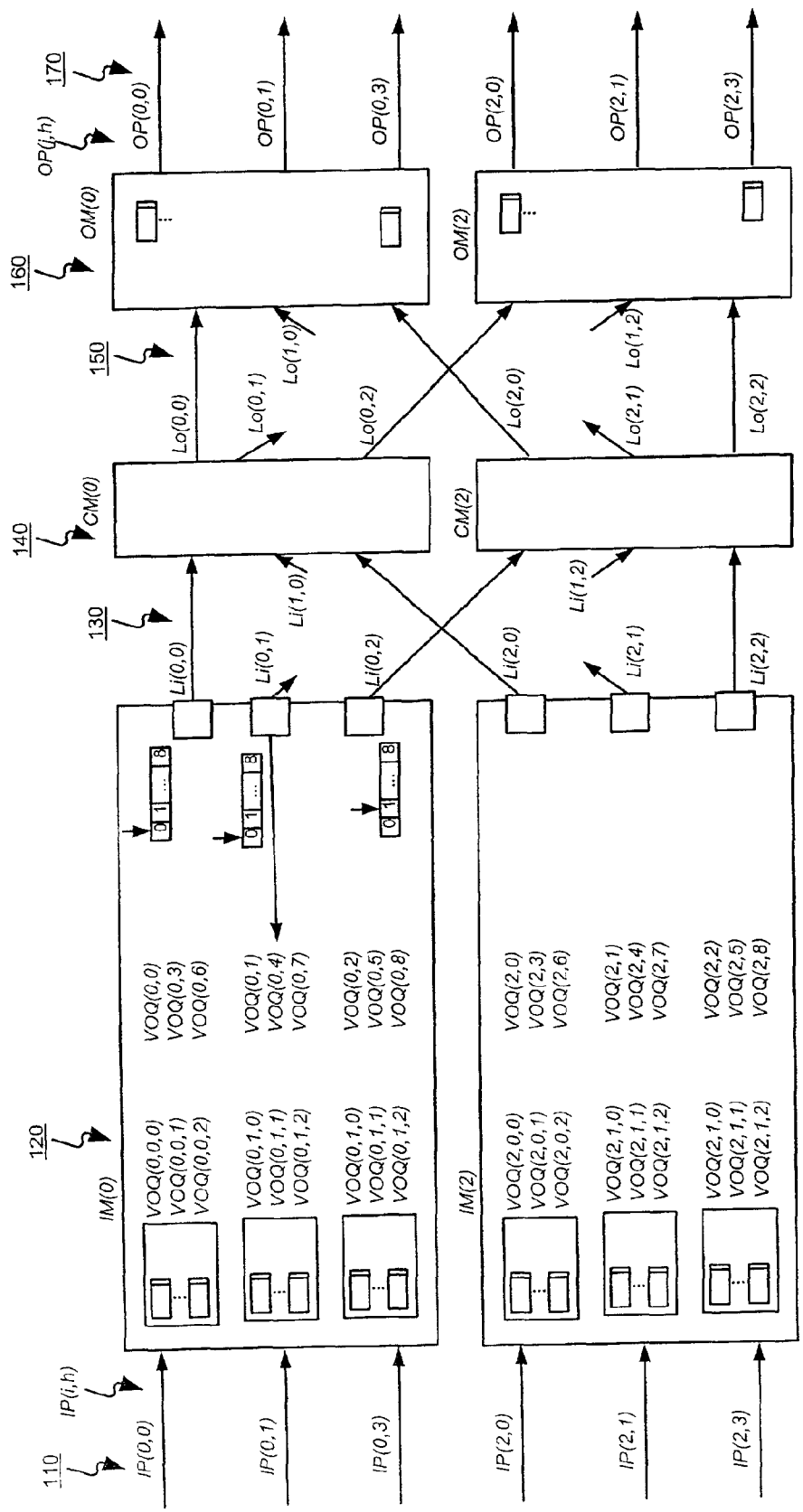
Figure 9G:
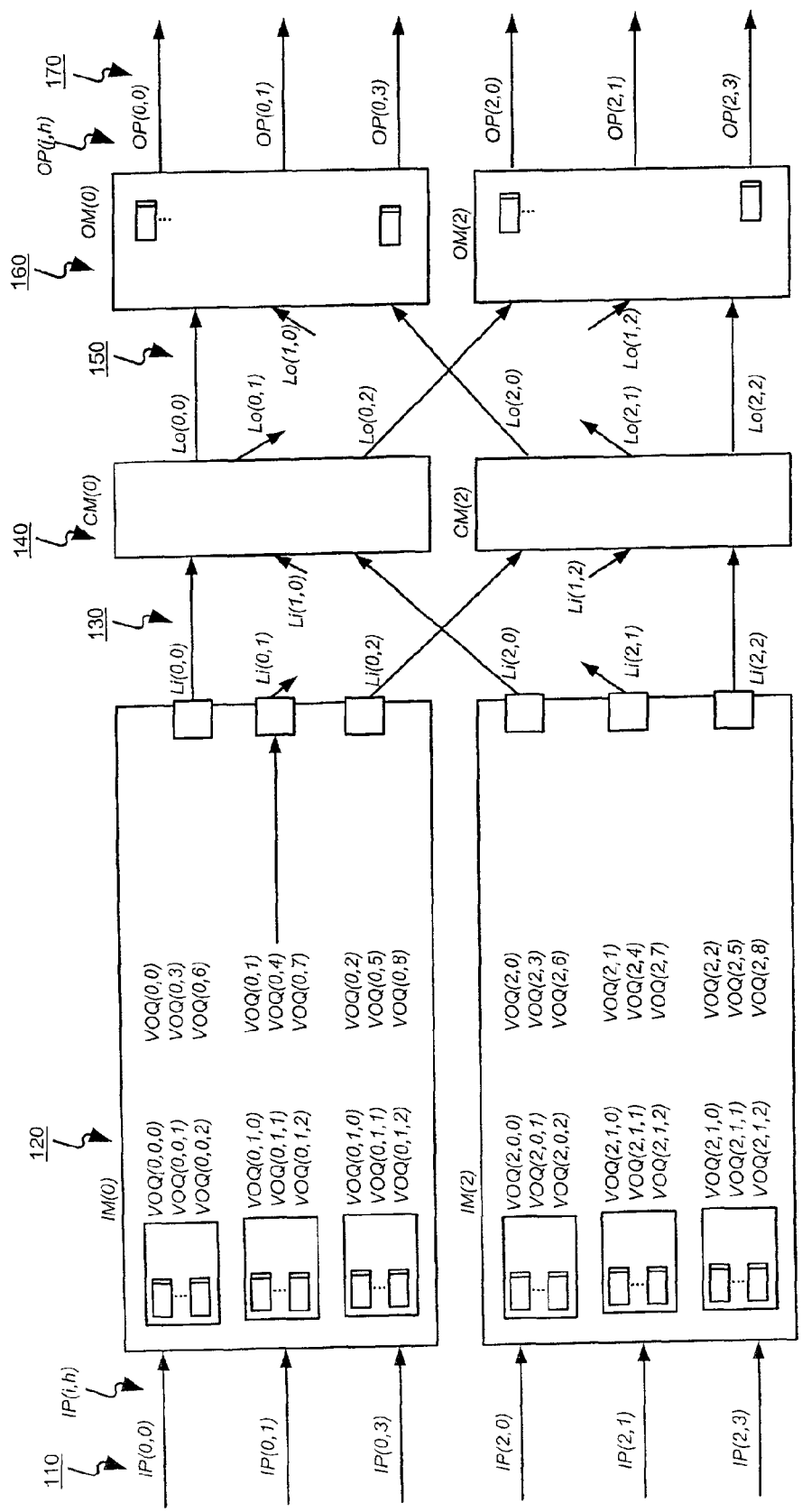

Assuming that more iterations of the foregoing steps are possible within one cell time slot (or more in certain embodiments), notice that VOQ(0,4) and VOQ(0,6) are non-empty, but were not matched with an outgoing link during the first iteration. Accordingly, as shown in FIG. 9(e), these VOQs may rebroadcast their requests. (Recall, e.g., 520 and 530 of FIG. 5.) Note that if the outgoing link arbiters maintain a certain information, such a rebroadcast would not be necessary. The outgoing link $L_i(0,1)$ is the only non-committed link. Based on its pointer, the arbiter associated with the outgoing link $L_i(0,1)$ will prefer VOQ(0,0). However, since VOQ(0,0) was already matched with an outgoing link in the previous iteration, and therefore did not rebroadcast a request, the arbiter associated with outgoing link $L_i(0,1)$ will try subsequent VOQs until one that rebroadcast a request is encountered. In this case, the next VOQ that rebroadcast a request is VOQ(0,4). As shown in FIG. 9(f), the arbiter associated with the outgoing link $L_i(0,1)$ sends a grant back to VOQ(0,4). Finally, as shown in FIG. 9(g), the arbiter associated with VOQ(0,4) sends a grant back to the outgoing link $L_i(0,1)$.

Although not shown in FIGS. 9(a) through 9(g), each outgoing link that was matched with a non-empty VOQ during the first phase of the exemplary cell dispatch scheduling invention will request a central module. Arbiters at the central modules will arbitrate such requests. Once an outgoing link $L_o$ of a central module is matched with an outgoing link $L_i$ of an input module (and therefore to a VOQ), the state information (e.g., pointers) for each of the arbiters may be updated and the cells may be dispatched from those VOQs matched with an outgoing link $L_o$.

§4.2.5 Conclusions

The disclosed cell dispatch scheduling invention does not require buffers in the second stage, thereby advantageously avoiding cell out-of-sequence problems. Further, unlike random dispatching schemes having limited (e.g., 75%) throughput unless internal bandwidth is expanded (e.g., speed-up≈1.582 is applied), simulations have shown that the cell dispatch scheduling invention can achieve 100% throughput (independent of the number of iterations of the first phase) under uniform traffic. More specifically, a VOQ that fails to win contention has to store backlogged cells.

Under uniform traffic, every VOQ keeps such backlogged cells until the idle state (i.e., the state in which the internal link is not fully utilized) is eliminated—that is, until the stable state (See, e.g., the article, N. McKeown, A. Mekkittikul, V. Anantharam, and J. Walrand, "Achieving 100% Throughput in an Input-Queued Switch," *IEEE Trans. on Communications*, Vol. 47, No. 8, pp. 1260–1267 (Aug. 1999). This article is incorporated herein by reference) is reached. Once in the stable state, every VOQ is occupied with backlogged cells. In such a state, the arbiters (e.g., round-robin pointers) become desynchronized. Consequently, even when the offered traffic load is full, no contention occurs in the stable state. Therefore, the dispatch invention achieves 100% throughput under uniform traffic.

Such 100% throughput under uniform traffic occurs independent of the number of iterations. However, as the number of iterations (e.g., possible per cell time slot) increases, the delay performance becomes better. This is because the matching between VOQs and outgoing links $L_i$ within an input module (IM) will improve. When the offered traffic is low, the desynchronization of the arbiters (e.g., round-robin pointers) is less likely achieved. In such a case, using less iterations negatively impacts performance. This is because the matching between VOQs and outgoing links $L_i$ within an input module (IM) will worsen.

Even under bursty traffic, the dispatch invention provides 100% throughput, which is also independent of the number of iterations of the first stage. However, the delay performance of the bursty traffic is worse than that of more uniform traffic under heavy load conditions.

The throughput of the cell dispatch scheduling invention is better than that of random dispatching even when traffic is unbalanced (i.e., not uniform). Further, the fact that the cell dispatch scheduling invention can use round robin arbiters ensures fairness under non-uniform traffic conditions.

The cell dispatch scheduling invention has a time complexity O(log nk) for each iteration of the first phase. Therefore, if there are m iterations (such that outgoing links are matched with the VOQs in an IM), the time complexity of the first phase is O(m log nk). The second phase has a time complexity of O(log k). Therefore, the time complexity of the cell dispatch scheduling invention is approximately O(m log nk)=O(m log N), where N is the number of ports. If the number of iterations of the first phase is set to i, where $1 \leq i \leq m$, the time complexity is expressed as O(i log N). Given this time complexity, the cell dispatch scheduling invention is scalable and may be used successfully in large scale switches.

§4.3 Improved Embodiment

The embodiment described in §4.2 above has been improved to reduce dispatch scheduling time needed and to reduce the number of crosspoints of interconnection wires used. Thus, the improved embodiment described here may be used in larger-scale switches.

§4.3.1 Function of Improved Embodiment

The present invention may function to improve the scalability of the cell dispatch scheduling invention described in §4.2 above. The present invention may also function to decrease the interconnections of arbiters used in input modules (IMs) of a multi-stage switch, such as a Clos-switch for example. The present invention may do so modifying a VOQ-outgoing-link ($L_i$) matching portion of the cell dispatch scheduling invention described in §4.2 above by replacing each of the outgoing-link arbiters with a hierarchical arbiter that includes a master arbiter and slave arbiters. Within a group (G) 127 of VOQs 125, slave arbiters each select a VOQ from among one or more candidate VOQs. Each of the outgoing-links ($L_i$) has an associated master arbiter which selects a group of VOQs (and thus an associated slave arbiter within the selected group) from among one or more candidate groups of VOQs. One or more slave arbiters of a selected group may select the same VOQ. In such a case, a VOQ arbiter will select one of the slave arbiters. This matches a VOQ with an outgoing-link $L_i$. Matching the $L_i$ with an outgoing-link $L_o$ of a central module (CM) may be done in the same way as that described in §4.2 above.

§4.3.2 Exemplary Operations

FIG. 13 is a bubble chart illustrating operations that may be performed in accordance with the present invention. First, it should be noted that VOQs are arranged into groups. When a cell 1305 arrives at a VOQ, a VOQ (non-arbitration) operation 1310 may broadcast (as indicated by ellipses) a request 1315a to a plurality of outgoing-link slave arbitration operations 1330a, each of which 1330a is associated with the group of VOQs to which the VOQ belongs. Within each group, each of the outgoing-link slave arbitration operations 1330a is also associated with a different one of a number of outgoing-link master arbitration operations 1330b, each of which 1330b is associated with a given outgoing-link ($L_i$). The request 1315a is indicated as a first communication ("1a"). Further, for each group of VOQs having at least one non-empty VOQ, a group request 1315b is broadcast to each of the master arbitration operations 1330b. The request 1315b is indicated as another (e.g., roughly concurrent) first communication ("1b").

Based on outgoing-link master arbitration state information (e.g. a round-robin pointer) 1335b, in each case, the master arbitration operations 1330b will select one VOQ group from among the candidate VOQ groups that submitted a request 1315b. It 1330b will then send a grant 1336 to an outgoing-link slave arbitration operation 1330 associated with the outgoing-link master arbitration operation 1330b, and associated with the selected VOQ group. The grant 1336 is indicated as a second communication ("2"). Declines (not shown) may be sent to associated outgoing-link slave arbitration operations 1330a of non-selected VOQ groups, though such a communication is not necessary.

In response to (or alternatively, independent of) the receipt of a grant 1336 from an outgoing-link master arbitration operation 1330b, an outgoing-link slave arbitration operation 1330a will select one VOQ from among the candidate VOQs that submitted a request 1315a. Such a selection may be based on outgoing-link slave arbitration state information (e.g. a round-robin pointer) 1335a. It 1330a will then send a grant 1337 to a VOQ arbitration operation 1340 associated with the selected VOQ. The grant 1337 is indicated as a third communication ("3"). Declines (not shown) may be sent to associated VOQs arbitration operations 1340 of non-selected VOQs, though such a communication is not necessary.

Since the VOQ operation 1310 broadcasts a request, it's associated arbitration operation 1340 may receive more than one grant (i.e., one grant each from more than one outgoing-link slave arbitration operation 1330a). Accordingly, the VOQ arbitration operation 1340 uses VOQ arbitration state information (e.g., a round-robin pointer) 1345 to select one.

The VOQ arbitration operation 1340 then communicates a grant 1347 to link operations 1350 associated with the selected outgoing-link. This grant is indicated as fourth communication ("4").

At this point, a cell at a VOQ may have been matched with an outgoing-link 130 of the input module (IM) 120. These operations may be referred to as the first phase of the dispatching scheme. This first phase can be summarized as three steps. In the first step, at each time slot, non-empty VOQs(i,j,h) that belong to group G(i,j) send requests to all outgoing-link slave arbitration operations 1330a associated with the group. Further, each group G(i,j) having at least one non-empty VOQ will broadcast requests to each outgoing-link master arbitration operation 1330b of the input module (IM) 120.

In the second step, each outgoing-link master arbitration operation 1330b selects a group of VOQs from among the candidate groups of VOQs that sent requests. Once a group is selected by a outgoing-link master arbitration operation 1330b, it sends a grant signal to the outgoing-link slave arbitration operation 1330a that belongs to the selected group and that is associated with the outgoing-link master arbitration operation 1330b. In response (or done independently in an alternative), the outgoing-link slave arbitration operation 1330a will select a VOQ from among the one or more VOQs that submitted a request. Since the VOQ broadcast its request, it may have received more than one grant. Accordingly, the VOQ arbitration operation 1340 may select one of the grants received.

In the third step, the VOQ that chooses a grant sends a grant to the outgoing-link associated with the slave (and master) arbitration operations 1330.

If these three steps of the first phase can be repeated within a cell time slot, multiple iterations can be run such that non-empty VOQs failing to be matched with an available outgoing-link may retry during a next iteration.

Still referring to FIG. 13, a link operation 1350 associated with each outgoing-link 130 matched with a VOQ, may submit a request 1355 to a central module (CM) arbitration operation 1360. This request 1355 is indicated as a fifth communication ("5"). Alternatively, such a request 1390 may be sent directly from the VOQ, matched with an outgoing-link ($L_i$), as a fifth communication (5'). Each CM arbitration operation 1360 may select one of the candidate requesting outgoing-links 130 based on IM-CM arbitration state information 1365. It 1360 then communications a grant 1367 back to the link operation 1350 associated with the selected one of the candidate requesting outgoing-links 130. This grant 1367 is indicated as a sixth communication ("6").

The link operation 1350 may then send an indication 1370 to the VOQ operation 1310 that it may send its head of line ("HOL") cell. This indication 1370 is indicated as a seventh communication ("7"). The various arbitration operations 1330a, 1330b, 1340, 1360 may update their respective state information 1335a, 1335b, 1345, 1365. Further, other state information 1312 may be updated by its associated operation 1310.

Various alternatives of when state information is updated will be apparent to those skilled in the art. For example, link master arbitration state information (e.g., a round-robin pointer) 1335(b) may be updated (a) after it sends a grant signal to the appropriate link slave arbitration operations, or (b) preferably, after it receives a grant from a central module arbitration operation. In servicing VOQ groups, it is possible for the master arbitration operations 1330b to pass over non-requesting VOQ groups (e.g., those VOQ groups with no non-empty VOQs). Therefore, when the pointer is updated, it can (a) go to a next VOQ group from the VOQ group pointed to at the start of the cell time slot, or (b) go to a next VOQ group from the VOQ group selected.

Link slave arbitration state information (e.g., a round-robin pointer) 1335(a) may be updated (a) after it sends a grant signal to a VOQ arbitration operation, (b) after it both receives a grant signal from a link master arbitration operation and after it sends a grant signal to a VOQ arbitration operation, (c) after it receives a grant from a VOQ arbitration operation, or (d) preferably, after it is informed that all of the foregoing conditions and after it is informed that its associated outgoing-link won arbitration from a central module arbitration operation. In servicing VOQs, it is possible for the slave arbitration operations 1330a to pass over non-requesting (e.g., empty) VOQs. Therefore, when the pointer is updated, it can (a) go to a next VOQ from the VOQ pointed to at the start of the cell time slot, or (b) go to a next VOQ from the VOQ selected.

VOQ arbitration state information (e.g., a round-robin pointer) 1345 may be updated (a) after it sends a grant to an outgoing-link slave arbitration operation, or (b) preferably, after it sends a grant to an outgoing-link slave arbitration operation and after it is informed that its matched outgoing-link won arbitration from a central module arbitration operation. In selecting slave arbitration operations, it is possible for the VOQ arbitration operations 1340 to pass over non-granting slave arbitration operations. Therefore, when the pointer is updated, it can (a) go to a next slave arbitration operation from the one pointed to at the start of the cell time slot, or (b) go to a next slave arbitration operation from the one selected.

Finally, IM-CM arbitration state information (e.g., a round-robin pointer) 1365 may be updated after it sends a grant to an outgoing-link operation that won arbitration. In servicing outgoing links, it is possible for the CM arbitration operations 1360 to pass over non-requesting outgoing links. Therefore, when the pointer is updated, it can go to (a) the next outgoing link from the one pointed to at the start of the cell time slot, or (b) go to a next outgoing link from the one selected.

Having described various operations that may be performed in accordance with the present invention, exemplary apparatus, methods and data structures for implementing such operations are now described in §4.3.3 below.

§4.3.3 Exemplary Methods, Data Structures, and Apparatus for Performing the Exemplary Operations Exemplary methods and data structures for implementing various operations of the present invention are described in §4.3.3.1. Then, exemplary apparatus for implementing various operations of the present invention are described in §4.3.3.2.

§4.3.3.1 Exemplary Methods and Data Structures

FIG. 14 is a high-level flow diagram of an exemplary method 1310' that may be used to effect various VOQ operations 1310. Referring to conditional branch point 1410 and block 1420, if a cell has arrived at the VOQ but has not yet won arbitration, a request is broadcast to all outgoing-link slave arbiters (or outgoing-link slave arbitration operations 1330a) of the VOQ group to which the VOQ belongs. (Recall, e.g., the first communication 1315a of FIG. 13.) Still referring to FIG. 14, as indicated by conditional branch point 1430 and block 1440, if the cell (or the VOQ in general) won arbitration (e.g., all rounds of arbitration—through to the central module 140) (Recall, e.g., the seventh communication 270 of FIG. 2.), the cell is sent (e.g., in the upcoming cell time slot). Although not shown in FIG. 14, these steps may be continuously run. Alternatively, blocks 1420 and 1440 may be triggered upon the occurrence of events.

FIG. 15 is a high-level flow diagram of an exemplary method 1310" that may be used to effect another VOQ operation—namely, an operation performed by a VOQ group. Referring to conditional branch point 1510, it is determined whether any VOQ in the group is non-empty. If, so, as indicated in block 1520, a group request is broadcast to all outgoing-link master arbiters (or outgoing-link master arbitration operations 1330b) for the given input module (IM) 120. The method 1310" is then left via RETURN node 1530. Referring back to conditional branch point 1510, if all of the VOQs in the group are empty, the method 1310" is simply left via RETURN node 1530.

FIG. 16 is a high-level flow diagram of an exemplary method 1330a' that may be used to effect an outgoing-link slave arbitration operation 1330a. Referring to conditional branch point 1610, it is determined whether or not a request or requests were received from a VOQ or VOQs. If not, the method 1330a' is simply left via RETURN node 1650. If, on the other hand, such a request is, or requests are received, at conditional branch point 1620, it is determined whether or not a grant was received from an outgoing-link master arbiter (or outgoing-link master arbitration process 1330b). If not, the method 1330a' is left via RETURN node 1650. If, on the other hand, such as grant is received, the rest of the method 1330a' is effected. Thus, the receipt of request(s) from VOQ(s), and (optionally) a grant from a outgoing-link master arbiter, may serve to trigger the main steps of the method 1330a'. Note, however, that the VOQ requests can be arbitrated by the slave independent of (e.g., before) the receipt of a grant from a master arbiter in an alternative method.

As indicated by block 1630, the outgoing-link slave arbitration method 1330a' selects one VOQ from among those sending requests. (Recall, e.g., 1330a and 1335a of FIG. 13.) The arbitration 1630 may be done based on the position of a pointer which is updated in accordance with a round-robin discipline. The pointer may move through all of the VOQs. If the pointer currently points to a VOQ that did not send a request, it may move to a next VOQ, repeatedly, until it points to a VOQ that submitted a request. Referring back to FIG. 16, the method 1330a' then sends a grant to the selected VOQ as indicated by block 1640. (Recall, e.g., the third communication 1337 of FIG. 13.) In the alternative in which the slave arbiter operates independently of the master, the slave arbiter may wait for receipt of a grant from its master before sending a grant to the VOQ. The method 1330a' may then be left via RETURN node 1650. Note that state information (e.g., the pointer) may be updated at this point, or, alternatively, may be updated later.

FIG. 21 illustrates exemplary state information 1335a' that may be used by the outgoing-link slave arbitration operation 1330a. As shown, a table 2110 may include a plurality of records, each record including a VOQ identifier (where i indexes the IM and g indexes the group) and a field 2114 indicating whether or not a request was received (in the current iteration) from the corresponding VOQ. A pointer 2116 may cycle through these records in a round-robin manner. The data structure 2120 may be used to indicate whether or not the outgoing-link associated with the slave arbitration operation is reserved for the next time slot. If so, the outgoing-link slave arbitration operation can ignore requests from VOQs (and/or inform the VOQs that it is reserved). The data structure 2130 may be used to indicate whether or not a VOQ, which was selected, chose the outgoing-link (associated with the slave arbitration process) in its own arbitration. Finally, data structure 2140 may be used to indicate whether or not a central module (CM) request was granted.

FIG. 17 is a high-level flow diagram of an exemplary method 1330b' that may be used to effect an outgoing-link master arbitration operation 1330b. Referring to conditional branch point 1710, it is determined whether or not one or more request(s) have been received from one or more VOQ group(s). If not, since there is no request for the outgoing-link ($L_i$) with which the master arbitration method 1330b' is associated (and indeed, no requests in general), the method 1330b' is simply left via RETURN node 1740. If, on the other hand, one or more request(s) have been received from one or more VOQ group(s), the method 1330b' continues to block 1720 where one of the VOQ group(s) is selected from among those sending requests. Then, as indicated by block 1730, a grant is sent to the slave arbiter (or outgoing-link slave arbitration operation 1330a) associated with the master arbiter (or, in other words, the outgoing-link associated with the master arbiter) and belonging to the selected group. The method 1330b' is then left via RETURN node 1740.

FIG. 22 illustrates exemplary state information 1335' that may be used by the outgoing-link master arbitration operation 1330b. As shown, a table 2210 may include a plurality of records, each record including a group identifier 2212 and a field 2214 indicating whether or not a request was received (in the current iteration) from the corresponding group of VOQs. A pointer 2216 may cycle through these records in a round-robin manner. The data structure 2220 may be used to indicate whether or not the outgoing-link associated with the master arbitration operation is reserved for the next time slot. If so, the outgoing-link master arbitration operation can ignore requests from VOQ groups (and/or inform such VOQ groups that it is reserved). The data structure 2230 may be used to indicate whether or not a central module (CM) request was granted.

FIG. 18 is a high-level flow diagram of an exemplary method 1340' that may be used to effect a VOQ arbitration operation 1340. Referring to conditional branch point 1810, it is determined whether or not one or more grants are received from the link arbitration operations 1330 in general (or the slave arbitration operation 1330a in particular). (Recall, e.g., the third communication 1337 of FIG. 13.) If not, depending on the cell time slot and the time needed for a dispatch determination (i.e., to match a VOQ with a CM), additional iterations (requests) may be possible. Accordingly, as indicated in conditional branch point 1820 and block 1830, if there is time left for another iteration, the VOQ arbitration method 1340' may inform a VOQ operation 1310 that lost arbitration in a previous iteration(s) to rebroadcast a request.

Referring back to conditional branch point 1810, if one or more grants are received, the method 1340' continues to block 1840 where one of the candidate grants is selected. The selection 1840 may be done based on the position of a pointer which is updated in accordance with a round-robin discipline. The pointer may move through all of the outgoing-link slave arbitration operations 1330a (or directly to the associated outgoing-link) associated with the VOQ group to which the VOQ belongs. If the pointer currently points to an outgoing-link slave arbitration operation 1330a (or directly to the associated outgoing-link) that did not send a grant, it may move to a next outgoing-link slave arbitration operation 1330a (or directly to the associated outgoing-link), repeatedly, until it points to an outgoing-link slave arbitration operation 1330a (or directly to the associated outgoing-link) that submitted a grant. Then, as shown in block 1850, a grant is sent to the outgoing-link operation associated with the selected one of the candidate grants. The method 1340' may then be left via RETURN node 1860.

FIG. 23 illustrates exemplary state information 1345' that may be used by the VOQ arbitration operation 1340. As shown, a table 2310 may include a plurality of records, each record including a slave arbiter (or outgoing-link) identifier 2312 and a field 2314 indicating whether or not a grant was received (in the current iteration) from the corresponding slave arbiter. A pointer 2316 may cycle through these records in a round-robin manner. The data structure 2320 may be used to indicate whether or not a cell is buffered at the VOQ. The data structure 2330 may be used to indicate whether or not a grant was received (in the present iteration) from a slave arbiter. The data structure 2340 may be used to indicate whether or not a grant was received from the master arbiter. Finally, the data structure 2350 may be used to indicate whether or not a grant has been received from a central module (CM) arbiter. module arbitration operation(s) 1360, may be the same as those used to effect outgoing-link operations 250 and central module arbitration operation(s) 260, respectively. Recall that such methods were described in §4.2 above with reference to FIGS. 6 and 7. Similarly, the data structures used by these methods are similar to those described in §4.2 above with reference to FIG. 12.

§4.3.3.2 Exemplary Apparatus

FIGS. 19a through 19f are high-level block diagrams that, collectively, illustrate exemplary components and interconnections of an exemplary apparatus 1900 that may be used to effect various operations of the present invention. An exemplary input module 120' may include virtual output queues (VOQs) 1910, each of which is associated with (e.g., includes) an arbiter 1915, and link controllers 1920. Each of the link controllers 1920 may be associated with a master arbiter 1925 and a number of slave arbiters 1940 (distributed across a number of VOQ groups). An exemplary central module 140' may be associated with (e.g., include) arbiters 1930. The VOQ operations 1310 may be effected on the virtual output queues 1910. The VOQ arbitration operations 1340 may be effected on the VOQ arbiters 1915. The link operations 1350 may be effected on the link controllers 1920. The link arbitration operations 1330 may be effected on the link master and slave arbiters 1925 and 1940, respectively. Finally, the central module arbitration operations may be effected on the arbiters 1930.

Figure 19A:
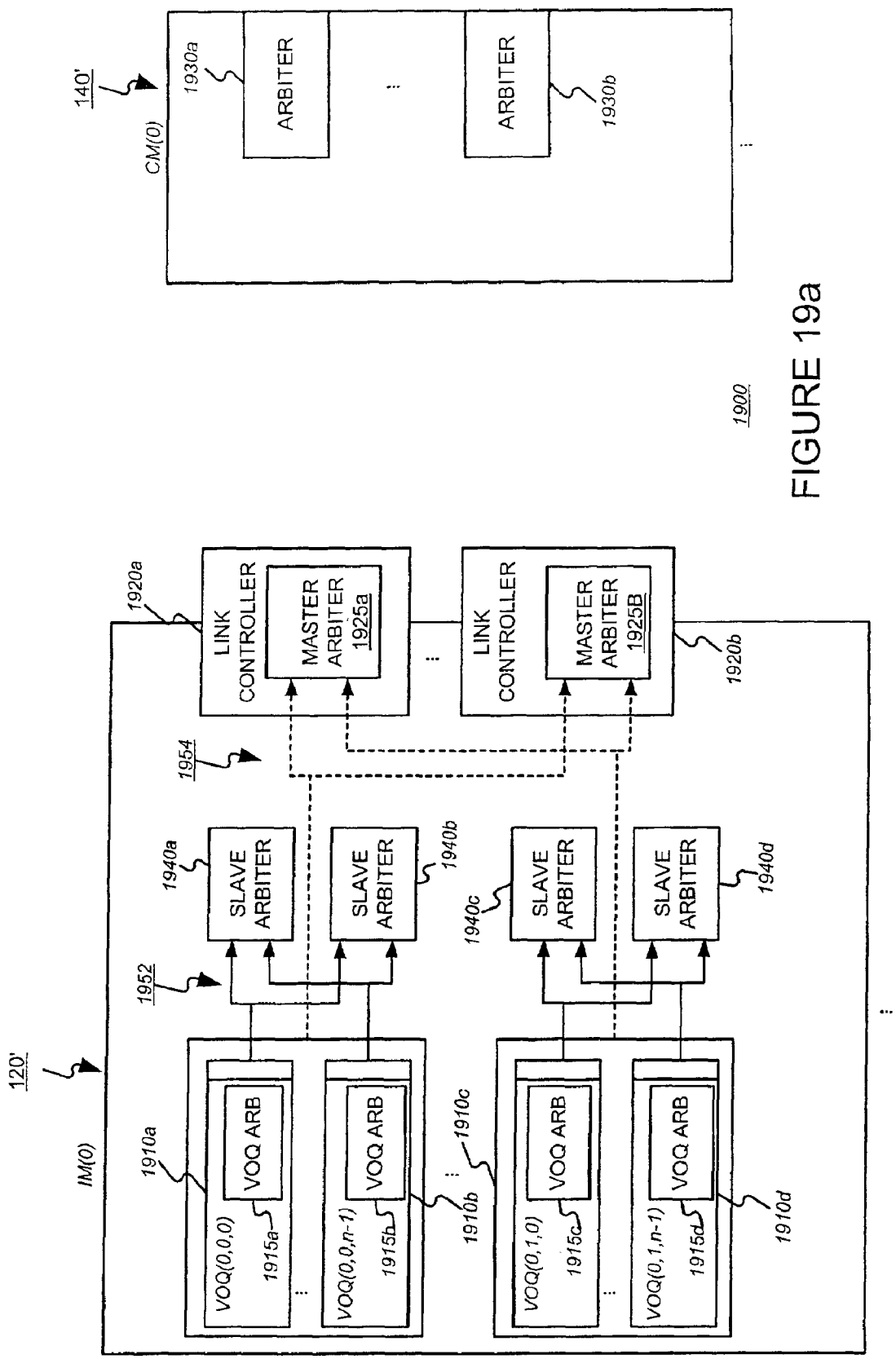

Various signaling lines may be provided. To simplify the drawing, the various signaling lines are shown by FIGS. 19a through 19f, collectively. Referring first to FIG. 19a, signaling lines, depicted by solid lines 1952, may be used to broadcast a request from a non-empty VOQ 1910 to each of the slave arbiters 1940 of a VOQ group (to which the VOQ 1910 belongs). (Recall, e.g., the first communication 1315a of FIG. 13.) Signaling lines, depicted by short-dashed lines 1954, may be used to broadcast a request of a VOQ group, having at least one non-empty VOQ, to each of the master arbiters 1925 (each associated with an outgoing-link) in the input module (IM) 120'. (Recall, e.g., the first communication 1315b of FIG. 13.)

Figure 19B:
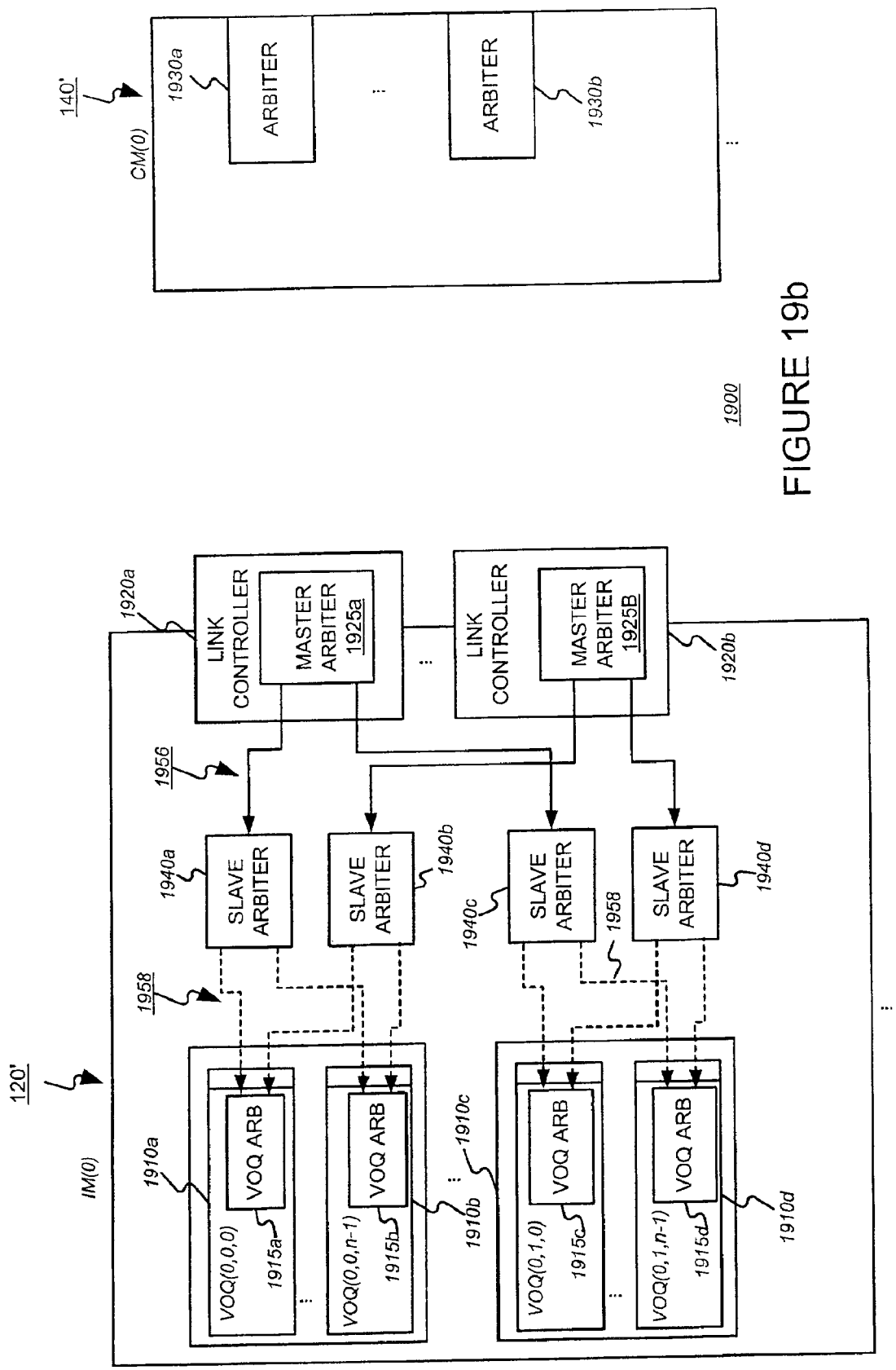

Referring now to FIG. 19b, signaling lines, depicted by solid lines 1956, may be used to communicate a grant message from a master arbiter to a slave arbiter 1940 associated with the master arbiter 1925 (or, in other words, associated with the outgoing-link with which the master arbiter is associated) and belonging to the VOQ group that was selected. (Recall, e.g., the second communication 1336 of FIG. 13.) Signaling lines, depicted by short dashed lines 1958, may be used by each outgoing-link slave arbiter 1940 to send a grant to a selected VOQ 1910. (Recall, e.g., the third communication 1337 of FIG. 13.)

Figure 19C:
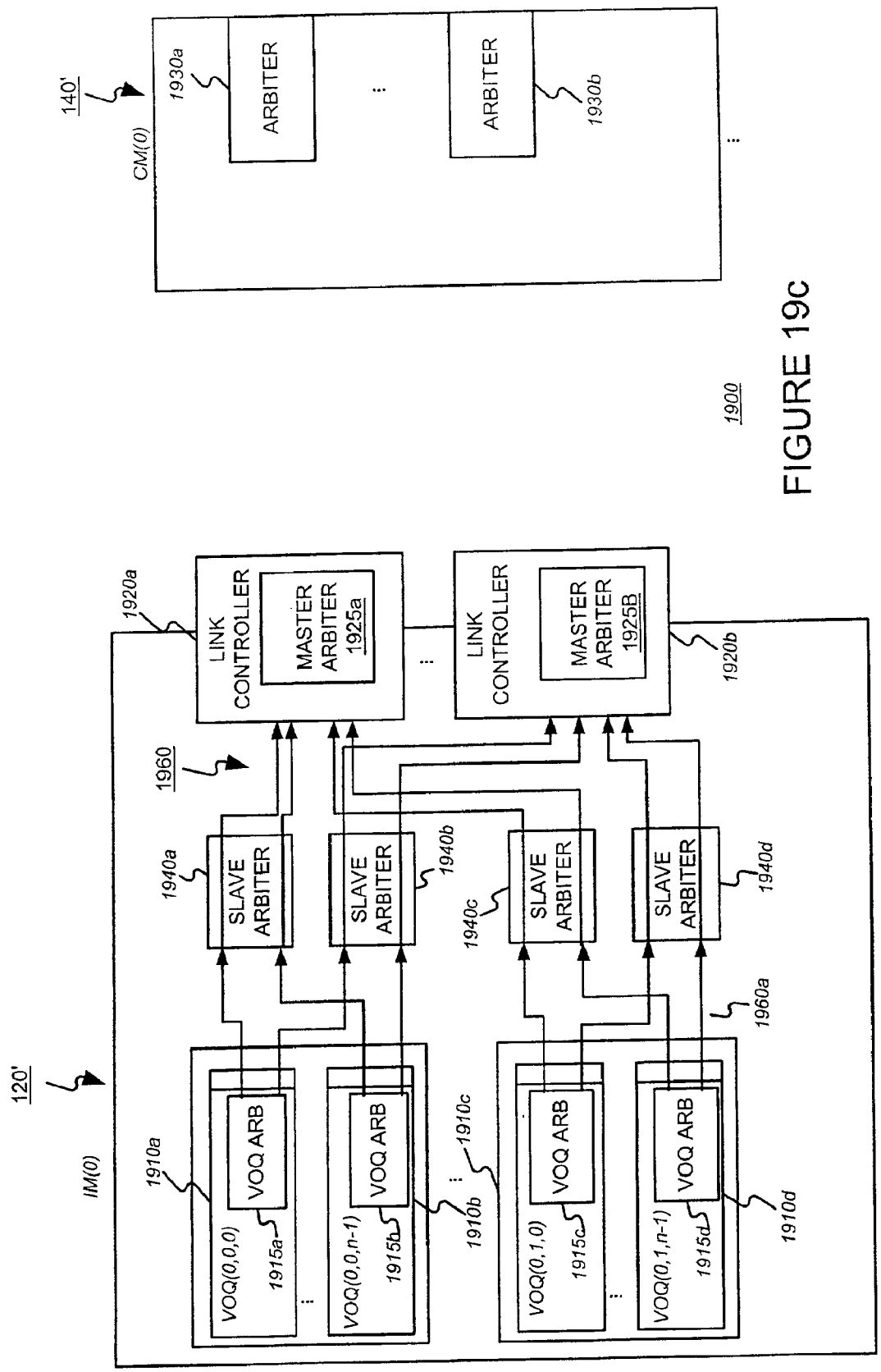

Referring to FIG. 19c, signaling lines, depicted by solid lines 1960, may be used by a VOQ arbiter 1915 to send a grant to a selected link controller 1920 (e.g., via a slave arbiter 1940a, or directly). (Recall, e.g., the fourth communication 1347 of FIG. 13.) At this point, a VOQ 1910, winning arbitration, is matched with an outgoing-link.

Figure 19D:
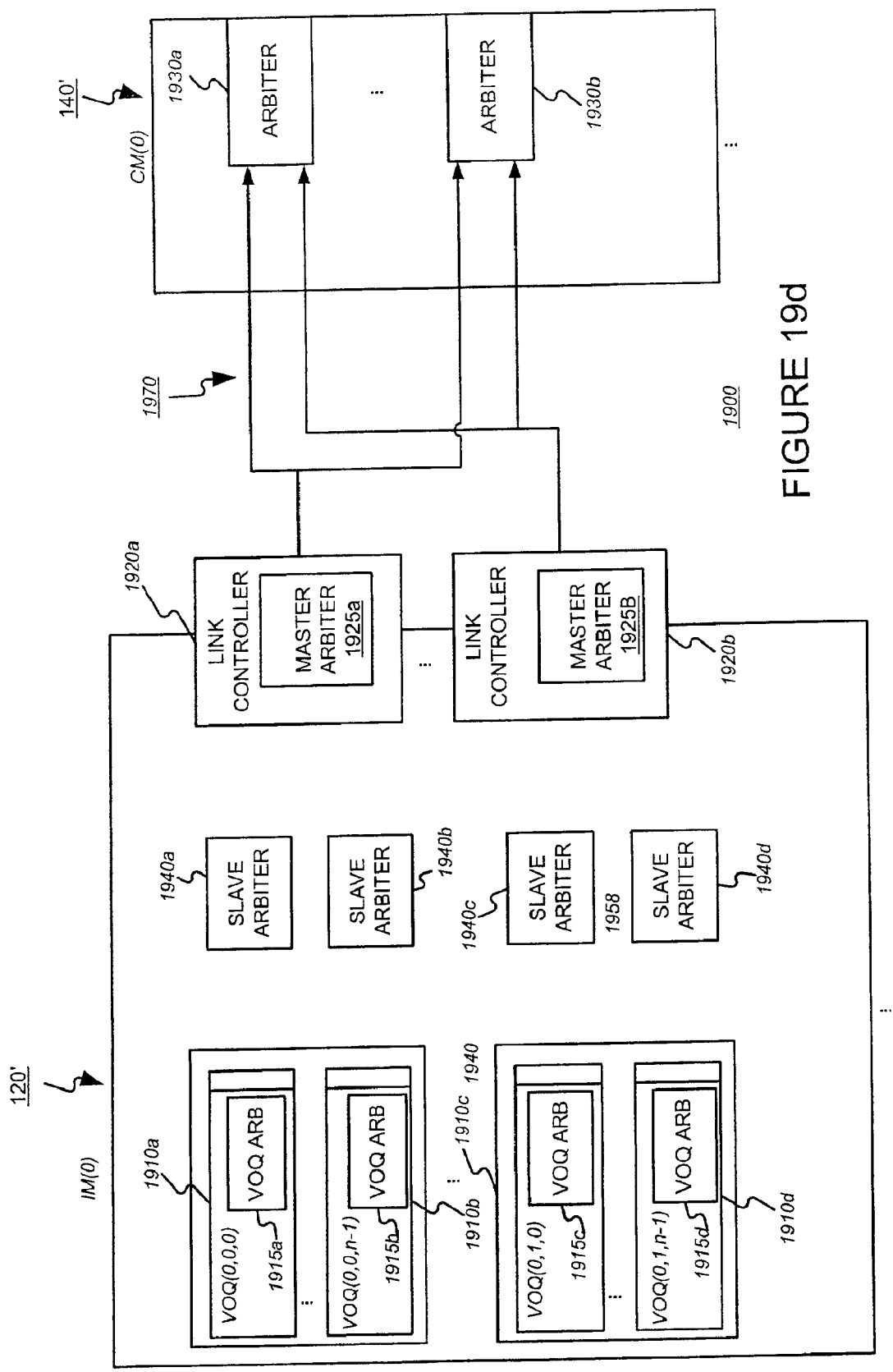
Figure 19E:
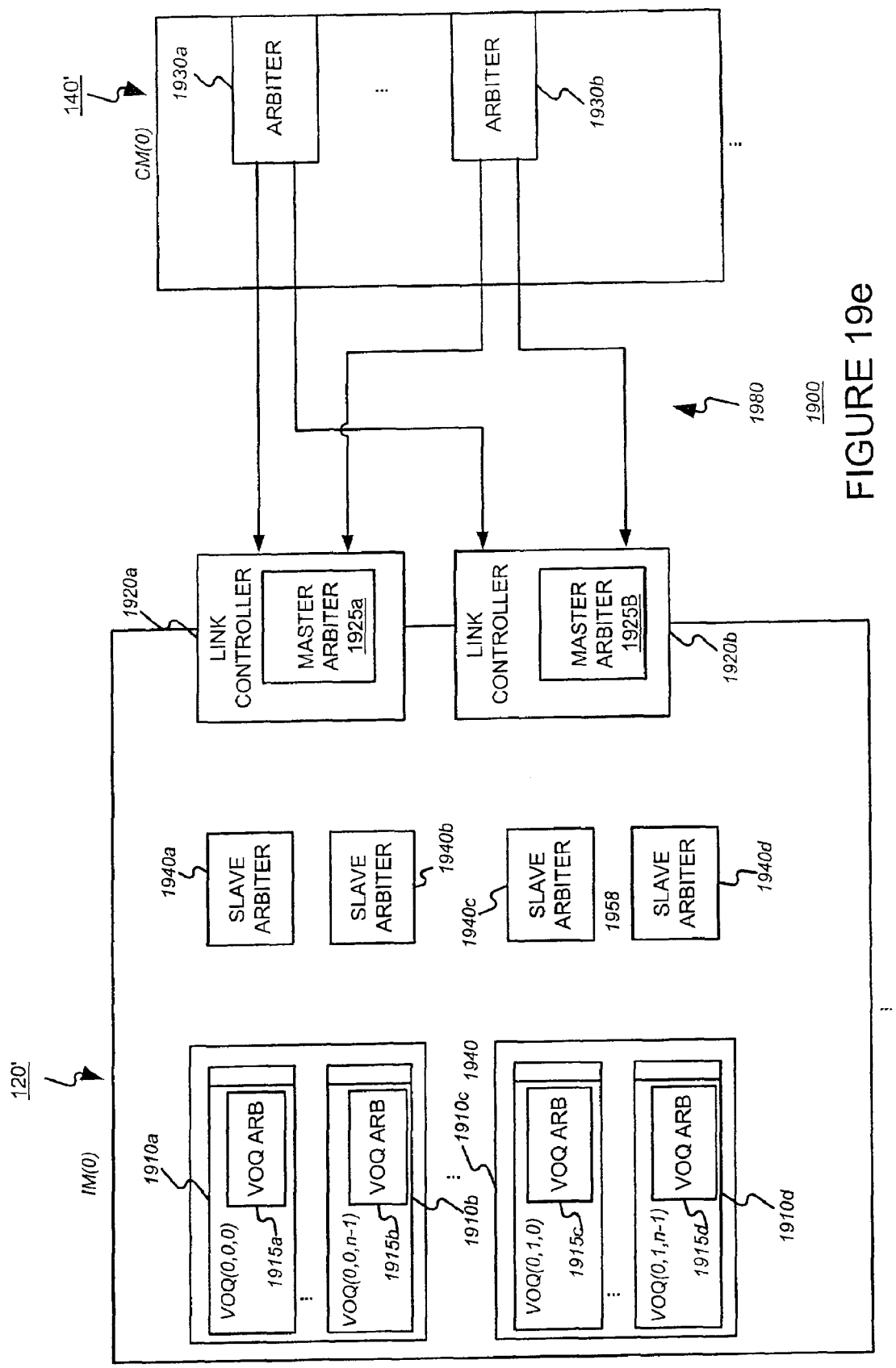

Referring to FIG. 19d, signaling lines, depicted by solid lines 1970, may be used by the line controllers 1920 to send requests to the arbiters 1930 of the central modules 140'. (Recall, e.g., the fifth communication 1355 of FIG. 13.) Although not shown, a given link controller 1920 may submit requests to arbiters 1930 across different central modules (CMs) 140'. Indeed, the requests may be sent to arbiters 1930 associated with links $L_o$ that go to an output module (OM) 160 corresponding to the VOQ 1910 that was matched with the link controller 1920 in the first phase of the scheduling invention. Referring to FIG. 19e, signaling lines, depicted by solid lines 1980, may be used by the central module arbiters 1930 to send a grant to a selected link controller 1920. (Recall, e.g., the sixth communication 1367 of FIG. 13.)

Figure 19F:
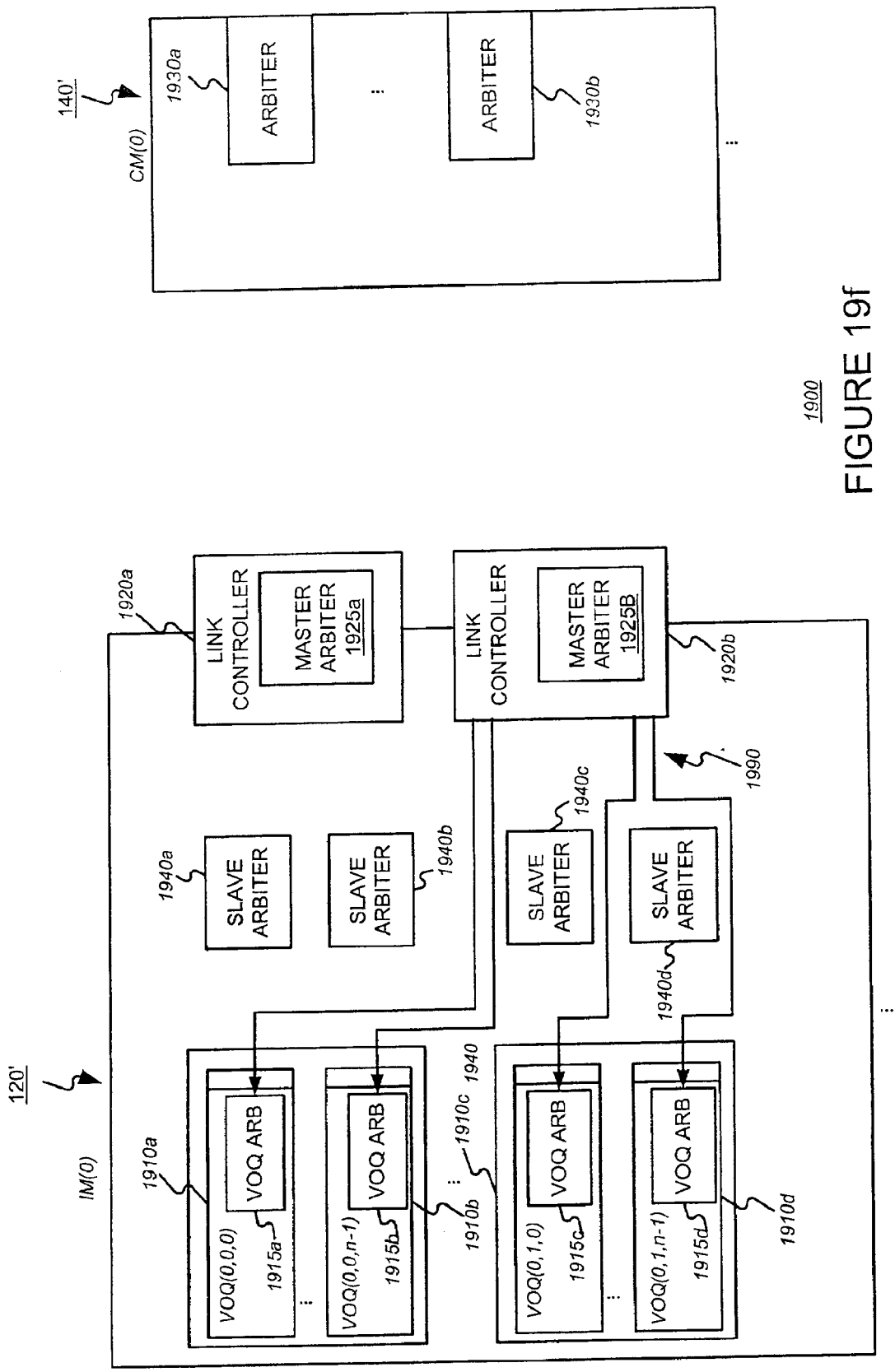

Finally, referring to FIG. 19f, the link controllers 1920 may use signaling lines, depicted by solid lines 1990, to inform the appropriate VOQs 1910 that they have won arbitration and can therefore send their cells (e.g., in an upcoming cell time slot). To simplify the drawing, the signaling lines from the link controller 1920a to each of the VOQs 1910 have been omitted.

The VOQs 1910, their arbiters 1915, the link controllers 1920, their arbiters 1925 and 1940, and the arbiters 1930 of the central modules 140' may be effected by programmable logic arrays, application specific integrated circuits, and/or microprocessors operating in accordance with stored instructions. Memory may be used to store the various state information (Recall, e.g. elements 1312, 1335, 1345, and 1365 of FIG. 13.) used by these components.

§4.3.4 Examples Illustrating Operations Performed By an Exemplary Embodiment FIGS. 20(a) through 20(d) illustrate an example of operations of the first phase of an exemplary dispatching method. In this example, the invention is embodied in a Clos-network switch, such as that 100 illustrated in FIG. 1. In the exemplary switch 100", n=m=k=2. To simply the drawings, FIGS. 20(a) through 20(d) do not show the second input module (IM(1)), the second central module (CM(1)), or the second output module (OM(1)). Finally, notice that each input module 120' includes three groups (G(i,0), G(i,1) and G(i,2)) of VOQs, and therefore, three groups of slave arbiters.

Figure 20A:
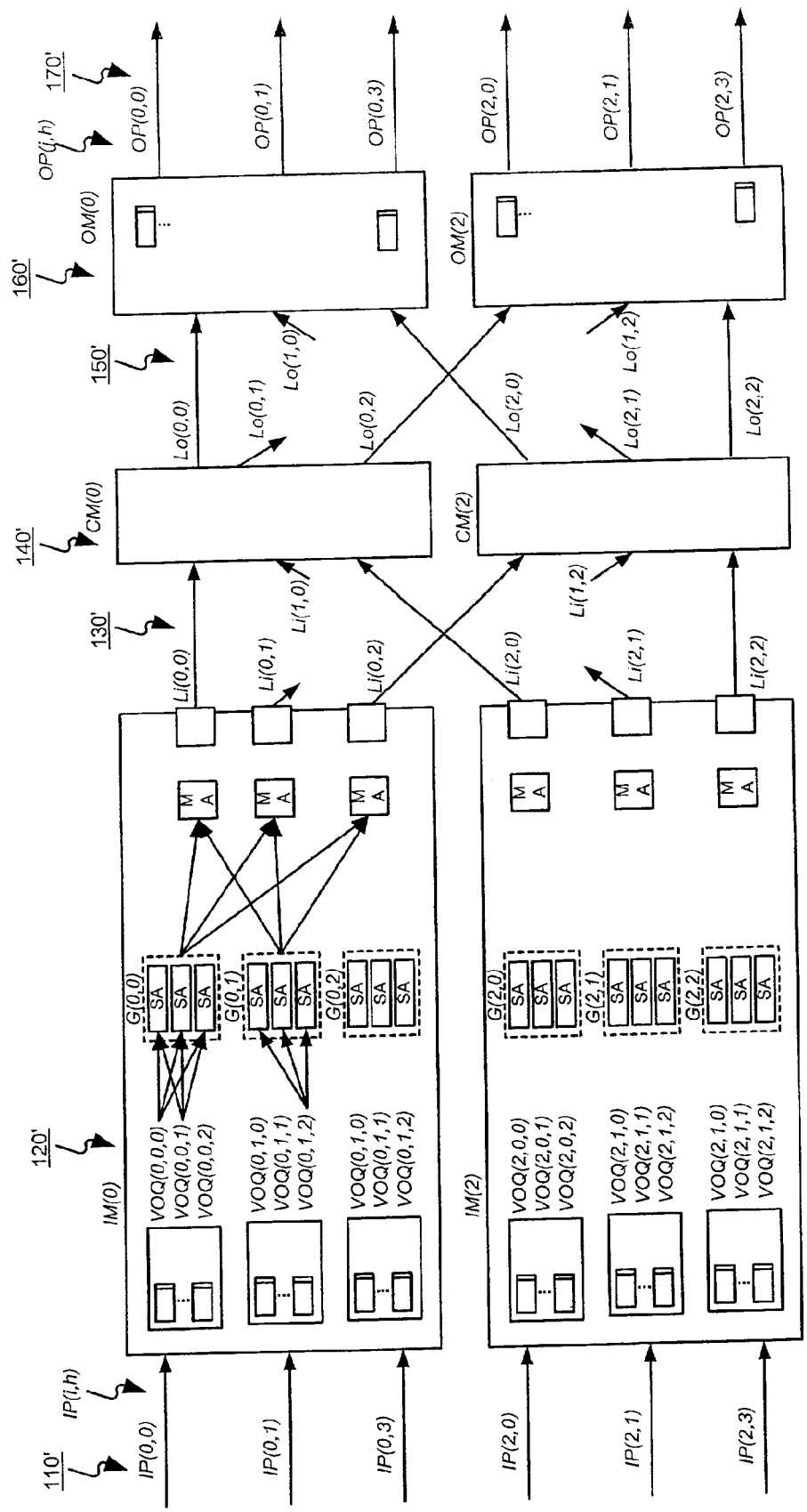

In the following example, assume that VOQ(0,0,0), VOQ (0,0,1), and VOQ(0,1,2) are non-empty. As shown in FIG. 20(a), these non-empty VOQs each broadcast a request to all outgoing-link slave arbiters (SAs) in their group. Further, any group having at least one non-empty VOQ broadcasts a request to all outgoing-link master arbiters (MAs) in the given input module (IM) 120. Recall, e.g., the first communications 1315a and 1315b of FIG. 13, as well as 1410 and 1420 of FIG. 14 and 1510 and 1520 of FIG. 15.)

Figure 20B:
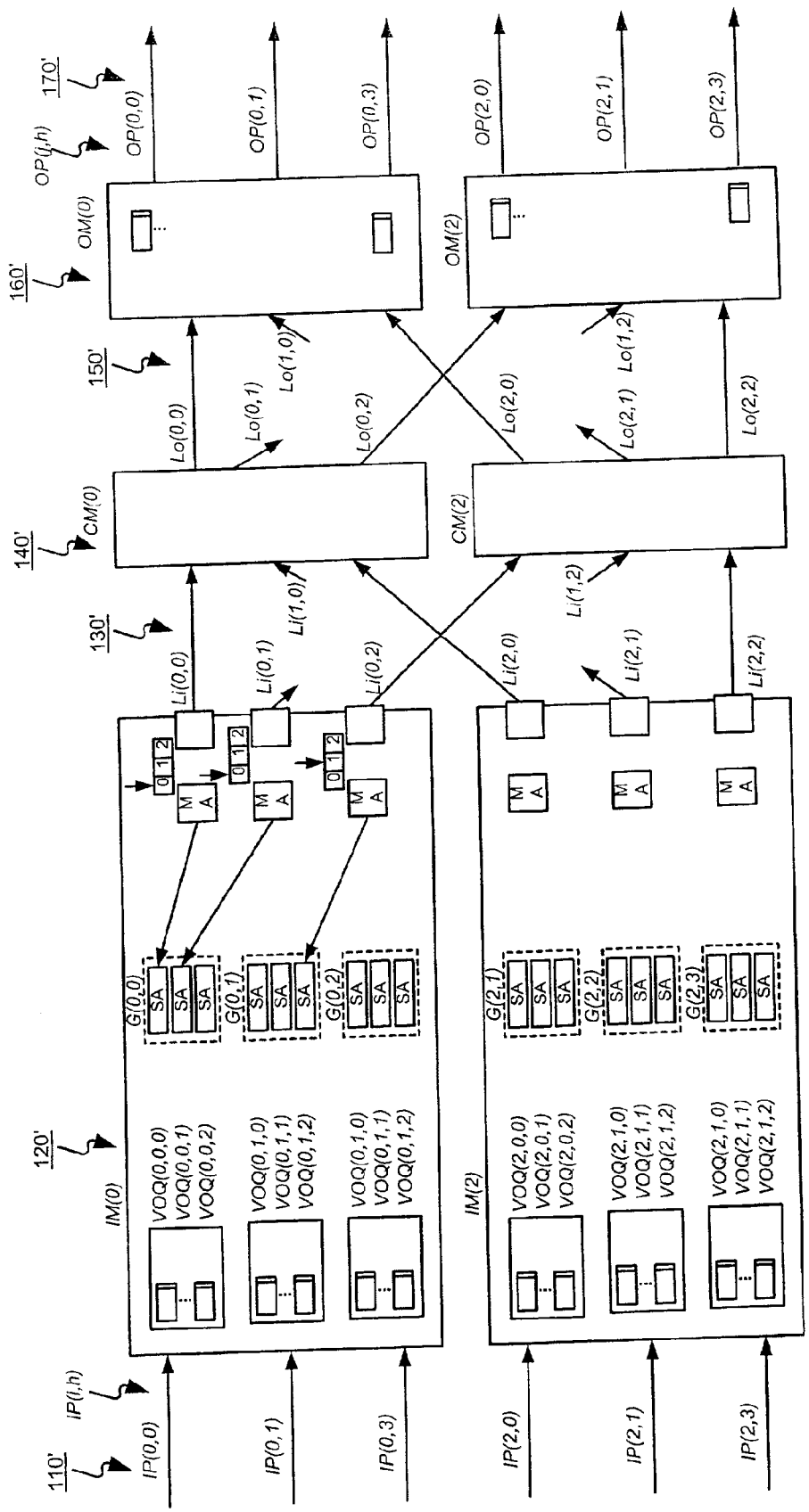

As shown in FIG. 20(b), it is assumed that outgoing-link master arbiters (MAs) associated with outgoing-links $L_i(0,0)$, $L_i(0,1)$ and $L_i(0,2)$ prefer the groups $G(i,0)$, $G(i,0)$ and $G(i,1)$, respectively. Thus, as shown, the first master arbiter sends a grant back to the first slave arbiter of group $G(i,0)$, the second master arbiter sends a grant back to the second slave arbiter of group $G(i,0)$, and the third master arbiter sends a grant back to the third slave arbiter of group $G(i,1)$. (Recall, e.g., the second communication 1336 of FIG. 13, as well as the method 1330b' of FIG. 17.

Figure 20C:
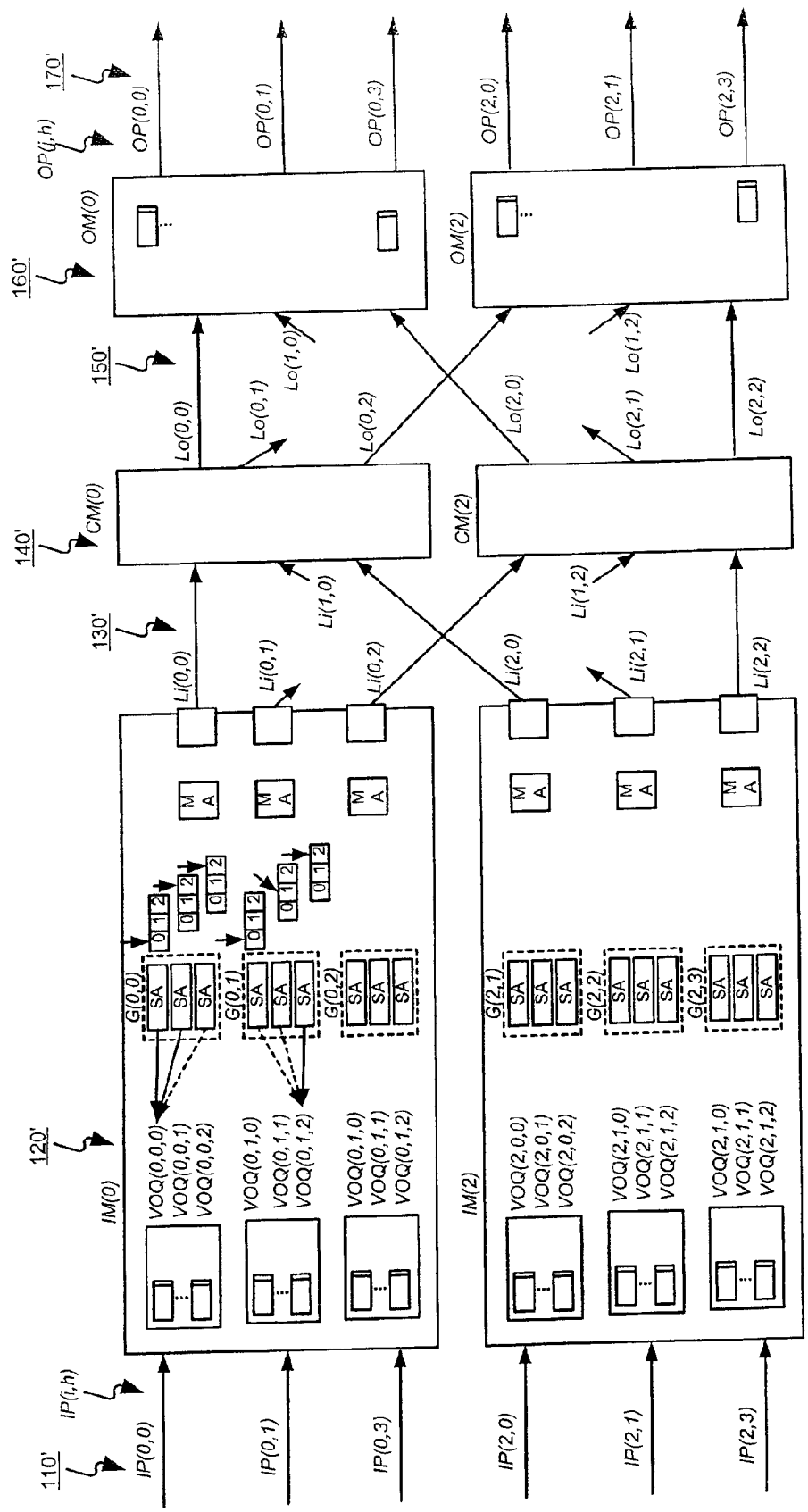

Referring now to FIG. 20(c), in response to, or alternatively, independent of, the received grant signals, the slave arbiters select a candidate VOQ. The slave arbiters may then send back grant signals to a selected one of the candidate VOQs (i.e., those VOQs that sent a request) based on arbitration state information (e.g., a round-robin pointer). In the first alternative, only those slave arbiters (SAs) that received a grant from a master arbiter (MAs) will send grants. (Recall, e.g., conditional branch point 1620 of FIG. 16.) Such grants are indicated by solid lines. In this example, the first and second slave arbiters of the group $G(0,0)$ prefer $VOQ(0,0,0)$ and $VOQ(0,0,2)$, respectively. Since $VOQ(0,0,0)$ is among those VOQs to broadcast a request, the first slave arbiter (SA) sends a grant signal back to $VOQ(0,0,0)$. On the other hand, since $VOQ(0,0,2)$ was empty and did not broadcast a request, the second slave arbiter (SA) will try subsequent VOQs until one that sent a request (i.e., a non-empty VOQ) is encountered. In this case, the next VOQ that sent a request is $VOQ(0,0,0)$. Accordingly, the second slave arbiter (SA) also sends a grant signal back to $VOQ(0,0,0)$. The third slave arbiter (SA) of the group $G(0,1)$ prefers $VOQ(0,1,2)$. Since $VOQ(0,1,2)$ submitted a request, the third slave arbiter (SA) sends it a grant, as indicated by the solid line. (Recall, e.g., the third communication 1337 of FIG. 13, as well as the method 1330' of FIG. 16.) The dashed lines depict grants that would take place, based on the states of the pointers, in an alternative embodiment in which the slave arbiters send grants independent of their receiving a grant from a master arbiter.

Figure 20D:
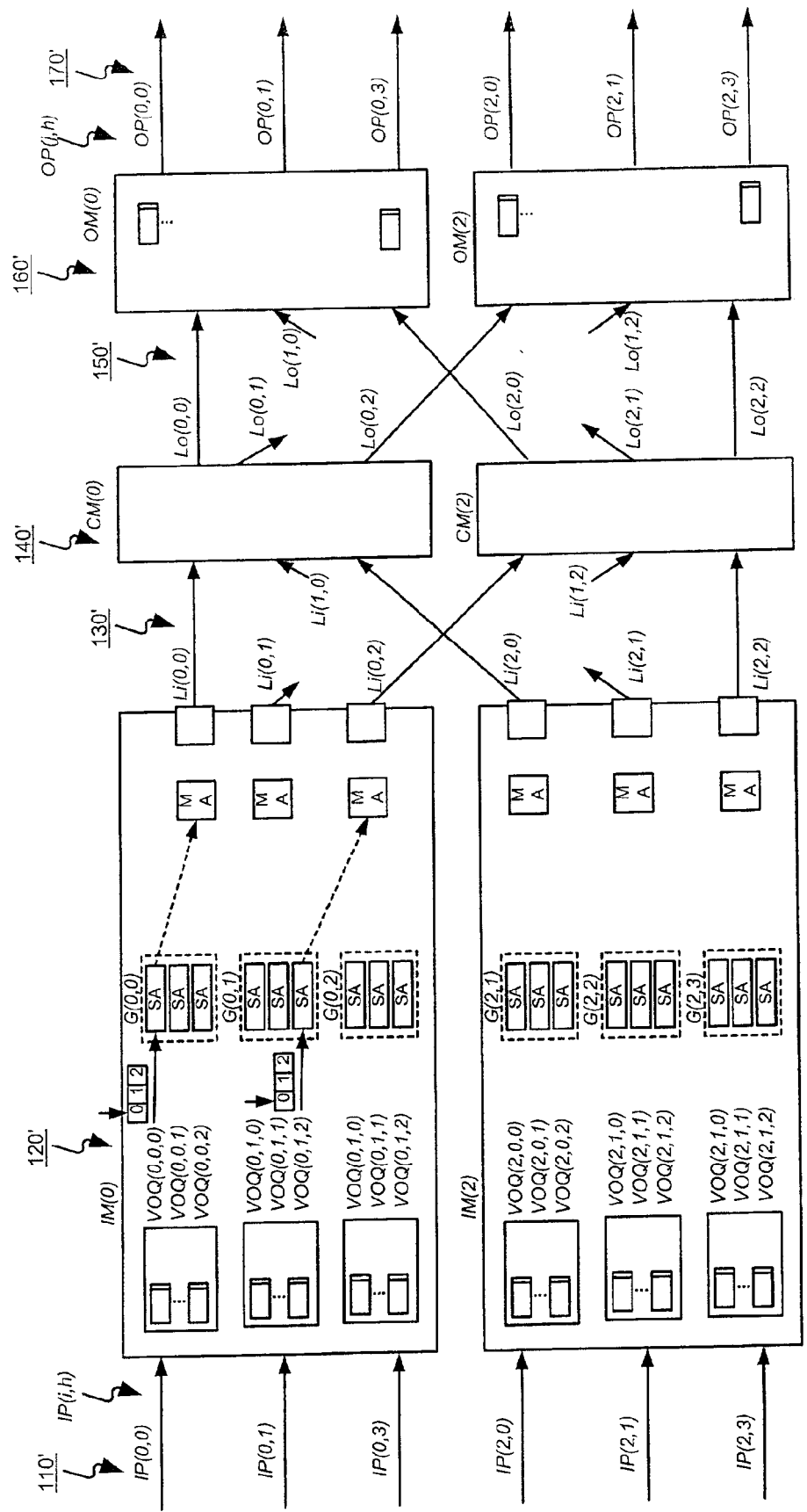

Referring to FIG. 20(d), it is assumed that the arbiters associated with the virtual output queues $VOQ(0,0,0)$ and $VOQ(0,1,2)$ both prefer outgoing-link $L_i(0,0)$, and thus the first slave arbiter (SA) of their respective groups. Since both the first and second slave arbiters (SAs) of the first group ($G(0,0)$) sent a grant to $VOQ(0,0,0)$, the arbiter associated with $VOQ(0,0,0)$ selects one. In this example, it selects outgoing-link $L_i(0,0)$, and thus the first slave arbiter, and sends a grant signal back as shown in FIG. 20(d). On the other hand, in the second group ($G(0,1)$) since the first and second slave arbiters (SAs) did not send a grant to $VOQ(0,1,2)$, the arbiter associated with $VOQ(0,1,2)$ will try subsequent outgoing-links until one that sent a grant is encountered. In this case, the next, and indeed only slave arbiter (SA) to send a grant is the third slave arbiter (associated with outgoing-link $L_i(0,2)$. Accordingly, as shown in FIG. 20(d), the arbiter associated with $VOQ(0,1,2)$ sends a grant signal back to outgoing-link $L_i(0,2)$. (Recall, e.g., the fourth communication 1347 of FIG. 13, as well as 1810, 1840 and 1850 of FIG. 18.)

Assuming that more iterations of the foregoing steps are possible within one cell time slot, notice that $VOQ(0,0,1)$ remains non-empty, but was not matched with an outgoing-link ($L_i$) during the first iteration. This VOQ may rebroadcast its request. (Recall, e.g., 1820 and 1830 of FIG. 18.)

Although not shown in FIGS. 20(a) through 20(d), each outgoing-link that was matched with a non-empty VOQ during the first phase of the dispatching invention will request a central module and arbiters at the central modules will arbitrate such requests. Once an outgoing-link $L_o$ of a central module is matched with an outgoing-link $L_i$ of an input module (and therefore to a VOQ), the state information (e.g., pointers) for each of the arbiters are updated and the cells are dispatched from those VOQs matched with an outgoing-link $L_o$.

§4.3.5 Conclusions

Like the dispatching invention described in §4.2 above, the improved dispatching invention (i) does not require buffers in the second stage (thereby avoiding cell out-of-sequence problems), (ii) can achieve 100% throughput (independent of the number of iterations of the first phase) under uniform traffic (once in the stable state, in which every VOQ is occupied with backlogged cells, the arbiters (e.g., round-robin pointers) become desynchronized such that, even when the offered traffic load is full, no contention occurs), and (iii) has a time complexity O(m log nk). Further, the improved dispatching invention reduces (e.g., by more than 30%) the actual dispatch scheduling time. Furthermore, the improved dispatching invention greatly reduces the complexity (e.g., number) of interconnection wires between arbiters. This permits the improved scheduling invention to be even more scaleable.

§4.4 Pipelining Dispatch Scheduling Using a Plurality of Sub-schedulers

The time needed to schedule the dispatching of cells, as described in the first embodiment in §4.2 (referred to as "the CRRD technique"), or the refined embodiment in §4.3 (referred to as "the CMSD technique"), may be relaxed by using a plurality of sub-schedulers. More specifically, the matching operations described in §§4.2 and 4.3 above may be performed over more than one cell time slot.

Functions that may be performed by this improvement are introduced in §4.4.1. Then, exemplary operations that may be carried out by this improvement are described in §4.4.2. Thereafter, exemplary methods and apparatus for performing those operations are described in §4.4.3. An example illustrating operations that may be performed by an exemplary embodiment of this improvement is presented in §4.4.4. Finally, some conclusions about this improvement are provided in §4.4.5.

§4.4.1 Functions That May Be Performed

A first aspect of the improvement of the present invention may function to relax the time needed for scheduling by the matching techniques described in §§4.2 and 4.3 above. (Recall that with these techniques, the matching was completed within one cell time slot.) The improvement may accomplish this by operating several sub-schedulers in a pipelined manner. In this way each cell may use more than one cell time slot to reach arbitration, so long as the sub-schedulers, collectively, finish matching for at least one cell every time slot. The present invention may insure that this occurs by providing P sub-schedulers, where each of the P sub-schedulers generate a match(es) in no more than P cell time slots.

§4.4.2 Exemplary Operations

FIG. 24 is a bubble chart illustrating operations that may be performed in accordance with the improvement. When a new cell arrives at the switch, the VOQ operation(s) 2415 may place the cell in the appropriate VOQ 2412. It 2415 may also inform the main scheduler operation(s) 2420 about the stored cell. Next, the main scheduler operation(s) 2420 may increment the value (C(i,v) when CRRD matching is used, or C(i,j,h) when CMSD matching is used) of the request counter (RC(i,v) when CRRD matching is used, or RC(i,j,h) when CMSD matching is used) corresponding to the VOQ (VOQ(i,v) when CRRD matching is used, or VOQ(i,j,h) when CMSD matching is used) storing the cell. That is, C(i,v)=C(i,v)+1 when CRRD matching is used, or C(i,j,h)=C(i,j,h)+1 when CMSD matching is used.

At the beginning of every cell time slot t, the main scheduler operation(s) 2420 may check to see if there are any cells in a VOQ that are waiting dispatch arbitration. If it finds that there is a cell waiting for arbitration, and that the next sub-scheduler is not already handling a cell in the same VOQ (i.e., if C(i,v)>0 and F(i,v,p)=0 when CRRD matching is used, or if C(i,j,h)>0 and F(i,j,h,p)=0 when CMSD matching is used, where p=t mod P in both cases), it may decrement the value (C) of the associated request counter (RC) 2422 and set the associated request flag (RF) 2424 (i.e., C(i,v)=C(i,v)−1 and F(i,v,p)=1 when CRRD matching is used, or C(i,j,h)=C(i,j,h)−1 and F(i,j,h,p)=1 when CMSD matching is used) If the foregoing conditions are not met (i.e., if C(i,v)=0, or if F(i,v,p)=1 when CRRD matching is used, or if C(i,j,h)=0, or F(i,j,h,p)=1 when CMSD matching is used) it may leave the value (C) of the request counter (RC) 2422 and the value (F) of the request flag (RF) 2424 unchanged.

Sub-scheduler p may perform a matching operation 2426, such as either the CRRD technique, or the CMSD technique, described in §§4.2 and 4.3, respectively, above. It may do so at a time t, where $P1+p \leq t < P(1+1)+p$, where 1 is an integer. In one embodiment, to apply the CRRD matching technique in a sub-scheduler p, the request flag F(i,v,p) may be used instead of VOQ requests. Similarly, to apply the CMSD matching technique in a sub-scheduler p, the request flag F(i,j,h,p) may be used instead of VOQ requests. Each sub-scheduler p may have its own (e.g., round-robin) pointers. The position of pointers in a sub-scheduler p may be modified by the results only from sub-scheduler p. The operation of the CRRD and CMSD matching techniques in a sub-scheduler p may be the same as that of the non-pipelined schemes.

By the end of every time slot t, the sub-scheduler p that started the matching operation P time slots previously (i.e., where p=(t−(P−1)) mod P), will have completed the matching operation 2426. When an input-outgoing link (e.g., of a central module (CM)) pair (i,v) is matched, the main scheduler operation(s) 2420 may unset the $p^{th}$ sub-scheduler's corresponding flag (i.e., F(i,v,p)=0 when CRRD matching is used, or F(i,j,h,p)=0 when CMSD matching is used). In this case, the VOQ operations 2415 may be allowed to send the HOL cell in the associated VOQ 2412 to the outgoing link (e.g., of a central module (CM), via an outgoing link of the input module (IM)) at the next time slot. This may be used to ensure that cells from the same VOQ 2412 are transmitted in sequence, even if L(i,v)−C(i,v)>1 when CRRD matching is used, or L(i,j,h)−C(i,j,h)>1 when CMSD matching is used, where L(i,v) and L(i,j,h) are the occupancies of VOQ(i,v) and VOQ(i,j,h), respectively. (Note that L(i,v)−

$$C(i, v) = \sum_{p=0}^{P-1} F(i, v, p), \text{ and } L(i, j, h) - C(i, j, h) = \sum_{p=0}^{P-1} F(i, j, h, p)).$$

When an input-outgoing link pair is not matched, the flag is not changed. Note that in one alternative, rather than have the main scheduler operation(s) unset the $p^{th}$ sub-scheduler's corresponding flag when an input-outgoing link pair is matched, the sub-scheduler operation(s) 2426 may reset the flag (F(i,v,p) when CRRD matching is used, or F(i,j,h,p) when CMSD matching is used) directly.

Timing operations 2450 may determine a current cell time slot (t), and using parameter P 2455, may determine control signals based on its present determined value p.

Having described various operations that may be performed in accordance with the improvement, exemplary methods and apparatus for implementing such operations are now described in §4.4.3 below.

§4.4.3 Exemplary Methods and Apparatus for Performing the Exemplary Operations Exemplary methods that may be used to implement various operations of the present invention are described in §4.4.3.1. Then, exemplary apparatus that may be used to implement various operations of the present invention are described in §4.4.3.2.

§4.4.3.1 Exemplary Methods

In the following description of methods, it is assumed that the sub-schedulers each run the CRRD matching method described in §4.2. If the sub-schedulers were to run the CMSD matching method described in §4.3, VOQ(i,j,h) would replace VOQ(i,v), RC(i,j,h) would replace RC(i,v), C(i,j,h) would replace C(i,v), RF(i,j,h,p) would replace RF(i,v,p), and F(i,j,h,p) would replace F(i,v,p).

FIG. 25 is a high-level flow diagram of an exemplary method 2415' that may be used to effect a virtual output queue operation 2415. The order in which the acts are effected is not intended to be limited to the order shown. Referring to conditional branch point 2510, when a new cell arrives at the VOQ(i,v) (or VOQ(i,j,h)) 2412, the main scheduler operation(s) 2420 may be informed, as indicated by block 2520. (See, e.g., communication 2430 of FIG. 24.) Referring to conditional branch point 2530, if a previous match request has succeeded, the HOL cell in VOQ(i,v) (or VOQ(i,j,h)) 2412 may be sent to outgoing link j (e.g., in the next cell time slot). A successful match request indication may be provided directly from the sub-scheduler (p) (See, e.g., communication 2440 of FIG. 24.), or via the main scheduler operation(s) 2420.

The main scheduler operation(s) 2420 may serve to manage the request counters 2422, the request flags 2424, and the sub-scheduler operations 2426. The acts related to these management responsibilities may be triggered by events (e.g., the entry of a new cell into a VOQ) and may be run periodically or in accordance with some timing-based control (e.g., based on a value (p) derived from a current time slot (t)). Indeed, the timing operations 2450 of FIG. 24 may be thought of as one of the main scheduler operation(s) 2420. FIG. 26 is a flow diagram of an exemplary method 2420a' for event-triggered acts of the main scheduler operation(s). FIG. 27 is a flow diagram of an exemplary method 2420b' for timing-controlled acts of the main scheduler operation(s). Each is described below.

FIG. 26 is a high-level flow diagram of an exemplary method 2420a' for effecting main scheduler event-triggered operations. Referring to the conditional branch point 2610 and block 2620, when a new cell arrives at a VOQ, this fact is relayed to the main scheduling operation(s) 2520 (Recall 2510 and 2520 of FIG. 25.) and the count value C(i,v) (or C(i,j,h)) of the counter RC(i,v) (or RC(i,j,h)) corresponding to the VOQ receiving the cell, is incremented.

FIG. 27 is a high-level flow diagram of an exemplary method 2420b' for effecting main scheduler timing-controlled operations. The order in which the acts are effected is not intended to be limited to the order shown. As shown by loop 2740–2790, the main steps of the method 2420b' are run for each cell time slot (t) (e.g., at the start of each cell time slot). As shown by loop 2750–2780, the main steps of the method 2420b' may be run for each VOQ. Note that separate instances of the method 2420b' could be run in parallel for the various VOQs. As shown in block 2760, p is set to t mod P. (Note that p can be thought of as "timing-based".) Referring now to conditional branch point 2770, the method 2420b' may determine whether C(i,v)>0 and F(i,v,p)=0 (or C(i,j,h)>0 and F(i,j,h,p)=0). That is, the method 2420b' may determine if there is a cell in VOQ(i,v) (or VOQ(i,j,h)) awaiting dispatch arbitration and if sub-scheduler p is available to VOQ(i,v) (or VOQ(i,j,h)). If these conditions are met, the $p^{th}$ sub-scheduler 2428 may be informed, e.g., by setting flag F(i,v,p) (or F(i,j,h,p)) to "1", as indicated by block 2772. Further, the request counter may be decremented (C(i,v)=C(i,v)−1) (or C(i,j,h)=C(i,j,h)−1), as indicated by block 2774.

FIG. 28 is a high-level flow diagram of an exemplary method 2426' that may be used to effect each of the sub-scheduler operation(s) 2426. As indicated by conditional branch points 2810 and 2820, and block 2830, in each case, the particular sub-scheduler p may run a matching operation when the time slot t≧Pl+p and t<P (l+1)p. (This is illustrated for P=3 in FIG. 31, described in §4.4.4 below.) That is, as indicated by conditional branch point 2820, it is determined whether or not the request flag (RF) is set to one (F(i,v,p)=1 when CRRD matching is used, or F(i,j,h,p)=1 when CMSD matching is used). If so, the sub-scheduler p may run the matching (e.g., CRRD or CMSD) technique, for the (HOL) cell of VOQs (based on their corresponding request counters) as indicated by block 2830. Further, at the end of the time slot, a sub-scheduler will have finished its matching operations. This will be the case for sub-scheduler p, where p=(t−(P−1) mod P). Thus, as indicated by conditional branch points 2840 and 2850, if p=(t−(P−1) mod P), it is determined whether or not the match request was successful (for VOQ(i,v) when CRRD matching is used, or VOQ(i,j,h) when CMSD matching is used). If so, the request flag RF(i,v,p) (or RF(i,j,h,p)) may be unset (F(i,v,p)=zero when CRRD matching is used, or F(i,j,h,p)=zero when CMSD matching is used) as indicated by block 2860, and the appropriate VOQ may be informed of this, as indicated by block 2860, so that it will send its (HOL) cell to the appropriate outgoing link. Note that in this embodiment, each sub-scheduler p generates a match for each requested outgoing link. An outgoing link is requested if any of the VOQs(_,v) is non-empty.

§4.4.3.2 Exemplary Apparatus

In an exemplary embodiment of the invention, the main scheduler may include $nk^2$ request counters, and P sub-schedulers. Each of the P sub-schedulers may have $nk^2$ request flags. Each of the P sub-schedulers may operate in a pipeline manner, thus allowing each sub-scheduler to take P time slots, and still produce a match(es) (using, e.g., CRRD, CMSD, or another matching technique) in every cell time slot.

In the explanation of an exemplary embodiment of the invention, the following terms will be used:

N=the number of input ports and output ports;

n=the number of input ports and output ports for each IM and OM, respectively;

k=the number of IMs, as well as the number of OMs;

m=the number of CMs;

IM(i)=the ith input module, where 0≦i≦k−1;

CM(r)=the rth central module, where 0≦r≦m−1;

OM(j)=the jth output module, where 0≦j≦k−1;

IP(i,h)=the hth input port at IM(i), where 0≦h≦n−1;

OP(j,h)=the $h^{th}$ output port at OM(j), where 0≦h≦n−1;

VOQ(i,j,h)=the VOQ in IM(i) that stores cells destined for OP(j,h);

P=the number of sub-schedulers in each input module;

VOQ(i,v)=the VOQ of input I, where v=hk+j and 0≦v≦nk−1, and where h is the associated output port RC(i,v)=the request counter associated with VOQ(i,v);

RC(i,j,h)=the request counter associated with VOQ(i,j,h)

$L_{max}$=the maximum VOQ occupancy;

C(i,v)=the value of RC(i,v)—the number of accumulated requests associated with VOQ(i,v) that have not been sent to any sub-scheduler, where 0≦C(i,v)≦$L_{max}$;

C(i,j,h)=the value of RC(i,j,h)—the number of accumulated requests associated with VOQ(i,j,h) that have not been sent to any sub-scheduler, where 0≦C(i,j,h)≦$L_{max}$;

RF(i,v,p)=the request flag associated with VOQ(i,v) and sub-scheduler p, where 0;

RF(i,j,h,p)=the request flag associated with VOQ(i,j,h) and sub-scheduler p;

F(i,v,p)=the value of RF(i,v,p), where 0≦F(i,v,p)≦1; and

F(i,j,h,p)=the value of RF(i,j,h,p), where 0≦F(i,j,h,p)≦1. When F(i,v,p) is set to one, this indicates that input i has a request to outgoing link v in sub-scheduler p. When F(i,v,p) is set to zero, this indicates that input i has no request to outgoing link v in sub-scheduler p. Similarly, when F(i,j,h,p) is set to one, this indicates that input i has a request to output port j,h in sub-scheduler p, and when F(i,j,h,p) is set to zero, this indicates that input i has no request to output port j,h in sub-scheduler p.

In the following, §4.4.3.2.1 describes exemplary apparatus for implementing the improvement to the present invention in a centralized manner, while §4.4.3.2.2 describes exemplary apparatus for implementing the improvement to the present invention in a distributed manner.

§4.4.3.2.1 Exemplary Apparatus—Centralized

FIGS. 29A and 29B are block diagrams illustrating exemplary components and interconnections of exemplary apparatus 2900a and 2900b, respectively, that may be used to effect at least some of the operations of the present invention, in which the sub-schedulers implement CRRD and CMSD matching, respectively. To simplify the example, only nine (9) inputs, spread across three (3) input modules 2920, are shown. Each of the inputs 2910 includes (or more generally, is associated with a corresponding) a number of virtual output queues (VOQs) 2915 corresponding to the number of outputs. An exemplary main scheduling module 2925 may include (or more generally, be associated with) P sub-schedulers 2950 and $nk^2$ request counters (RCs) 2940, each of the request counters (RCs) being associated with a VOQ (and therefore an input-outgoing link pair). To simplify the drawing, only the components associated with the VOQs of some of the inputs are shown. Each of the P sub-schedulers 2950 may include (or more generally, be associated with) $nk^2$ request flags (RFs) 2960, each of the request flags (RFs) 2960 in each of the sub-schedulers 2950 being associated with a VOQ (and therefore an input-outgoing link pair). The VOQ operations 2415 may be effected on the virtual output queues 2915. The main scheduler operations 2420 and timing operations 2450 may be effected on the scheduling control module 2930. Finally, the sub-scheduling operations 2426 may be effected on the sub-schedulers 2950. Naturally, such operations only need to be associated with the VOQs of an input, and can be effected in many other ways.

There are various signaling lines and links that may be provided. Although not shown explicitly, the scheduling control module 2930 may include timing based control signals. The signaling line(s), depicted by the dashed line 2992, may be used to indicate, to the scheduling control module 2930, the arrival of new cells, and to indicate to the VOQs when a match request was successful. The signaling lines, depicted by dotted lines 2994 and 2996, may be used by the scheduling control module 2930 to control the request counters 2940 and the request flag 2960 values, and to permit communications between the scheduling control module 2930 and each of its sub-schedulers 2950.

The VOQ operations 2415, the main scheduler operations 2420, and the sub-scheduler operations 2426 may be effected by programmable logic arrays, integrated circuits such as application specific integrated circuits, and/or microprocessors operating in accordance with (e.g., stored) instructions. Memory (referred to generally as a "machine readable medium") may be used to store the various state information, i.e., the values of the request counters and request flags), used by these components. Similarly, memory can be used to buffer cells at the virtual output queues.

§4.4.3.2.2 Exemplary Apparatus—Decentralized

FIGS. 30A and 30B are block diagrams illustrating exemplary components and interconnections of exemplary apparatus 3000a and 3000b, respectively, that may be used to effect at least some of the operations of the present invention, in which the sub-schedulers implement CRRD and CMSD matching, respectively. Again, to simplify the example, only nine (9) inputs, spread across three (3) input modules 3020, are shown. Each of the inputs 3010 includes a (or more generally, is associated with a corresponding) number of virtual output queues 3015 corresponding to the number of outputs. As shown in FIGS. 30A and 30B, the request counters 3045 and sub-schedulers 3050 may be distributed (e.g., across the input modules IMs and/or central modules CMs). Thus, for example, in a switch having three (3) input modules IMs 3020, each input module IM 3020 having three (3) inputs 3010, each input module IM 3020 may include (or more generally, may be associated with) nk (e.g., nine (9)) request counters 3045, one for each of the nk (e.g., nine (9)) VOQs 3015'. Further, each of P sub-schedulers 3050 may include $nk^2$ request flags 3060. Although not shown, the $nk^2$ request flags 3060 may be distributed, nk associated with each of the k input modules IMs 3020. The dotted lines 3090 indicate the distributed nature of each sub-scheduler. Preferably, parts of each sub-scheduler 3060 reside in each input module IM 3020 and central module CM 3040.

§4.4.4 Example Illustrating Operations Performed By an Exemplary Embodiment

Referring to FIG. 31, at the end of time slot t=3, when p=1(=(3−(3−1)) mod 3), the p=1 sub-scheduler will have completed its matching operation. Similarly, as indicated by FIG. 31, at the end of cell time slot t=4, sub-scheduler 2 will finish matching, and at the end of cell time slot t=5, sub-scheduler 0 will finish matching. If new cells continue to arrive, this pattern will continue and the main scheduler will be able to produce a match at the end of every cell time slot.

Therefore, as this example illustrates, the main scheduler was given more time to complete the matching by allowing three time slots instead of just one. In addition, the sub-schedulers may implement matching (e.g., CRRD, or CMSD) techniques.

§4.4.5 Conclusion

In view of the foregoing, the scheduling technique and apparatus of the present invention relax the time for scheduling, thereby enabling large scale and/or high throughput switching. By adopting the CRRD or CMSD scheme, 100 percent throughput under uniform traffic is possible.

The scheduling time P does not degrade delay performance significantly. Indeed, since the improvement relaxes the time needed to perform a match, more (e.g., first phase) iterations under CRRD or CMSD are possible, thereby improving delay performance and throughput.

Assuming a cell size, $L_{cell}=64 \times 8$ bits, the allowable scheduling time $T_{sch}$ may be expressed as:

$$T_{sch}=PL_{cell}/C$$

where C is a port speed. Thus, the allowable scheduling time $T_{sch}$ decreases with port speed C, but increases with P. For example, in a non-pipelined CRRD matching scheme, if C=40 Gbits/second, $T_{sch}=12.8$ ns. With such a timing constraint, it is difficult to implement round-robin arbiters that support a large number of ports (N) in hardware, using available CMOS technologies. On the other hand, the improvement of the present invention can expand $T_{sch}$ by increasing P. Accordingly, when C=40 Gbits/second and P=4, $T_{sch}$ becomes 51.2 ns. As can be appreciated from this example, such pipelining expands the allowable scheduling time for dispatching, so that faster port speeds can be supported, even as N increases.

What is claimed is:

1. For use with a multi-stage switch having
   a plurality of central modules, each having outgoing links, and
   a plurality of input modules, each including
      a first number of input ports, each of the input ports having a second number of virtual output queues, and
      outgoing links coupled with each of the plurality of central modules, and
   a third number of sub-schedulers, each of the third number of sub-schedulers being able to arbitrate matching an input port with an outgoing link of one of the plurality of central modules via an outgoing link of the input module including the input port, a method for scheduling the dispatch of cells or packets stored in the virtual output queues, the method comprising:
   a) for each of the virtual output queues, maintaining a first indicator for indicating whether the virtual output queue is storing a cell awaiting dispatch arbitration; and
   b) for each of the sub-schedulers, performing a matching operation, if it has been reserved, to match a cell buffered at a virtual output queue with an outgoing link of one of the plurality of central modules via an outgoing link of the input module, wherein the matching operation includes:

i) for an input module, matching a non-empty virtual output queue with an outgoing link of the input module, and ii) matching the outgoing link of the input module with an outgoing link of the associated central module, wherein each of the sub-schedulers requires more than one cell time slot to generate a match from its matching operation, and wherein the sub-schedulers can collectively generate a match result in each cell time slot.

2. The method of claim 1 wherein the act of matching a non-empty virtual output queue with an outgoing link of the input module includes A) broadcasting a request for the non-empty virtual output queue to an arbiter of the sub-scheduler for each of the outgoing links of the input module;

B) selecting, with the arbiter, of the sub-scheduler, of each of the outgoing links of the input module, a non-empty virtual output queue that broadcast a request;

C) sending a grant to an arbiter, of the sub-scheduler, for the selected non-empty virtual output queue; and D) selecting, with the arbiter, of the sub-scheduler, of the selected non-empty virtual output queue, an outgoing link of the input module from among the one or more outgoing links that sent a grant.

3. The method of claim 2 wherein the act of selecting, with the arbiter, of the sub-scheduler, of each of the outgoing links of the input module, a non-empty virtual output queue that broadcast a request, is done in accordance with a round robin discipline.

4. The method of claim 3 wherein the round robin discipline moves through groups of virtual output queues, before moving through virtual output queues within each group.

5. The method of claim 2 wherein the acts of

A) broadcasting a request for the non-empty virtual output queue to an arbiter of the sub-scheduler for each of the outgoing links of the input module;

B) selecting, with the arbiter of the sub-scheduler of each of the outgoing links of the input module, a non-empty virtual output queue that broadcast a request;

C) sending a grant to an arbiter of the sub-scheduler for the selected non-empty virtual output queue; and D) selecting, with the arbiter of the sub-scheduler of the selected non-empty virtual output queue, an outgoing link from among the one or more outgoing links that sent a grant, are performed at least twice within the third number of cell time slots.

6. The method of claim 1 wherein each of the sub-schedulers require no more than the third number of cell time slots to generate a match result from its matching operation.

7. The method of claim 1 further comprising:

c) if a cell buffered at a virtual output queue has been successfully matched with its corresponding output port, informing the virtual output queue.

8. The method of claim 7 further comprising:

d) for each of the virtual output queues, if the virtual output queue has been informed that it has been successfully matched with its corresponding output port, then dispatching its head of line cell.

9. The method of claim 1 wherein the first indicator, for each of the virtual output queues, for indicating whether virtual output queue is storing a cell awaiting dispatch, is a count, and wherein the count is incremented upon learning that a new cell has arrived at the virtual output queue.

10. The method of claim 9 wherein the count is decremented when an available sub-scheduler is reserved for considering a head of line cell at a corresponding virtual output queue.

11. The method of claim 1 further comprising:

c) for each of the sub-schedulers, maintaining a second indicator for each of the virtual output queues, for indicating whether the sub-scheduler is available or reserved, wherein the second indicator, for each of the sub-schedulers, is set to indicate that the associated sub-scheduler is reserved if the first indicator indicates that a corresponding virtual output queue is storing a cell awaiting dispatch arbitration.

12. The method of claim 1 further comprising:

c) for each of the sub-schedulers, maintaining a second indicator for each of the virtual output queues, for indicating whether the sub-scheduler is available or reserved, wherein the second indicator, for each of the sub-schedulers, is set to indicate that the associated sub-scheduler is available if the associated sub-scheduler matches a cell buffered at a virtual output queue with its corresponding output port.

13. The method of claim 1 further comprising:

c) for each of the sub-schedulers, maintaining a second indicator for each of the virtual output queues, for indicating whether the sub-scheduler is available or reserved, wherein the second indicator is set to indicate that a $p^{th}$ sub-scheduler is reserved if the first indicator indicates that a corresponding virtual output queue is storing a cell awaiting dispatch arbitration, wherein p is set to the current cell time slot modulo the third number.

14. For use with a multi-stage switch including a plurality of central modules, each including outgoing links towards output modules, the output modules collectively including a first number of output ports, a plurality of input modules, each including virtual output queues and outgoing links coupled with each of the plurality of central modules, the input modules collectively including a second number of input ports, a dispatch scheduler comprising:

a) a third number of sub-schedulers; and b) a first indicator, associated with each of the virtual output queues, for indicating whether the virtual output queue is storing a cell awaiting dispatch arbitration, wherein each of the sub-schedulers is adapted to perform a matching operation, if it has been reserved, to match a cell buffered at a virtual output queue with its corresponding output port, and includes:

i) for an input module, means for matching a non-empty virtual output queue with an outgoing link of the input module, and ii) means for matching the outgoing link of the input module with an outgoing link of the associated central module, wherein each of the sub-schedulers requires more than one cell time slot to generate a match from its matching operation, and wherein the sub-schedulers can collectively generate a match result in each cell time slot.

15. The dispatch scheduler of claim 14 wherein the means for matching a non-empty virtual output queue with an outgoing link of the input module include A) means for broadcasting a request for the non-empty virtual output queue to an arbiter for each of the outgoing links of the input module;

B) for each of the outgoing links of the input module, an arbiter for selecting a non-empty virtual output queue that broadcast a request;

C) means for sending a grant to an arbiter for the selected non-empty virtual output queue; and D) for the selected non-empty virtual output queue, an arbiter for selecting an outgoing link of the input module from among the one or more outgoing links of the input module that sent a grant.

16. The dispatch scheduler of claim 14 wherein each of the sub-schedulers require no more than the third number of cell time slots to generate a match result from its matching operation.

17. The dispatch scheduler of claim 14 wherein if a cell buffered at a virtual output queue has been successfully matched with its corresponding output port, the virtual output queue is so informed.

18. The dispatch scheduler of claim 14 wherein if a cell buffered at a virtual output queue has been successfully matched with its corresponding output port, its head of line cell is dispatched.

19. The dispatch scheduler of claim 14 wherein the first indicator, for each of the virtual output queues, for indicating whether the virtual output queue is storing a cell awaiting dispatch arbitration, is a count, and wherein the count is incremented upon learning that a new cell has arrived at the virtual output queue.

20. The dispatch scheduler of claim 19 wherein the count is decremented when an available sub-scheduler is reserved for considering a head of line cell at a corresponding virtual output queue.

21. The dispatch scheduler of claim 14 further comprising:

c) a second indicator for each of the virtual output queues and for each of the sub-schedulers, indicating whether the sub-scheduler is available or reserved, wherein the second indicator, for each of the sub-schedulers, is set to indicate that the associated sub-scheduler is reserved if the first indicator indicates that a corresponding virtual output queue is storing a cell awaiting dispatch arbitration.

22. The dispatch scheduler of claim 14 further comprising:

c) a second indicator for each of the virtual output queues and for each of the sub-schedulers, indicating whether the sub-scheduler is available or reserved, wherein the second indicator, for each of the sub-schedulers, is set to indicate that the associated sub-scheduler is available if the associated sub-scheduler matches a cell buffered at a virtual output queue with its corresponding output port.

23. The dispatch scheduler of claim 14 further comprising:

c) a second indicator for each of the virtual output queues and for each of the sub-schedulers, indicating whether the sub-scheduler is available or reserved, wherein the second indicator is set to indicate that a $p^{th}$ sub-scheduler is reserved if the first indicator indicates that a corresponding virtual output queue is storing a cell awaiting dispatch, and wherein p is set to the current cell time slot modulo the third number.

24. The dispatch scheduler of claim 14 wherein the arbiter of each of the outgoing links of the input module for selecting a non-empty virtual output queue that broadcast a request, operates in accordance with a round robin discipline.

25. The dispatch scheduler of claim 24 wherein the round robin discipline moves through groups of virtual output queues, before moving through virtual output queues within each group.

26. The dispatch scheduler of claim 14 wherein the means for matching a non-empty virtual output queue with an outgoing link of the input module performs multiple iterations of matching a non-empty virtual output queue with an outgoing link of the input module within the third number of cell time slots.

* * * * *